US009920508B2

(12) United States Patent
Chen

(10) Patent No.: US 9,920,508 B2
(45) Date of Patent: Mar. 20, 2018

(54) TOUCH-FREE FAUCETS AND SENSORS

(71) Applicant: Chung-Chia Chen, La Habra Heights, CA (US)

(72) Inventor: Chung-Chia Chen, La Habra Heights, CA (US)

( * ) Notice: Subject to any disclaimer, the term of this patent is extended or adjusted under 35 U.S.C. 154(b) by 46 days.

(21) Appl. No.: 14/734,819

(22) Filed: Jun. 9, 2015

(65) Prior Publication Data

US 2016/0032572 A1 Feb. 4, 2016

Related U.S. Application Data

(60) Provisional application No. 62/105,120, filed on Jan. 19, 2015, provisional application No. 62/096,499, filed on Dec. 23, 2014, provisional application No. 62/051,240, filed on Sep. 16, 2014, provisional application No. 62/024,264, filed on Jul. 14, 2014, provisional application No. 62/009,720, filed on Jun. 9, 2014.

(51) Int. Cl.

| | |
|---|---|
| ***F16K 43/00*** | (2006.01) |
| ***E03C 1/05*** | (2006.01) |
| ***E03C 1/04*** | (2006.01) |
| ***F16K 11/085*** | (2006.01) |

(52) U.S. Cl.

CPC ............ *E03C 1/057* (2013.01); *E03C 1/0403* (2013.01); *E03C 1/0412* (2013.01); *F16K 11/0856* (2013.01)

(58) Field of Classification Search

CPC ........................... E03C 1/057; Y10T 137/9464
USPC ........... 137/315.01, 315.12, 603, 801; 4/302, 4/305, 623; 700/282, 283, 285
See application file for complete search history.

(56) References Cited

U.S. PATENT DOCUMENTS 4,186,761 A * 2/1980 Guarnieri ............. E03C 1/0401 137/315.15
D315,397 S 3/1991 Knapp
D317,971 S 7/1991 Sauter et al.
D352,095 S 11/1994 Bollenbacher
(Continued)

FOREIGN PATENT DOCUMENTS

CN 2584985 11/2003
CN 2906258 5/2007
(Continued)

OTHER PUBLICATIONS

U.S. Appl. No. 15/288,888, filed Oct. 7, 2016, Chen.
(Continued)

*Primary Examiner* — Reinaldo Sanchez-Medina
(74) *Attorney, Agent, or Firm* — Knobbe Martens Olson & Bear, LLP

(57) ABSTRACT

A sensor for use in a touch-free faucet that can be installed from outside in through a wall of a faucet via a receiving hole. The sensor can further include an emitter and a detector mounted on an electronic circuit board. The electronic circuit board can also pass through the receiving hole of the faucet. The emitter and the detector can be elevated from the surface of the electronic circuit board. In an embodiment, legs or stilts can be used to elevate the emitter and the detector. Elevating the detector and the emitter can increase available surface area on the electronic circuit board for mounting other electronic circuit elements.

6 Claims, 38 Drawing Sheets

(56) References Cited

U.S. PATENT DOCUMENTS 5,548,119 A 8/1996 Nortier
5,549,273 A 8/1996 Aharon
5,566,702 A 10/1996 Philipp
5,586,746 A * 12/1996 Humpert ................ E03C 1/057 251/129.04
5,625,908 A 5/1997 Shaw
5,694,653 A 12/1997 Philipp
5,730,165 A 3/1998 Philipp
5,781,942 A 7/1998 Allen et al.
5,868,311 A 2/1999 Cretu-Petra
5,901,384 A * 5/1999 Sim ........................ E03D 5/105 4/302
5,966,753 A 10/1999 Gauthier et al.
6,019,130 A 2/2000 Rump
6,026,843 A 2/2000 Pozniak et al.
6,219,857 B1 * 4/2001 Wu ..................... G01D 11/245 250/338.1
6,298,875 B1 10/2001 Warshawsky et al.
6,321,785 B1 11/2001 Bergmann
6,513,787 B1 2/2003 Jeromson et al.
6,598,245 B2 7/2003 Nishioka
6,753,554 B1 6/2004 Gomes et al.
6,996,863 B2 2/2006 Kaneko
D516,675 S 3/2006 Kakihana
7,107,631 B2 9/2006 Lang et al.
7,134,451 B1 11/2006 Malapanes
D534,622 S 1/2007 Chu et al.
D535,366 S 1/2007 Sedwick
7,174,577 B2 2/2007 Jost et al.
7,228,874 B2 6/2007 Bolderheij et al.
7,232,111 B2 6/2007 McDaniel et al.
7,326,334 B2 2/2008 Boyd et al.
7,445,024 B2 * 11/2008 Paterson ................ E03C 1/057 137/549
D592,286 S 5/2009 Berberet
D602,125 S 10/2009 Montgomery et al.
7,641,173 B2 1/2010 Goodman
D610,653 S 2/2010 Schoenherr et al.
7,690,395 B2 4/2010 Jonte et al.
7,766,026 B2 8/2010 Boey
7,784,481 B2 8/2010 Kunkel
7,946,504 B2 5/2011 Shapira et al.
8,006,712 B2 8/2011 Boey
8,028,355 B2 10/2011 Reeder et al.
D677,366 S 3/2013 Chen
D677,367 S 3/2013 Chen
8,418,993 B2 4/2013 Chen
8,438,672 B2 5/2013 Reeder et al.
8,516,628 B2 8/2013 Conroy
D689,596 S 9/2013 Chen
D692,110 S 10/2013 Chen
8,572,772 B2 11/2013 Wolf et al.
D698,013 S 1/2014 Chen
D701,947 S 4/2014 Chen
D704,311 S 5/2014 Chen
D707,798 S 6/2014 Chen
8,827,239 B2 9/2014 Chen
8,827,240 B2 9/2014 Chen
8,950,730 B2 2/2015 Bedolla et al.
9,057,183 B2 6/2015 Chen
9,062,790 B2 6/2015 Esche et al.
D735,300 S 7/2015 Chen
D735,301 S 7/2015 Chen
9,194,110 B2 11/2015 Frick et al.
D752,185 S 3/2016 Chen
9,347,207 B2 5/2016 Chen
D761,390 S 7/2016 Chen
D777,884 S 1/2017 Chen
D786,408 S 5/2017 Chen
2006/0016902 A1 1/2006 Restivo, Sr. et al.
2007/0057215 A1 3/2007 Parsons et al.
2007/0170384 A1 7/2007 Goodman
2007/0239143 A1 10/2007 Altshuler et al.
2007/0251468 A1 11/2007 Houle
2008/0156017 A1 7/2008 Johnson et al.
2008/0156384 A1 * 7/2008 Chen ....................... E03C 1/057 137/801
2008/0256494 A1 10/2008 Greenfield
2009/0014654 A1 1/2009 Zhevelev et al.
2009/0056011 A1 3/2009 Wolf et al.
2009/0119832 A1 5/2009 Conroy
2009/0288712 A1 11/2009 Lang et al.
2010/0071126 A1 * 3/2010 Rudisser ................ E03C 1/057 4/623
2010/0108165 A1 5/2010 Rodenbeck et al.
2011/0162727 A1 7/2011 Stieb
2011/0186161 A1 8/2011 Chen
2012/0055557 A1 3/2012 Belz et al.
2012/0299736 A1 11/2012 Scharf
2012/0305118 A1 * 12/2012 Itazu ...................... E03C 1/057 137/801
2013/0248033 A1 * 9/2013 Parikh ...................... E03C 1/04 137/801
2013/0248617 A1 9/2013 Sawaski et al.
2013/0269799 A1 10/2013 Swist
2014/0290774 A1 10/2014 Chung
2015/0052677 A1 2/2015 Chen
2015/0101122 A1 4/2015 Chung
2015/0233100 A1 8/2015 Loeck et al.
2015/0376880 A1 12/2015 Chen
2016/0032572 A1 2/2016 Chen
2016/0340879 A1 11/2016 Chen
2017/0218608 A1 8/2017 Chen

FOREIGN PATENT DOCUMENTS

JP 1993-331888 12/1993
JP 11-107339 4/1999
JP 2004-293207 10/2004
JP 2006-169950 6/2006
JP 2007-138574 6/2007
JP 2007-270538 10/2007
JP 2007-315041 12/2007
WO WO 2008/094651 8/2008

OTHER PUBLICATIONS

U.S. Appl. No. 15/411,778, filed Jan. 20, 2017, Chen.
U.S. Appl. No. 29/592,234, filed Jan. 27, 2017, Chen.
U.S. Appl. No. 29/603,275, filed May 8, 2017, Chen.

* cited by examiner

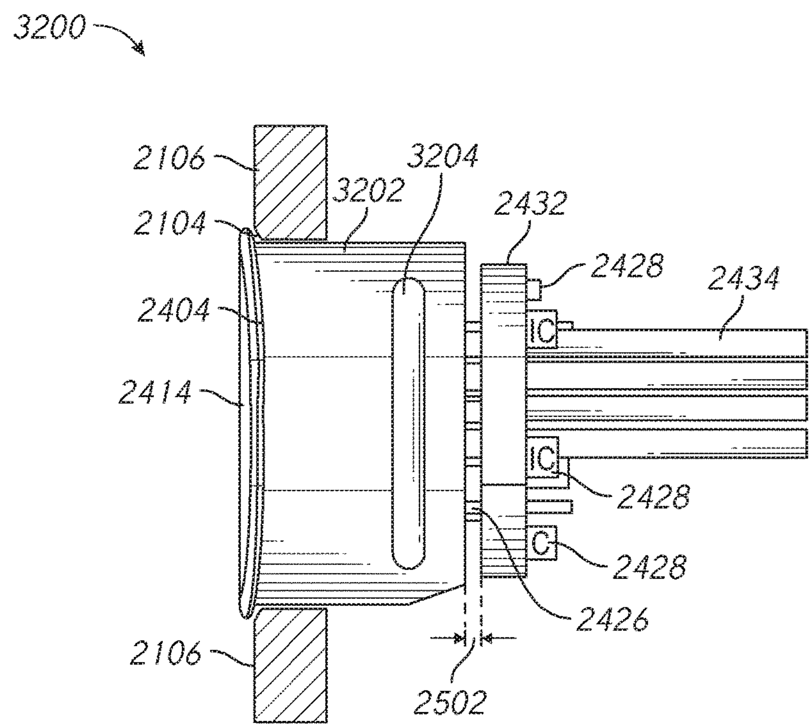
FIG. 23A
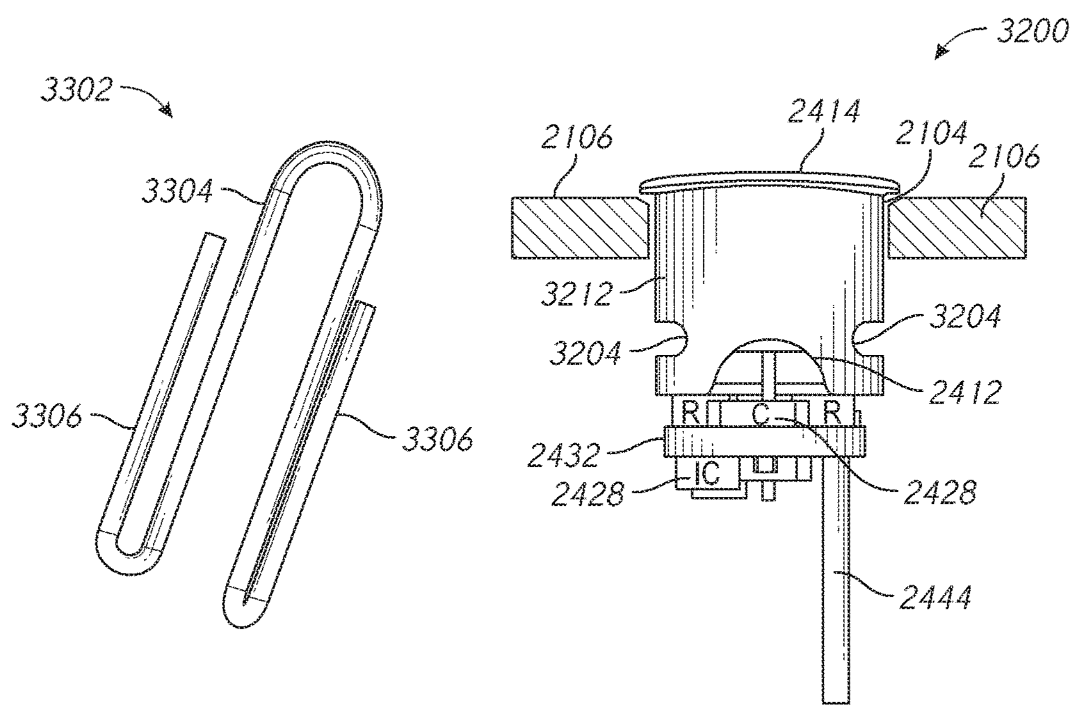
FIG. 23C
FIG. 23B

TOUCH-FREE FAUCETS AND SENSORS

RELATED APPLICATIONS

This application claims the benefit of U.S. Provisional Application No. 62/009,720, filed Jun. 9, 2014, titled TOUCH-FREE SENSOR, of U.S. Provisional Application No. 62/024,624, filed Jul. 14, 2014, titled HYBRID FAUCET SYSTEM, of U.S. Provisional Application No. 62/051,240, filed Sep. 16, 2014, titled TOUCH-FREE FAUCETS AND SENSORS, of U.S. Provisional Application No. 62/096,499, filed Dec. 23, 2014, titled TOUCH-FREE FAUCETS AND SENSORS, and of U.S. Provisional Application No. 62/105,120, filed Jan. 19, 2015, titled TOUCH-FREE FAUCETS AND SENSORS. The entire contents of the above-identified patent applications are incorporated by reference herein and made a part of this specification.

BACKGROUND

Field

Certain embodiments disclosed herein relate to touch-free faucets and sensors configured for simplified installation and/or relate to touch-free faucets configured to support multiple modes of operation. In particular, embodiments disclosed are particularly useful for controlling an attribute for water flowing from a faucet and/or for faucets and other objects with limited installation zones or requiring targeted sensors, including components of such sensors, and methods for manufacturing touch-free sensor equipped devices.

Description of the Related Art

Touch-free sensors can enable the operation of objects without the need for directly touch them. For example, touch-free faucets can provide a more hygienic means of washing hands and performing other tasks associated with traditional faucets. Touch-free faucets and faucets with touch-free operations typically include one or more sensors for sensing the presence of an object in a detection area for controlling an operation of the faucet. There remains a need for improvements to such sensors and the methods currently employed to install them.

SUMMARY

Certain aspects, advantages and novel features of embodiments of the invention are described herein. It is to be understood that not necessarily all such advantages may be achieved in accordance with any particular embodiment of the invention disclosed herein. Thus, the invention disclosed herein may be embodied or carried out in a manner that achieves or selects one advantage or group of advantages as taught herein without necessarily achieving other advantages as may be taught or suggested herein. Though primarily disclosed in the context of a faucet, other assemblies can utilize the disclosed sensor assemblies.

Some embodiments provide a method of manufacturing a faucet including inserting a sensor into a sensor mounting hole of the faucet body from the outside. Some embodiments include an emitter, a detector, and an electronic circuit board that can be simultaneously inserted through the sensor mounting hole. A flange can be included on the sensor to mount flush with the faucet body.

In some embodiments, a hybrid faucet includes a faucet housing, two mechanical valves, an electronic control valve (e.g., solenoid valve), two electronic sensors (e.g., infrared sensors), a visible LED for indication, a logic processor and/or a power supply unit. A first mechanical valve with cylinder stem can be located upstream of the electronic control valve to control the cold and hot water ratio and mix the hot and cold water to a desired water temperature. A second mechanical valve with cylinder stem can control water flow rate. One or more sensors can control various features of the faucet. For example, one sensor can control intermittent water flow. A second sensor can control a faucet continuous water mode. A logic processor can detect signals from sensors. The logic processor can send output signals to an electronic control valve such as a solenoid valve to turn on/off water flow. A power source can power the logic processor. Accordingly, water flow can be controlled by the sensors without touching the faucet housing.

In some embodiments, a hybrid faucet includes a faucet housing, two mechanical valves, an electronic control valve (e.g., solenoid valve), two sensors (e.g., infrared sensors), a visual LED for indication, a logic processor, and/or a power supply unit. A first mechanical valve with cylinder stem can be located upstream of an electronic control valve to control the cold and hot water ratio and mix the hot and cold water to a desired water temperature. The hybrid faucet can include a second mechanical valve with cylinder stem on the same axis of the first mechanical valve cylinder stem and upstream of the electronic control valve to control water flow rate. One of the sensors can control a faucet intermittent water flow mode. Another sensor can control a faucet continuous water flow mode.

In some embodiments, a hybrid faucet includes a faucet housing, one or more mechanical valves, an electronic control valve, one or more sensors (e.g., infrared sensors), a visual LED for indication, a logic processor, and/or a power supply unit. The hybrid faucet can include a first mechanical valve with cylinder stem located upstream of an electronic valve to control a cold and hot water ratio and mix the hot and cold water to a desired water temperature. The hybrid faucet can include a second mechanical valve located downstream of the electronic valve for controlling water flow rate.

In some embodiments, a hybrid faucet includes a faucet housing, one cartridge, an electronic control valve, two sensors (e.g., infrared sensors), a visual LED for indication, a logic processor, and/or a power supply unit. A cartridge can control cold and hot water ratio and water flow rate.

In some embodiments, the hybrid faucet system includes a programmable logic processor with a circuit board that can control the sensors and electronic valves. In response to detection of an object within a primary sensor (Sensor C) detection zone (e.g., in a sink) for a predetermined period of time (e.g., a primary-sensor-on-time such as 2 seconds, 3 second, 4 second, 8 seconds, or some other time), the logic processor can activate the water flow electronic control valve (e.g., solenoid valve) for water flow to the faucet spout (e.g., activation of Intermittent-Water-Flow-Mode).

In the Intermittent-Water-Flow-Mode, when the water flow electronic control valve (e.g., solenoid valve) is in an activated position for water flow and the primary sensor (e.g., Sensor C) senses no object in within the detection zone for a predetermined period of time (e.g., primary-sensor-off-time), the logic processor can deactivate the water flow electronic control electronic valve (e.g., solenoid valve) to stop water flow to the faucet spout (e.g., deactivation of Intermittent-Water-Flow-Mode).

The secondary sensor (Sensor A) can be used to operate the hybrid faucet in continuous mode. In one embodiment, when sensor A detects a presence of an object (e.g., a hand) within the detection zone for a predetermined time period (e.g., Time Continue-flow-on time such as 2 seconds, 3 seconds, 5 seconds, 1.5 seconds, 8 seconds, or some other time), the logic processor activates the water flow electronic control valve (e.g., solenoid valve) for a continuous water flow (e.g., Continue-Water-Flow-Mode). This Continuous-Water-Flow-Mode operation is convenient for users when filling a sink or a container without keeping their hands within the detection zone of the primary sensor (Sensor C) for continuous water flow (e.g., activation of Continue-Water-Flow-Mode).

The Continuous-Water-Flow-Mode can be deactivated when Sensor A senses the presence of an object (e.g., a hand) within the detection zone for a predetermined time period (e.g., a Continue-flow-off time). The logic processor can deactivate the water flow electronic control valve (e.g., solenoid valve) to stop the continuous water flow (e.g., deactivation of Continue-Water-Flow-Mode).

In a stand-by mode (e.g., when the faucet is not operating), detection of an object (e.g., a hand or finger) within the detection zone of Sensor A for a predetermined time period (e.g., Time Sc-pause such as 4 seconds, 6 seconds, 3 seconds, 9 seconds, 5 seconds, or some other time) can trigger the logic processor to pause the function of the primary sensor (e.g., Sensor C). In this Faucet-Pause-Mode, a user can work within the primary sensor detection zone without activating faucet water flow for water conservation (e.g., beginning of Faucet-Pause-Mode). Accordingly, the logic processor can ignore intermittent signals from Sensor C during the pause mode. Pause mode can be reset via sensor A. When the secondary sensor (e.g., Sensor A) detects an object (e.g., a hand or finger) within the detection zone for a predetermined time period (e.g., Time Sc-reset such as 4 seconds, 3 seconds, 10 seconds, 2.5 seconds, 9 seconds, or some other time), the logic processor can reset the function of primary sensor (e.g., Sensor C). In some embodiments, the faucet system can set and reset pause mode by activating Sensor A and C simultaneously for a predetermined time period (e.g., 2 seconds, 3 seconds, 7 seconds, or some other time).

In one or more embodiments, a logic processor circuit board comprises a hardware processor (e.g., microchip) and a circuit board. The logic processor can be programmed to function for input and output of all the electronic sensors (e.g., Sensor A, Sensor C), the visual LED for indication, and/or a water flow electronic control valve (e.g., solenoid valve). An electricity power supply package can include a battery pack (rechargeable or not) and/or an alternating current to direct current (AC-DC) transformer to supply direct current to the logic processor circuit board to activate the sensors and the flow electronic control valve. Some embodiments of the hybrid faucet system are less expensive and user friendly than full touch-free faucets systems.

According to some variants, a faucet system includes a faucet body having a wall with an outer surface and an inner surface. The faucet system can include a first aperture in the wall of the faucet body, the first aperture having an aperture cross-section. In some embodiments, the faucet system includes a first sensor assembly. The first sensor assembly can be sized and shaped to be at least partially inserted into the first aperture through the outer surface of the wall of the faucet body. In some embodiment the first sensor assembly has a first sensor cover. The first sensor cover can have an open end and a closed end opposite the opened end. In some embodiments, the first sensor cover has a flange at least partially surrounding the closed end. In some embodiments, the flange has a flange cross-section larger than the aperture cross-section. In some cases, the first sensor assembly includes a first sensor circuit board connected to the first sensor cover. In some embodiments, the first sensor circuit board has a first surface facing the closed end of the first sensor cover and a second surface facing away from the closed end of the first sensor cover. The first sensor circuit board can include a sensor emitter on the first surface, a sensor receiver on the first surface, and a plug on the second surface. In some embodiments, the faucet system includes a first interconnect assembly. The first interconnect assembly can include a first interconnect box having an open end connected to the inner surface of the wall of the faucet body. In some cases, the first interconnect box has a closed end positioned within the faucet body spaced from the wall. In some embodiments, the open end of the first interconnect has a cross-section larger than the aperture cross-section. The first interconnect assembly can include a first interconnect circuit board connected to the first interconnect box. The first interconnect circuit board can be positioned at least partially within the first interconnect box. In some embodiments, the first interconnect circuit board has a socket configured to releasably connect with the plug of the first sensor circuit board. The first interconnect assembly can include an electronic connection point configured to connect with a connection cable. In some embodiments, connection between the plug and the socket electronically connects the first sensor circuit board to the connection cable.

According to some variants, a hybrid faucet system includes a first infrared sensor. The first infrared sensor can be configured to communicate with processing electronics to initiate a first operating mode of a hybrid faucet responsive to detecting a first activation motion for a first time period. In some embodiments, the system includes a second infrared sensor. The second infrared sensor can be configured to communicate with processing electronics to initiate a second operating mode of the hybrid faucet responsive to detecting a second activation motion for a second time period. In some embodiments, the system includes a first manual controller. The first manual controller can be configured to change a first attribute of a water flow for a selected operating mode. In some embodiments, the system includes a second manual controller. The second manual controller can be configured to change a second attribute of a water flow for the selected operating mode.

In some embodiments, the first operating mode comprises intermittent flow mode. In some cases, the system comprises a water inlet, a water outlet, and/or a control valve positioned in a water flow path between the water inlet and the water outlet. In some embodiments, when the system is operating in the intermittent flow mode, detection of an object in presence with the first infrared sensor for the first time period activates the control valve to permit water flow from the water inlet to the water outlet. In some cases, when no object is detected in the presence of the first infrared sensor deactivates the control valve to shut off water flow from the water inlet to the water outlet. In some embodiments, the second operating mode comprises continuous flow mode.

In some embodiments, the system includes a water inlet, a water outlet, and/or a control valve positioned in a water flow path between the water inlet and the water outlet. In some cases, when the system is operating in the continuous flow mode, detection by the second infrared sensor of an object within a detection zone for a predetermined time period activates the control valve to permit water flow from the water inlet to the water outlet. In some embodiments, detection of an object within the detection zone by the second infrared for a second predetermined time period while the control valve is activated deactivates the control valve to shut off water flow from the water inlet to the water outlet. In some cases, the first attribute comprises temperature. In some cases, the second attribute comprises flow rate. In some embodiments, the second manual controller comprises an aerator flow rate valve. In some embodiments, said processing electronics is configured to: detect a first signal responsive to the first activation motion for the first time period; and/or detect a second signal responsive to the second activation motion for the second time period. In some cases, said processing electronics is configured to: detect time overlap between the first signal and the second signal; compare detected time overlap with a pause time period; and/or pause the first infrared sensor based on the said comparison. In some embodiments, said processing electronics is further configured to: compare the second time period with a pause time period. In some embodiments, the system includes a faucet body, wherein each of the first manual controller and the second manual controller are connected to and/or installed at least partially within the faucet body. In some embodiments, the system includes a faucet body, wherein one or more of the first manual controller and the second manual controller are connected to and/or installed at least partially within the faucet body. In some cases, each of the first infrared sensor and second infrared sensor are installed in the faucet body. In some cases, one or more of the first infrared sensor and second infrared sensor are installed in the faucet body.

According to some variants, a sensor that is configured to provide touch-free control of an attribute of dispensed water can include an electronic circuit board of a first size that can pass through a receiving hole. The sensor can include a sensor cover of a second size that can pass through the receiving hole. In some cases, the sensor includes a securing module that can retain the sensor cover in a position with respect to the receiving hole.

In some embodiments, the sensor includes a flange of a third size that is greater than the size of the receiving hole. In some cases, the sensor includes a faucet body. In some embodiments, the flange is mounted flush with the faucet body. In some cases, the first size of the electronic circuit board is smaller than the second size of the sensor cover. In some embodiments, the sensor includes an emitter configured to transmit radiation. The sensor can include a detector configured to receive reflected radiation. In some cases, at least one of the emitter or the detector is installed at a first plane that is a first distance away from the surface of the electronic circuit board. In some embodiments, the sensor includes electronic components. The electronic components can be installed under the first plane on the surface of the electronic board below the emitter or a detector. In some cases, the sensor includes legs that can elevate the emitter or the detector from the first plane, said legs including electrical connectivity. In some embodiments, the sensor includes a lens.

According to some variants, a method of assembling a sensor for providing touch-free control of an attribute of dispensed water includes: inserting an electronic circuit board through a receiving hole; inserting a sensor cover through the receiving hole; and/or securing the sensor in position with respect to the receiving hole. In some cases, the method includes securing the sensor with a flange. In some embodiments, the method includes securing the sensor with securing modules.

According to some variants, a method of installing a sensor for providing touch-free control of an attribute of dispensed water can include: providing a sensor suitable for insertion through a receiving hole from an exterior surface of a wall of an enclosed structure; providing an installation tool configured to slide inside the enclosed structure; providing a clip configured to secure the sensor with the enclosed structure; engaging a clip with the installation tool; inserting the sensor through the receiving hole; sliding the installation tool with the engaged clip inside the enclosed structure such that the clip aligns with one or more grooves of the sensor; disengaging the clip from the installation tool; and/or sliding out the installation tool from the enclosed structure.

According to some variants, a method of repairing a sensor used in providing touch-free control of an attribute of dispensed water, said sensor installed from an exterior wall of an enclosed structure through a receiving hole, includes: sliding in an installation tool inside an enclosed structure; engaging the installation tool with a clip that secures the sensor with the enclosed structure; sliding out the installation tool with the engaged clip from the enclosed structure; and/or removing the sensor from the enclosed structure through a receiving hole.

According to some variants, a hybrid faucet system can include a first infrared sensor. The first infrared sensor can be configured to communicate with processing electronics to initiate a first operating mode of a hybrid faucet responsive to detecting a first activation motion for a first time period. In some cases, the system includes a second infrared sensor. The second infrared sensor can be configured to communicate with processing electronics to initiate a second operating mode of the hybrid faucet responsive to detecting a second activation motion for a second time period. In some cases, the system includes a first manual controller. The first manual controller can be configured to change a first attribute of a water flow for a selected operating mode. In some cases, the system includes a second manual controller. The second manual controller can be configured to change a second attribute of a water flow for the selected operating mode. In some embodiments, one or more of the first infrared sensor and the second infrared sensor comprises: an electronic circuit board of a first size that can pass through a receiving hole; a sensor cover of a second size that can pass through the receiving hole; and/or a securing module that can retain the sensor cover in a position with respect to the receiving hole. In some embodiments, one or more of the emitter and the detector is a surface-mount device.

According to some variants, a flow control valve configured to connect to a faucet system can include a valve body. The valve body can include an engagement portion configured to couple with a portion of the faucet system. In some embodiments, the valve body includes a cavity having an inner diameter. The valve can include a valve handle having an upstream end and a downstream end and configured to rotatably connect to the valve body. The valve handle can include a mating portion configured to be received at least partially within the cavity of the valve body. In some embodiments, the valve handle include a handle aperture through the upstream and downstream ends of the valve handle. The valve can include a top plate connected to one or both of the valve body and the valve handle. The top plate can have a plate aperture configured to align with the handle aperture to facilitate fluid communication between a source of fluid upstream of the flow control valve and an outlet of the flow control valve.

In some embodiments, the valve includes an aerator configured to adjustably connect with the valve handle. In some cases, the plate aperture has a radial width with respect to a central axis of the valve handle. In some embodiments, the plate aperture has an arcuate length with respect to the central axis of the valve handle. In some cases, the radial width of the plate aperture varies along the arcuate length of the plate aperture. In some embodiments, the valve body includes an arcuate channel. In some embodiments, the valve handle includes a pin configured to fit at least partially within the arcuate channel of the valve body. In some cases, interference between the pin and walls of the arcuate channel limits a range of rotation between the valve handle and the valve body. In some embodiments, the valve includes a locking nut configured to fit at least partially within the cavity of the valve body and configured to mate with the mating portion of the valve handle. In some cases, the valve handle includes a valve shaft hole. The top plate can include a valve shaft aperture. In some embodiments, the flow control valve includes a valve shaft inserted at least partially through the valve shaft hole and the valve shaft aperture. In some cases, the valve shaft is configured to fixedly or releasably mate the valve handle to the top plate. In some embodiments, rotation of the valve handle about a central axis of the valve handle with respect to the top plate varies an area of overlap between the plate aperture and the handle aperture to vary a flow rate of water through the flow control valve.

According to some variants, a faucet system includes a faucet body having a wall with an outer surface and an inner surface. The system can include a first aperture in the wall of the faucet body. The first aperture can have an aperture cross-section. In some embodiments, the system includes a first sensor assembly sized and shaped to be at least partially inserted into the first aperture through the outer surface of the wall of the faucet body. The first sensor assembly can include a first sensor cover having an open end, a closed end opposite the opened end, and/or a flange at least partially surrounding the closed end. In some embodiments, the flange has a flange cross-section larger than the aperture cross-section. In some cases, the first sensor assembly includes a first sensor circuit board connected to the first sensor cover. The first sensor circuit board can have a first surface facing the closed end of the first sensor cover, a second surface facing away from the closed end of the first sensor cover, a sensor emitter on the first surface, a sensor receiver on the first surface, and/or a plug on the second surface. In some embodiments, the system includes a first interconnect assembly. The first interconnect assembly can include a socket configured to releasably connect with the plug of the first sensor circuit board. In some cases, connection between the plug and the socket electronically connects the first sensor circuit board to a connection cable.

In some embodiments, the first interconnect assembly includes a first interconnect box having an open end connected to the inner surface of the wall of the faucet body and a closed end positioned within the faucet body spaced from the wall. In some embodiments, the open end of the first interconnect having a cross-section larger than the aperture cross-section. In some embodiments, the first interconnect assembly includes a first interconnect circuit board connected to the first interconnect box and positioned at least partially within the first interconnect box. The first interconnect circuit board can include the socket. In some cases, the first interconnect assembly includes an electronic connection point configured to connect with the connection cable.

In some embodiments, the sensor sleeve is positioned between the first sensor circuit board and the closed end of the first sensor cover. In some cases, the sensor sleeve includes a first aperture and a second aperture. In some embodiments, the sensor emitter is positioned at least partially within in the first aperture and the sensor receiver is positioned at least partially within the second aperture.

BRIEF DESCRIPTION OF THE DRAWINGS

Embodiments disclosed herein are described below with reference to the drawings. Throughout the drawings, reference numbers are re-used to indicate correspondence between referenced elements. The drawings are provided to illustrate embodiments of the inventions described herein and not to limit the scope thereof.

FIGS. 23A and 23B illustrate a side view and a top view, respectively, of the sensor shown in FIG. 22A received by a receiving hole.

FIG. 23C illustrates an embodiment of a securing module that is a clip.

DETAILED DESCRIPTION

Figure 1:
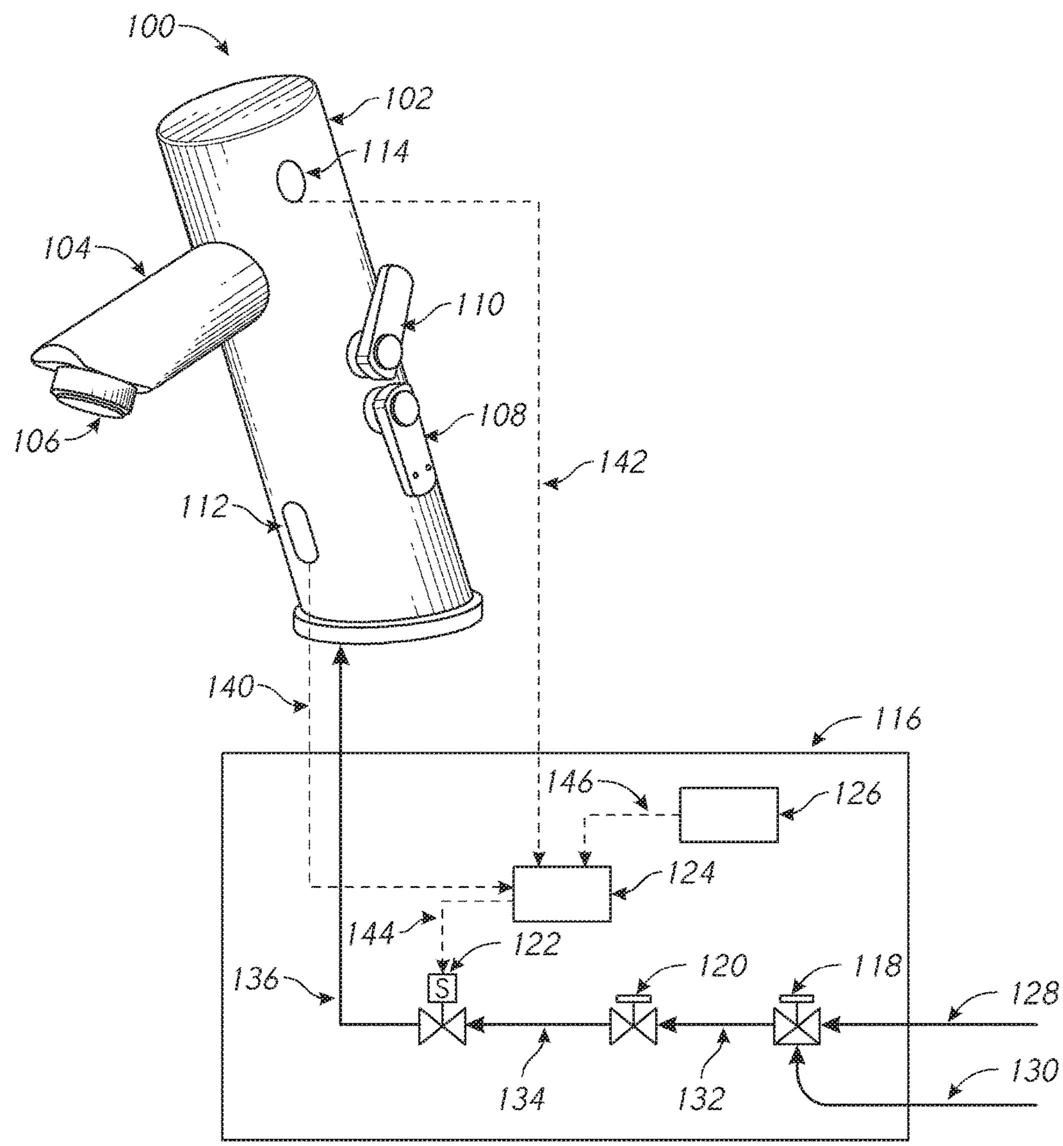
FIG. 1 illustrates an embodiment of a hybrid faucet system including a hybrid faucet that is configured to include touch and touch-free instrumentalities for controlling one or more attributes of flowing water from the hybrid faucet.

Although certain embodiments and examples are disclosed herein, inventive subject matter extends beyond the examples in the specifically disclosed embodiments to other alternative embodiments and/or uses, and to modifications and equivalents thereof. Thus, the scope of the disclosure is not limited by any of the particular embodiments described herein. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

The drawing showing certain embodiments can be semi-diagrammatic and not to scale and, particularly, some of the dimensions are for the clarity of presentation and are shown greatly exaggerated in the drawings.

Touch-free assemblies, for example faucets, include a sensor for detecting objects and motions to control one or more operations associated with said assembly. The sensor generally includes an emitter for transmitting radiation and a detector for receiving the reflected radiation. The emitter and detector can be attached to an electronic circuit board, e.g. a printed circuit board (PCB). The circuit board may include electronic circuit elements for driving the emitter and receiving signals from the detector. Touch-free faucets can provide a more hygienic means of washing hands and performing other tasks associated with traditional faucets. However, many touch-free faucets in the industry lack controls to modify attributes (flow rate, temperature, etc.) or mode (pause mode, continuous mode, etc.) of water flow through the touch-free faucet. Accordingly, there remains a need to enhance operation of a touch-free faucet. In some cases, touch-free faucets can be more convenient than traditional faucets. However, they can also be more expensive. Moreover, touch-free faucets can be difficult to repair, especially if there is any problem with the sensor. Typically in a touch free faucet, the sensors are mounted inside out through the interior of a faucet. This can make installation and repairs time consuming and expensive. Accordingly, there remains a need to enhance sensor assembly in a touch-free faucet.

Certain embodiments described herein disclose a hybrid lavatory-bathroom-kitchen-type faucet systems that include both touch and touch free functionalities. In order to provide water-efficient operation that might be easy and convenient to use, the water flow can be activated and deactivated in response to a primary electronic sensor (Sensor C) that detects presence of an object so as to provide the water-efficient operation in intermittent-water-flow-mode. For other applications, such as filling the sink or bathtub, a container or for washing dishes, washing food, running a shower, etc., the hybrid faucet system can include a continuous water flow mode. The continuous water flow mode can be activated using a secondary electronic sensor (Sensor A). In one embodiment, the hybrid faucet system can be switched between a continuous-water-flow-mode and intermittent-water-flow-mode without touching any part(s) of the faucet body. Accordingly, the personal hygiene of a person can be protected by not having to come into contact with any portion of the faucet.

The hybrid faucet system can also include a Pause-Mode that can enable a user to work in the vicinity of the faucet without worrying about accidentally activating the sensors. Furthermore, the hybrid faucet system can also include mechanical control valves (e.g., manual valves configured to be mechanically operated by the user) to adjust and maintain water flow and temperature settings for user convenience and water conservation.

FIG. 1 illustrates an embodiment of a hybrid faucet system including a temperature and a flow control valve assembly. The hybrid faucet system 100 can include a faucet body 102, an electronic primary water flow sensor (e.g. infrared sensor IR 112), an electronic continuous water flow sensor (e.g. infrared sensor IR 114), a first manual valve (e.g., water temperature adjustment knob 108), a second manual valve (e.g., water flow adjustment knob 110), and a faucet valve control assembly 116. One or more of the manual valves (e.g., valves configured to operate in response to manual user input such as, for example, turning a knob, pressing a button, rotating a handle, etc.) can be installed on and/or in the faucet body 102. One or more of the sensors (e.g., IR sensors 112, 114) can be installed/replaced from outside of the water faucet body 102, as will be discussed in detail below with respect to sensors 2100, 2400, 2800, 3200, 3800, 3900, 4002, 4100. The faucet valve control assembly 116 can include a mechanical valve 118 to control water flow ratio of cold water inlet 128 and hot water inlet 130 and mixed to a user's desired water temperature, a mechanical valve 120 to control water flow rate of the mixed water, an electronic control valve such as solenoid valve 122, a logic processor 124, a power supply package 126, and/or any combination or sub-combination of the above components. For example, the faucet valve control system 116 may not include a solenoid valve 122. In an embodiment, the logic processor is a hardware processor (e.g. microchip). The logic processor 124 can be configured to detect a signal input 140 from electronic primary flow sensor 112 and/or input signal 142 from the electronic continuous flow sensor 114. Based on the detected input signals, the logic processor 124 can output a signal 144 to electronic control valve (solenoid valve 122) to tog on/off the mixed cold/hot water flow (134, 136) to faucet spout 102 and aerator 106. The electronic continuous water flow sensor 114 can be located on either side of the faucet body 102 or on the top of faucet body 102. As illustrated, the primary water flow sensor 112 may be located to facing to the spout aerator direction to sense object or hands in the electronic sensing area of sink to turn on and off water flow. The power supply package 126 can include one or more batteries, one or more rechargeable batteries, a solar cell system, or a DC voltage supplied from an AC/DC converter. The power supply package 126 can deliver DC power 146 to the logic processor. The faucet valve control assembly 116 can be housed in the faucet body 102 or enclosed in a separate control box.

Figure 2:
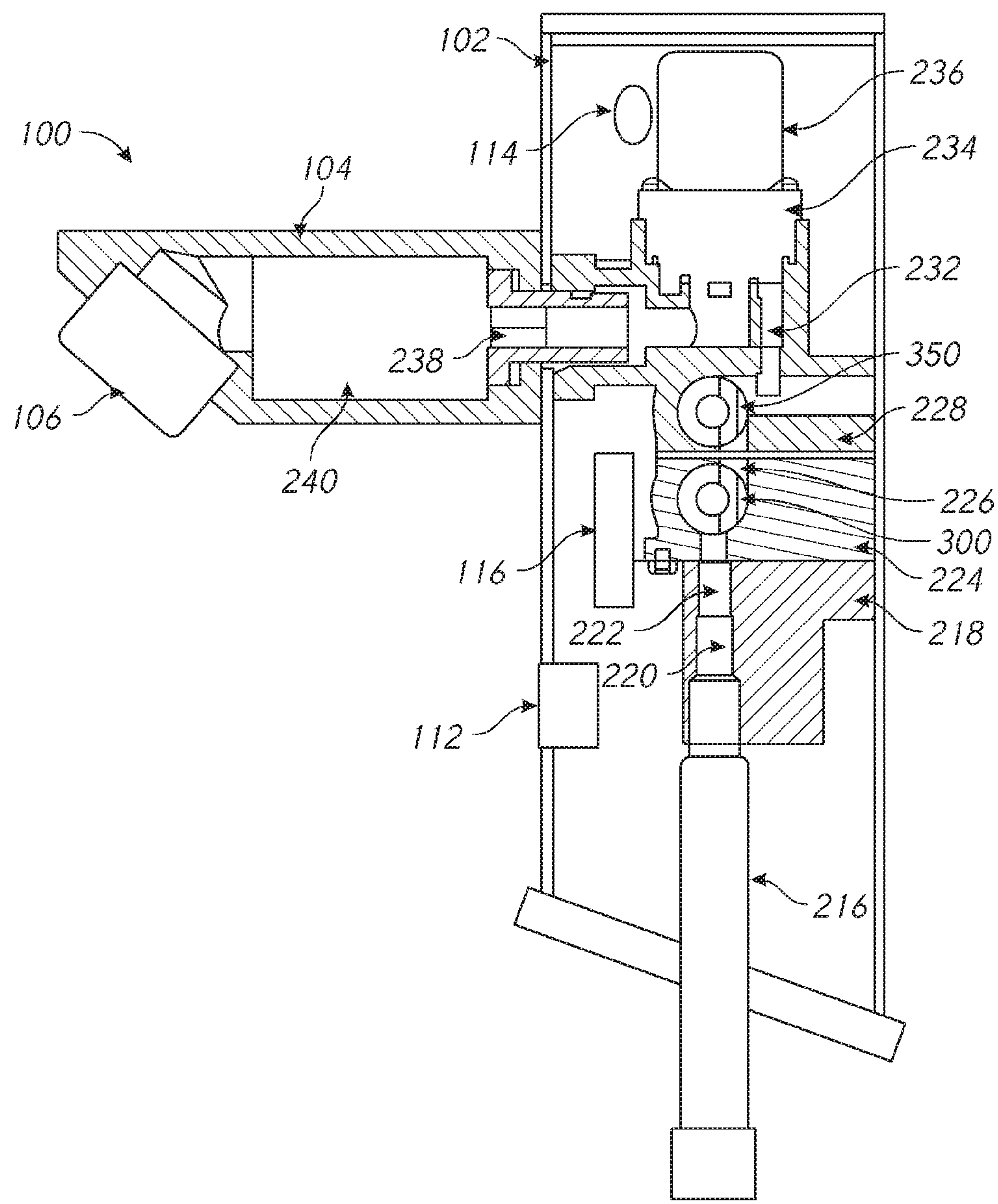
FIG. 2 illustrates a cross section view of the hybrid faucet of FIG. 1.

FIG. 2 is illustrates a cross-sectional view of a portion of the hybrid faucet system of FIG. 1. The illustrated embodiment includes a faucet body 102, two electronic sensors (usually infrared sensor IR 112 and 114), a water inlet assembly 218, a mechanical water temperature control assembly 224, a mechanical water flow control assembly 228, an electronic flow control valve 234 with electronic actuator 236, a spout 104, an aerator 106, a control assembly 116, a power supply assembly, and/or any combination or sub-combination of the above components. For example, the faucet system 100 may not include an electronic flow control valve 234 with an electronic actuator. In the illustrated embodiment, the water inlet assembly 218 includes two inlet holes with a chamber to embed a check valve 220 on each inlet stream to prevent cross flow between the cold and hot water supply line. The check valve 220 with a strainer can also be installed on the inlet hose connector or between the cold/hot water supply valve and the water inlet hose to remove foreign particles in the inlet water. The cold and hot water can flow from the inlet pipes 216 through the check valve 220 and exit through water channels to a mechanical temperature control valve 224 which can include a temperature cylinder stem 300 with control holes to adjust inlet of cold and hot water flow ratio for desired water temperature.

Figure 3A:
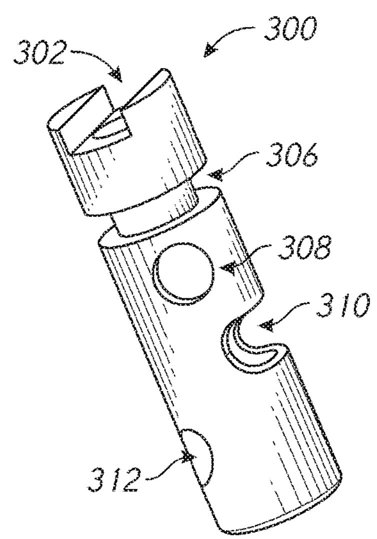
FIG. 3A illustrates an embodiment of a water temperature cylinder stem.
Figure 3B:
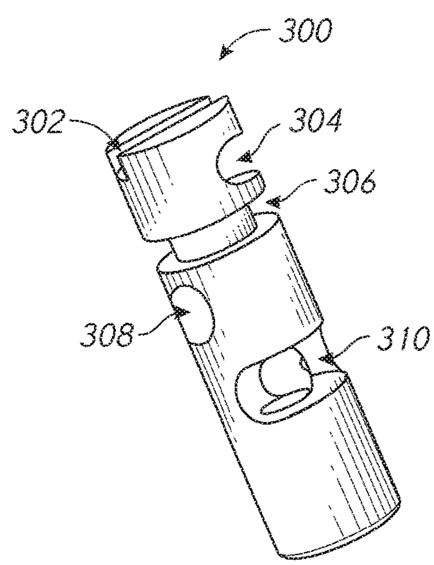
FIG. 3B illustrates another orientation of the embodiment shown in FIG. 3A

FIG. 3A illustrates an embodiment of a water temperature cylinder stem 300. As illustrated, the control stem 300 can include a temperature stem body 301. In some cases, the temperature stem body 300 has a generally cylindrical shape. Cold water can flow from the inlet channel through the control gap between the cold water inlet hole 308 and cylinder housing wall into the inner channel. Hot water can flow from the inlet channel through the control gap between the hot water inlet hole 312 and cylinder housing wall into the inner channel. The mixed water can exit from the outlet hole 310 and go into the flow control valve inlet channel 226 and then to the water flow control valve 228. The cylinder stem can also include a groove 302 on the top to fasten a temperature knob 108 of FIG. 1. An angle cut stop groove 304 (shown in FIG. 3B) can set the cylinder rotation angle and may prevent the cylinder stem from popping out of the mechanical control valve body 224. In some embodiments, setting the cylinder rotation angle can inhibit or prevent accidental contact or impact between the temperature knob 108 and other structures of the faucet system 100 (e.g., the flow adjustment knob 110). An O-ring groove 306 with O-ring can stop water leaking from the housing of water temperature control valve 224. The hot water inlet hole 312 may be of a different size and shape than the cold water inlet hole 308 to control temperature of the mixed water for safety purposes. The hot water inlet hole 312 may also be offset from the cold water inlet hole 308 to control maximum and minimum temperature of the mixed water. As illustrated in FIG. 3A, in some embodiments, the cold water inlet hole 308 and hot water inlet hole 312 at least partially overlap each other in a direction measured along the circumference of the temperature stem body 301. In some embodiments, the cold water inlet hole 308 and hot water inlet hold 312 at least partially overlap each other in a direction substantially parallel to the longitudinal axis of the temperature stem body 301. FIG. 3B illustrates another orientation of the embodiment shown in FIG. 3A.

Figure 3C:
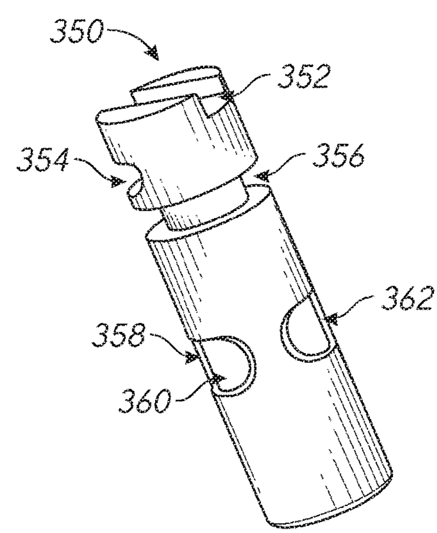
FIG. 3C illustrates an embodiment of a water flow cylinder stem.

FIG. 3C illustrates an embodiment a flow control cylinder stem 350. In an embodiment, the flow control cylinder stem 350 is arranged in a manner such that it receives mixed water from the outlet 310 of the water temperature cylinder stem 300. The mixed water can flow from the mixed water outlet channel 226 through the control gap between the inlet hole 358 and cylinder housing wall into the inner water channel 360 and exit from the outlet hole 362 to the electronic control valve 234 inlet channel 232. The flow control cylinder stem 350 can also include a groove 352 on the top to fasten a flow adjustment knob 110 of FIG. 1. A stop groove 354 can limit the cylinder rotation angle to keep the cylinder stem from popping out from the mechanical control valve body 228. In some embodiments, limiting the cylinder rotation angle of the flow control cylinder stem 350 can reduce the likelihood that the flow adjustment knob 110 is impacted upon the temperature knob 108 during use. An O-ring groove 356 with O-ring can stop water leaking from the housing of water flow control valve 228. Accordingly, the orientation (which can be controlled by the respective knobs 108 and 110) of the mixed water outlet hole 310 relative to the flow inlet hole 358 can control the flow rate of the mixed water.

The adjusted water flow from the flow control cylinder 350 can then pass through the electronic control valve such as a solenoid valve 234 with an actuator 236 that can control on/off flow to the faucet spout channel (238 and 240). In some embodiments, the solenoid valve 234 and actuator 236 can be configured to meter flow through the faucet spout channels 238, 240 to control flow rate through the faucet. The water can then flow through the aerator 206. Accordingly, the cold/hot water flow can be controlled by the mechanical water temperature control valve assembly 224, mechanical water flow control valve assembly 228 and electronic water flow control valve 234 to a desired water temperature and flow rate.

Although the hybrid faucet system 100 has been described as including an electronic valve, one of ordinary skill in the art will appreciate that the faucet 100 could include more than one electronic valve and/or the faucet could include one or more mechanical valves in series or in parallel with the electronic valve (s).

Figure 4:
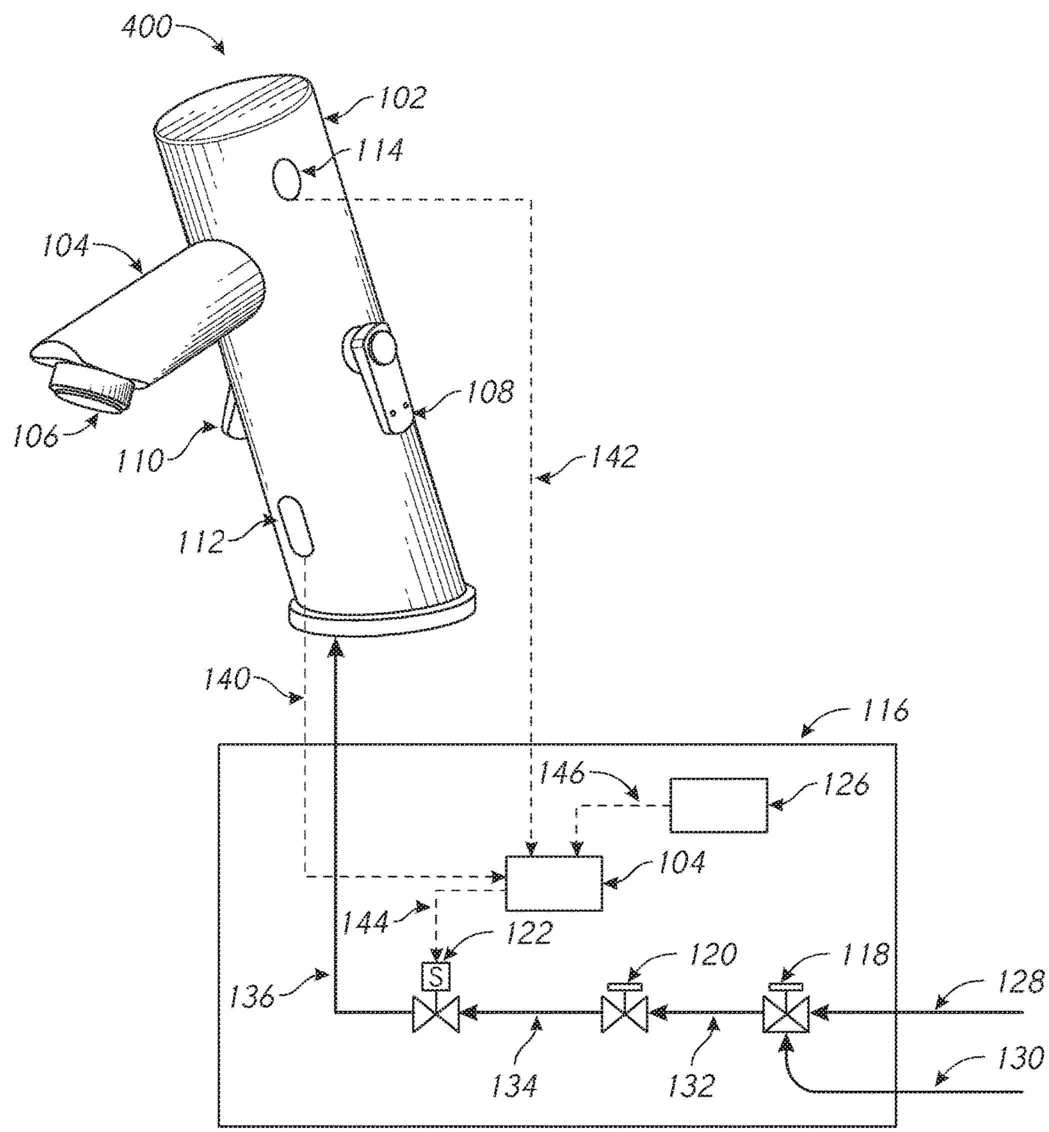
FIG. 4 illustrates an embodiment of a hybrid faucet with a temperature adjustment knob positioned opposite from the flow adjustment knob.

FIG. 4 illustrates an embodiment of a hybrid faucet system including a temperature and flow control valve assembly. The hybrid faucet system 400 includes a faucet body 102, an electronic primary water flow sensor (usually infrared sensor IR 112), an electronic continuous water flow sensor (usually infrared sensor IR 114), a water temperature adjustment knob 108, a water flow adjustment knob 110 and a faucet water control valve assembly 116. The faucet control valve assembly 116 can include a mechanical water temperature control valve 118 to control water flow ratio of cold water inlet 128 and hot water inlet 130 to be mixed to a user's desired water temperature, a mechanical valve 120 to control water flow rate of the mixed water 132, an electronic control valve such as solenoid valve 122, a logic processor 104, and a power supply package 126, and/or any combination or sub-combination of the above components. For example, the faucet system 400 may not include the electronic control valve 122. The logic processor 104 is configured to receive an input signal 140 from an electronic primary water flow sensor 112 to start an intermittent water flow and an input signal 142 from electronic continuous water sensor 454 to start a continuous water flow. The logic processor 104 can output a signal 144 to an electronic water flow control valve (solenoid valve 122) to turn on and off the mixed water flow 134. The mixed water 136 can then flow to faucet spout 104 and the aerator 106. The electronic continuous water flow sensor 114 can be located on either side of the faucet body 102 or on the top of faucet body 102. The primary water flow sensor 112 can face in the spout aerator direction to sense object or hands in the electronic sensing area of sink to control water flow. In one embodiment, the power supply package 126 may include one or more a batteries, one or more rechargeable batteries, a solar cell system, a DC voltage supplied from an AC/DC converter, etc. to supply DC power 464 to the logic processor. The faucet valve control assembly 116 can be housed in the faucet body 102 or enclosed in a separate control box. Compared to the embodiment illustrated in FIG. 1, the temperature and control knobs are located on opposite sides of the hybrid faucet system 400.

Figure 5:
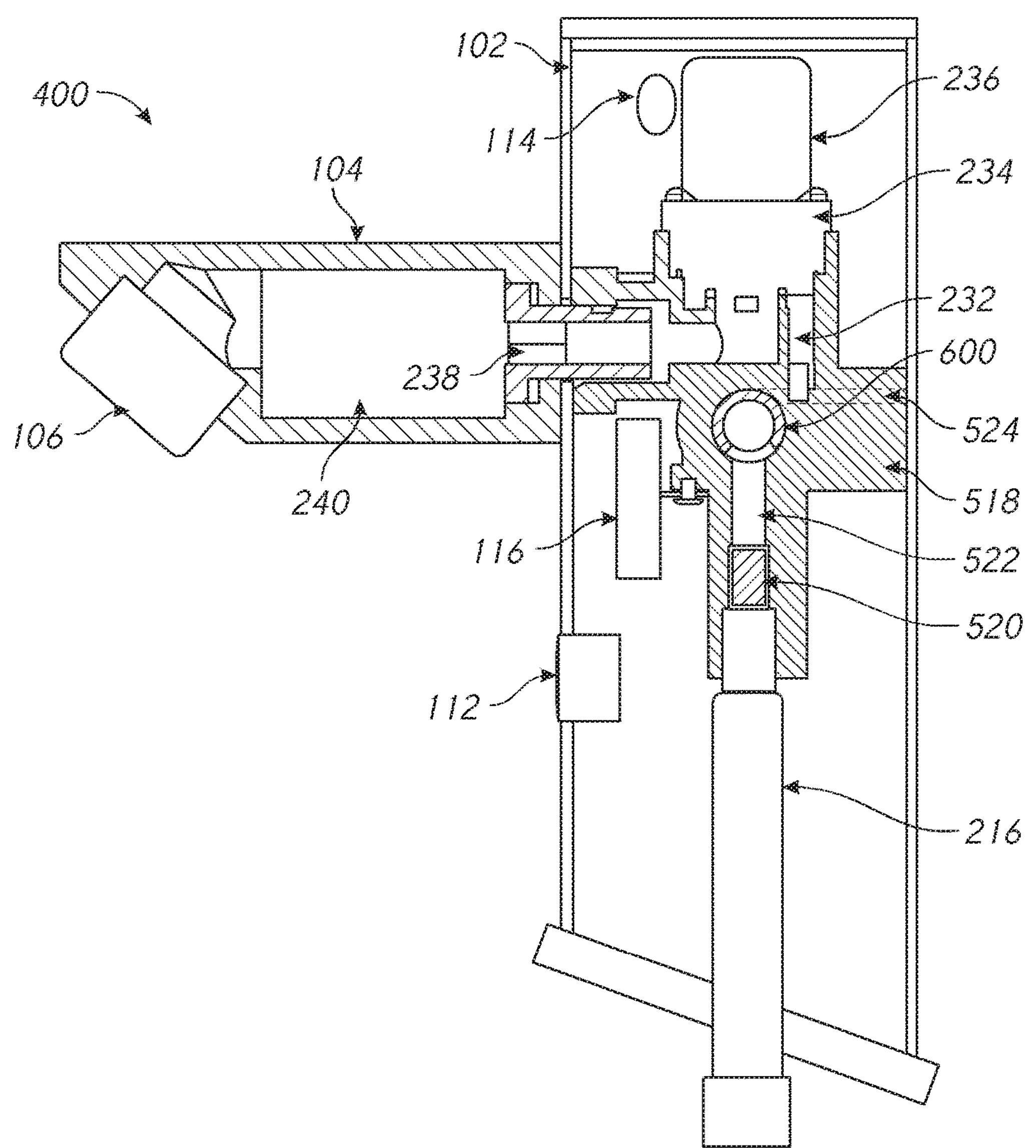
FIG. 5 illustrates a cross section view of the hybrid faucet of FIG. 4.

FIG. 5 illustrates a cross section view of a portion of the faucet system 400 of FIG. 4. As discussed above, the hybrid faucet system 400 includes a faucet body 102, two electronic sensors (usually infrared sensor IR 112 and 114), a mechanical water temperature and flow control assembly 518, an electronic flow control valve 528 with electronic actuator 530, a spout 104, an aerator 106, a control assembly 116, a power supply assembly, and/or any combination or sub-combination of the above components. For example, the faucet system 400 may not include an electronic flow control valve 528. In the illustrated embodiment, the mechanical water temperature and flow control assembly 518 includes two inlet holes 522 with a chamber to embed a check valve 520 on each water supply inlet to prevent cross flow between the cold and hot water supply line. The check valves 520 with strainer can also be installed on the inlet hose connector or between the cold/hot water supply valve and the water inlet hose to remove foreign particles in the inlet water. In an embodiment, the cold and hot water flow from the inlet pipes 516 through the check valve 520 and water inlet channel 522 to a mechanical water temperature and flow control valve cylinder assembly 600.

Figure 6A:
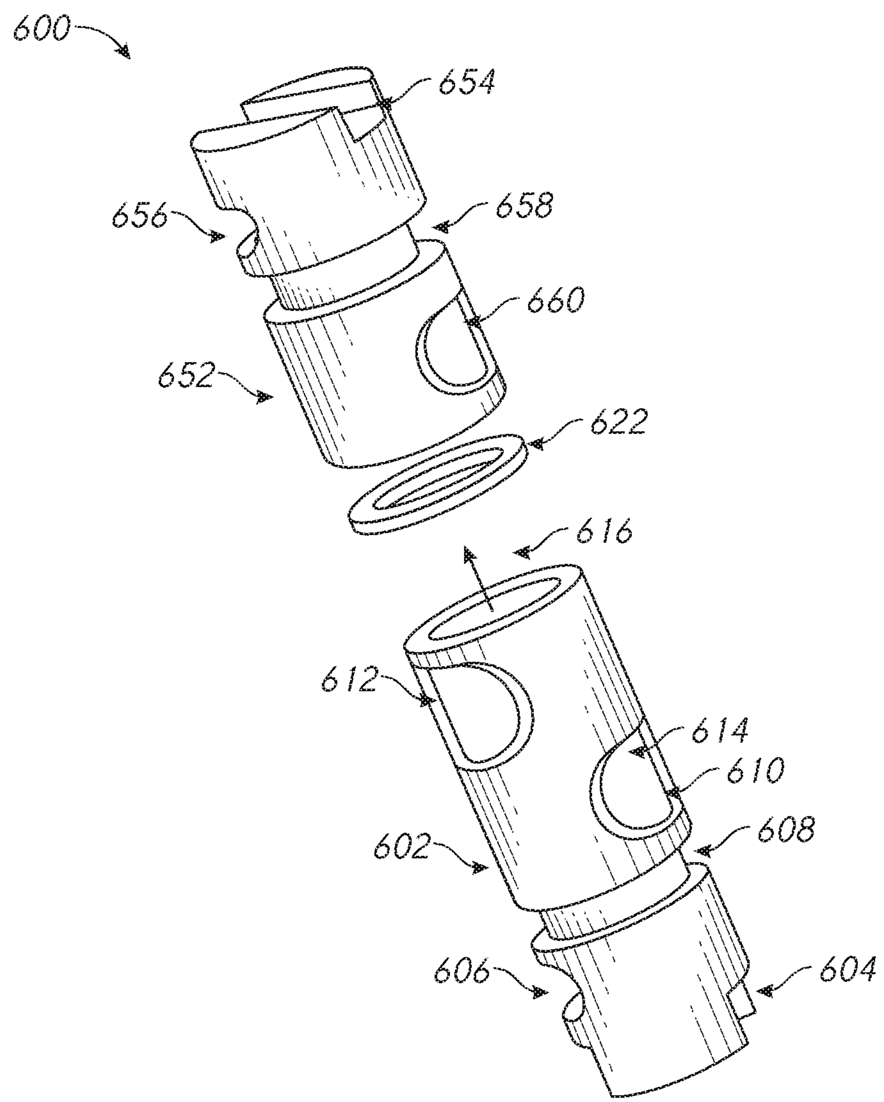
FIG. 6A illustrates an embodiment of a water temperature control valve cylinder stem and a water flow control valve cylinder stem that can be used with the faucet of FIG. 4.

FIG. 6A illustrates an embodiment of a mechanical water temperature and flow control valve cylinder assembly 600 which includes a water temperature control valve cylinder stem 602 and a water flow control valve cylinder stem 652. The cold water can flow from the cold water inlet channel (one of 522) through a gap between the inlet cut hole 610 and the cylinder housing wall of water temperature and flow control valve body 518 into the inner channel 614 of the water temperature control valve cylinder stem 602. The hot water can flow from the hot water inlet channel (another one of 522) through a gap between the inlet cut hole 612 and the cylinder housing wall of water temperature and flow control valve body 518 into the inner channel 614 of the water temperature control valve cylinder stem 602. As illustrated, the inlet cut holes 610, 612 can at least partially overlap each other in a direction along the circumference of the cylinder stem 652. In some embodiments, the inlet cut holes 610, 612 at least partially overlap each other in a direction perpendicular to the central axis of the cylinder stem 652. The water temperature control cylinder stem 602 can include a groove 604 on the top to fasten a water temperature adjustment knob 108 of FIG. 4. A stop groove 606 can limit the cylinder rotation angle and keep the cylinder stem from popping out of the mechanical control valve body 518. An O-ring groove 608 with O-ring can stop water leaking from the housing of water temperature control valve 518. The rotation of the water temperature control valve cylinder stem 602 can change the size of the gap between the cold water inlet cut hole 610, hot water inlet cut hole 612, and the water temperature and flow control valve body 518 wall to adjust the ratio of inlet cold and hot water. Accordingly, the temperature of the mixed water can be controlled.

Figure 6B:
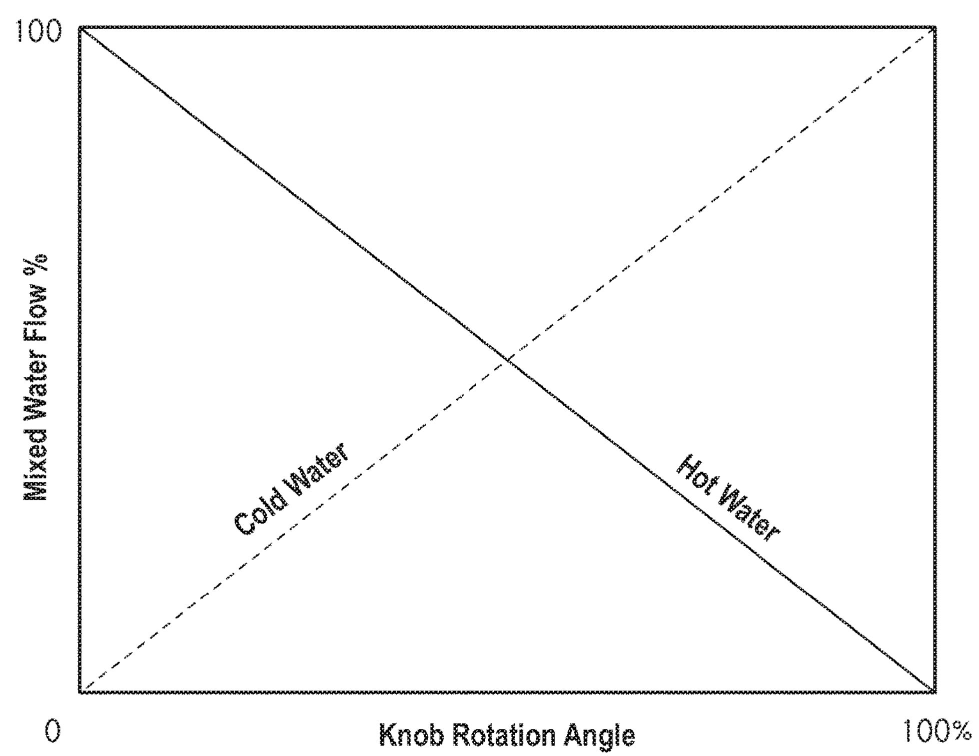
FIG. 6B illustrates water flow settings versus knob rotation angles according to an embodiment described herein.

The mixed water 616 can flow from the inner channel 614 of the water temperature control valve cylinder stem 602 through a washer 622 into a water flow control valve cylinder stem 652. The mixed water can exit through a gap between a flow control cut hole 660 and the water temperature and flow control valve 518 wall to the water channel 524. The water flow control cylinder stem 652 also includes a groove 654 on the top to fasten a water flow adjustment knob 110 of FIG. 4. A stop groove 656 can limit the cylinder rotation angle and keep the cylinder stem from popping out of the mechanical control valve body 518. An O-ring groove 658 including an O-ring can stop water leaking from the housing of water temperature control valve 518. The rotation of the water flow control valve cylinder stem 652 can change the size of the gap between the water flow control cut hole 660 and the water temperature and flow control valve body 518 wall to adjust the water flow according to the user's desired water flow. FIG. 6B illustrates water flow settings versus knob rotation angles according to an embodiment described herein.

In an embodiment, the regulated water flows through the mechanical control valve outlet channel 524 and the electronic control valve inlet channel 526. Accordingly, the water passes through the electronic control valve such that a solenoid valve 528 with an actuator 530 can control on/off flow to the faucet spout channel (532 and 534). The water can exit from through the aerator 106. Thus, the cold/hot water flow can be controlled by the water temperature and flow control valve assembly 518 and electronic water flow control valve 528 to the user's desired water temperature and flow rate.

Although the faucet 500 has been described as including an electronic valve, one of ordinary skill in the art will appreciate that the faucet 500 could include more than one electronic valve and/or the faucet could include one or more mechanical valves in series or in parallel with the electronic valve (s).

Figure 7:
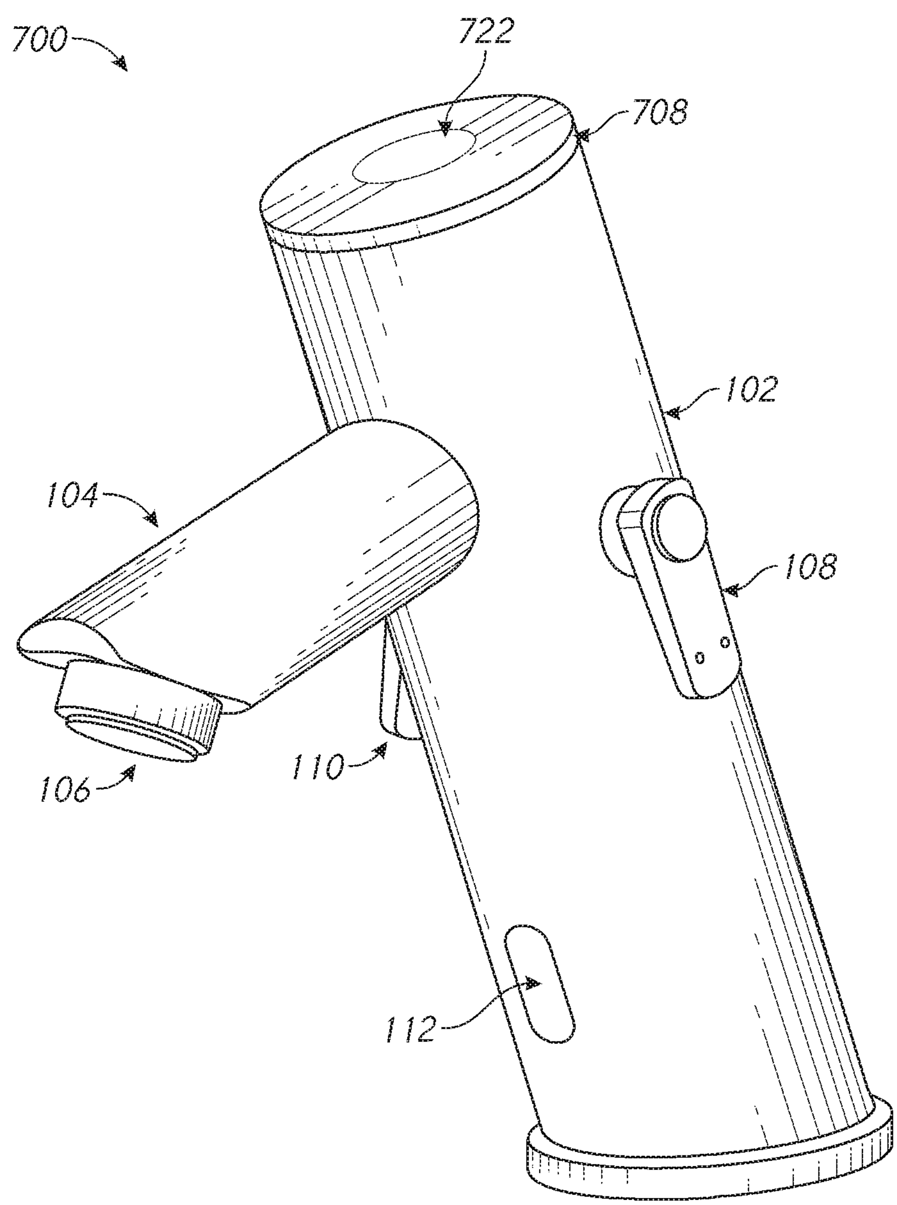
FIG. 7 illustrates an embodiment of a hybrid faucet with a sensor on the top cap of the hybrid faucet.

FIG. 7 illustrates an embodiment of a hybrid faucet 700 where one of the sensors is placed on top of the faucet body 102. The hybrid faucet 700 includes a spout 104, a water aerator 106, a water temperature adjustment knob 108, a water flow adjustment knob 110, an electronic primary water flow sensor (usually infrared sensor IR 112) activates an intermittent water flow when the sensor 112 senses an object in the sensing area of sensor 112. Another sensor 722 can be located on either side of faucet body 102 of FIG. 4 or on the top cap 708 of faucet body 102 senses an object in the sensing area and can generate a signal to activate a continuous water flow for continuous water usage or filling a container.

Figure 8:
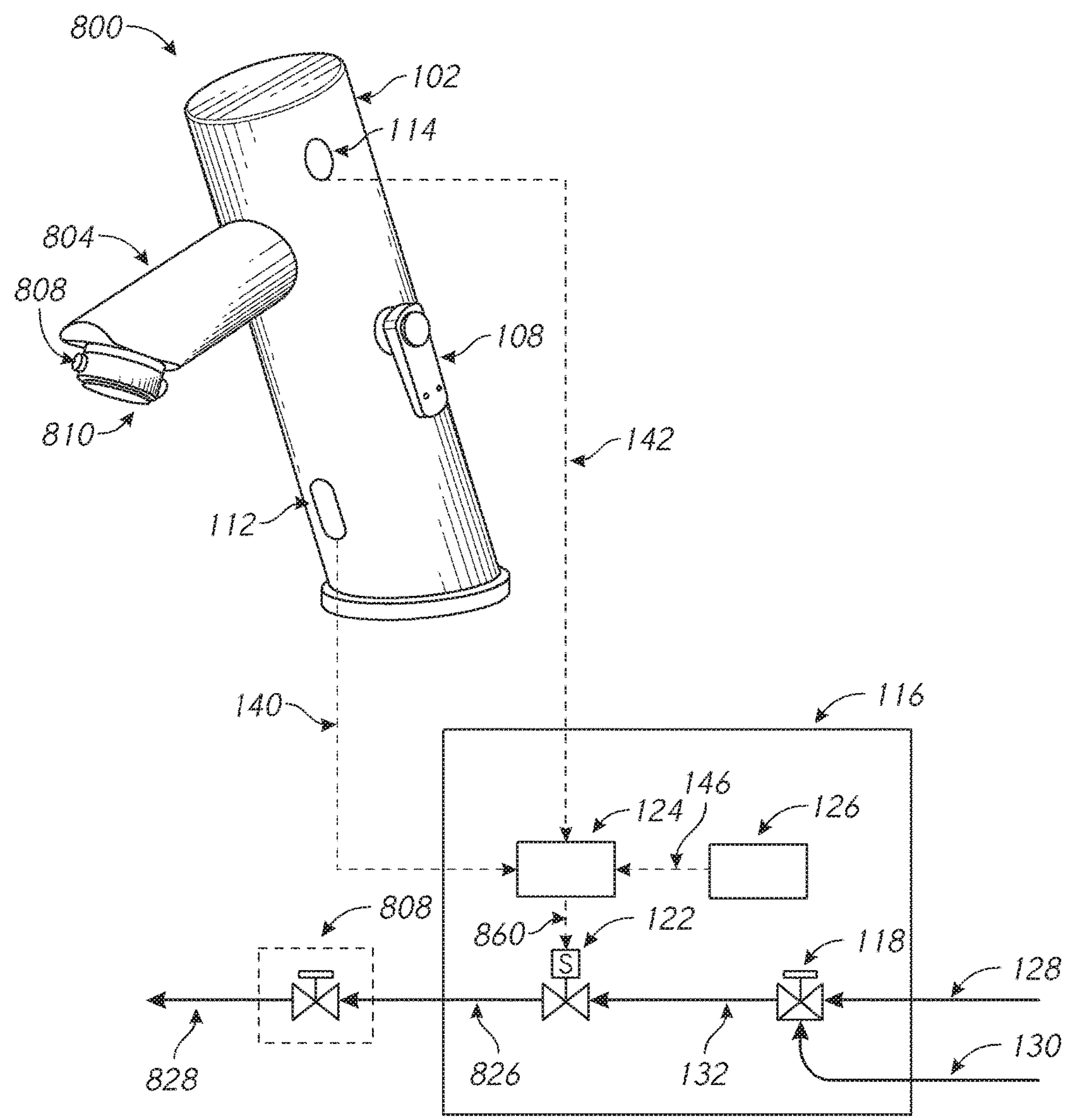
FIG. 8 illustrates an embodiment of a hybrid faucet with a flow control valve configured to be positioned proximate the spout of the hybrid faucet.

FIG. 8 illustrates an embodiment of a hybrid faucet 800 with an aerator control. The faucet system 800 includes a faucet body 102, an electronic primary water flow sensor (usually infrared sensor IR 112), an electronic continuous water flow sensor (usually infrared sensor IR 114), a water temperature adjustment knob 108, a faucet water control valve assembly 116, and a mechanical water flow control valve 808. In some embodiments, the control valve 808 controls water and the knob 108 controls flow. The faucet water control valve assembly 116 includes a mechanical water temperature control valve 118 to control water flow ratio of cold water inlet 128 and hot water inlet 130 to be mixed to user's desired water temperature, an electronic control valve such as solenoid valve 122, a logic processor 124, a power supply package 126, and/or any combination or sub-combination of the above components. For example, the faucet 800 may not include an electronic control valve 122. The logic processor 124 receives an input signal 140 from an electronic primary water flow sensor 112 to start an intermittent water flow and an input signal 142 from electronic continuous water sensor 114 to start a continuous water flow and outputs a signal 860 to an electronic water flow control valve (solenoid valve 122) to tog on/off the mixed water flow 132 to faucet spout 804. The mixed water flow 826 from the electronic control valve 122 can flow through a mechanical water flow control valve 808 and an aerator 810. The electronic continuous flow sensor 114 can be located on either side of the faucet body 102 or on the top of faucet body 102. The primary water flow sensor 112 can face the spout aerator direction to sense objects or hands in the electronic sensing area of sink to tog on/off water flow.

In one embodiment of the invention, the flow control valve can maintain a minimum opening to keep a minimum water flow such the user can know the status of the electronic water flow control valve (solenoid valve).

Figure 9A:
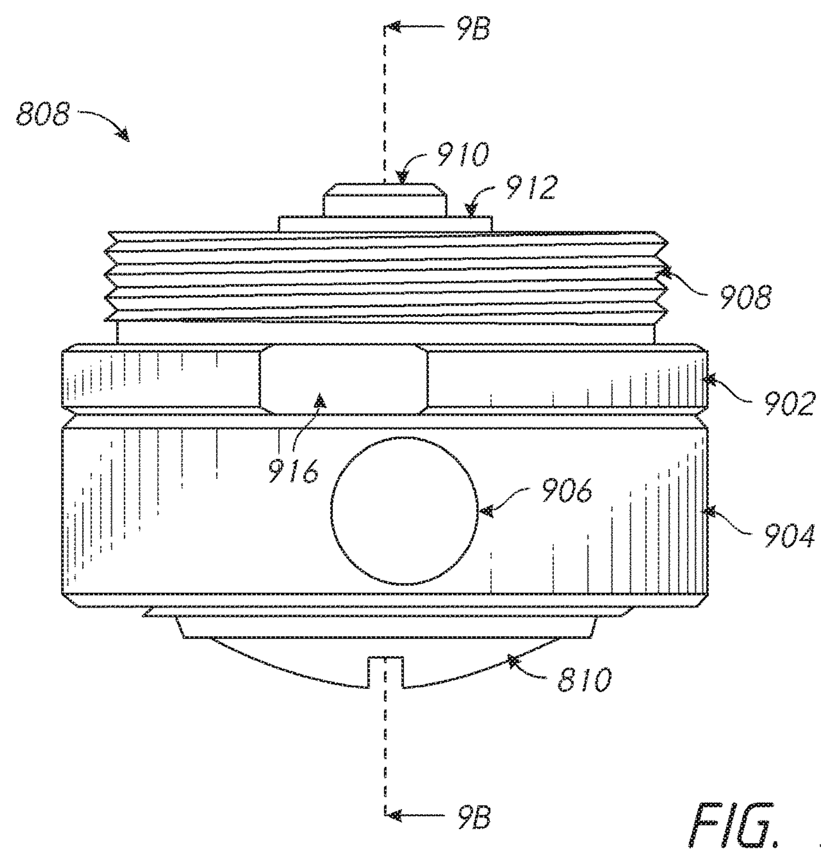
FIG. 9A illustrates a front view of the water flow control valve shown in FIG. 8.

FIG. 9A illustrates an embodiment of the water flow control valve 808 of FIG. 8. The water flow control valve 808 can includes a valve body 902 with thread 908 to thread into the spout, a valve handle 904 with knob 906 to adjust water flow. An aerator 810 can also be included in the valve handle 904. The valve 808 can include one or more cuts 916 on the valve body 902 to fasten the valve body 902 on to the spout. The valve 808 can also include a valve shaft 910 and a retaining clip 912.

Figure 9B:
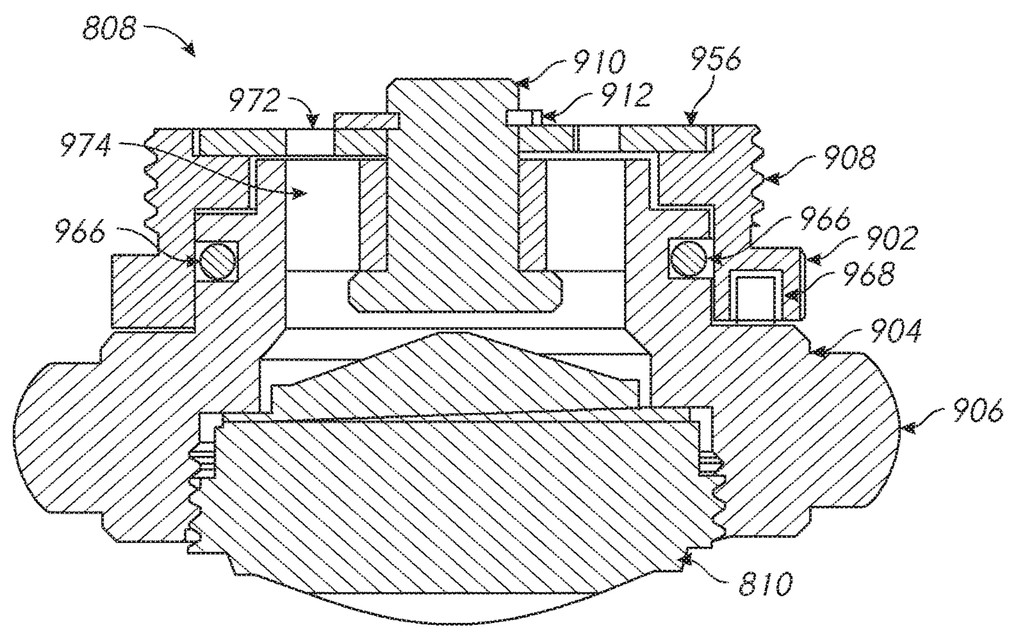
FIG. 9B illustrates a cross section view of the water flow control valve of FIG. 8 along the cut plane A-A.

FIG. 9B illustrates a cross section view of the water flow control valve 808. As discussed above, the water flow control valve 808 includes a valve body 902 with thread 908 to be fastened into spout. A water flow control disk 956 with openings 972 to adjust water flow may be attached on the valve body 902. In some embodiments, as illustrated, the flow control disk 956 includes two openings 972. The disk 956 can include 1, 3, 4, 5, 6, 7, or some other number of openings 972 according to the application needs. A valve handle 904 with knobs 906 can be fastened to the valve body 902 with a valve shaft 910 and a retaining clip 912. The valve handle 904 can include 1, 3, 4, 5, 6, or some other number of knobs 906 to provide tactile engagement for turning the handle 904. As illustrated, in some embodiments, the handle 904 includes 2 knobs 906.

Water flow may be adjusted as it flows through the gap between the opening 972 of the water flow control disk 956 and the opening 974 of the valve handle 904. For example, the openings 972 can have a generally arcuate shape with varying radial width (e.g., with respect to a rotational axis of the handle 904) along the arcuate lengths of the openings 972. Rotation of the valve handle 904 can change the positions of the openings 974 along the arcuate lengths of the openings 972. Changing the relative positions between the openings 974 and the openings 972 can change the size of the gaps between the openings 972, 974 to change the water flow rate through the control valve 808. Adjusting the water flow rate through the valve 808 can permit the user to conserve water, to customize the flow shape out of the aerator 810, and/or to otherwise customize the water flow through the flow control valve 808. An O-ring 966 between the valve body 904 and valve handle 962 can inhibit or prevent water from leaking. A valve rotation angle set pin 968 can control the rotation angle of the valve handle 904 and valve body 902 (e.g., to prevent complete closure of the gap between the openings 972, 974).

Figure 10:
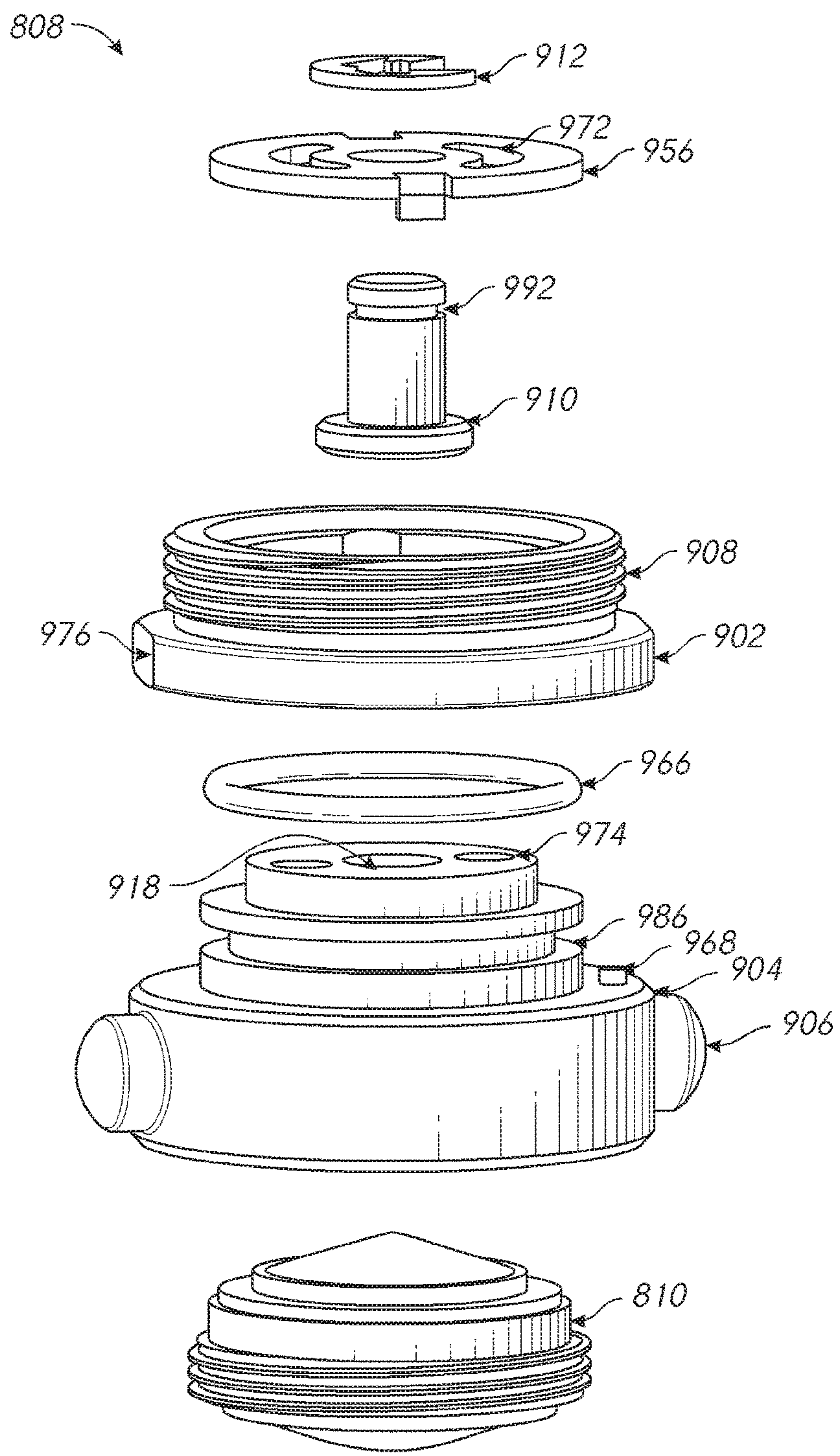
FIG. 10 illustrates an exploded view of the water flow control valve of FIG. 8.

FIG. 10 illustrates an exploded view of the embodiment of water flow control valve 808. The illustrated embodiment shows a water flow control disk 956 with openings 974 to adjust water flow attached on the valve body 902. A valve handle 904 with knobs 906 is fastened to the valve body 902 with a valve shaft 910 and retaining clip 912 sized and shaped to fit into a clip channel 992 of the valve shaft 910. Water flow can be adjusted through the gap between the opening 972 of the water flow control disk 956 and the opening 974 of the valve handle 904. A valve shaft hole 918 on the valve handle 904 can be included for the valve shaft 910 to fasten the valve handle 904 to the valve body 902. Cuts 976 on the valve body 902 may assist in installation of the flow control valve 808 on the spout. An O-ring 966 and the O-ring groove 986 on the valve handle 904 may seal the water leaking between the valve body 902 and valve handle 904. The valve rotation angle set pin 968 can control the rotation angle of the valve handle 904 and valve body 902. An aerator 810 is attached on the valve handle 904.

Figure 10A:
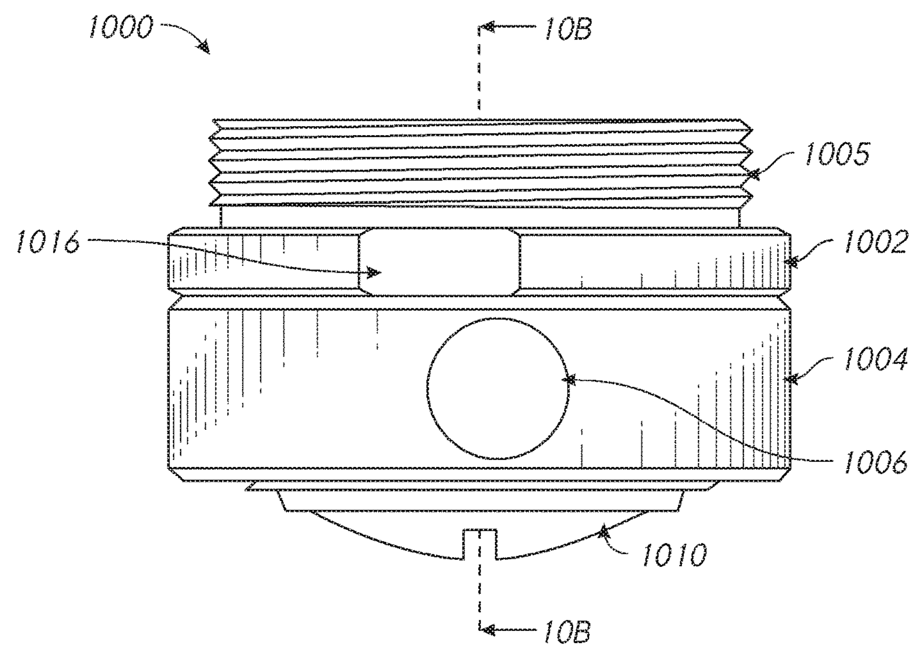
FIG. 10A illustrates a front view of another embodiment of a water flow control valve.
Figure 10B:
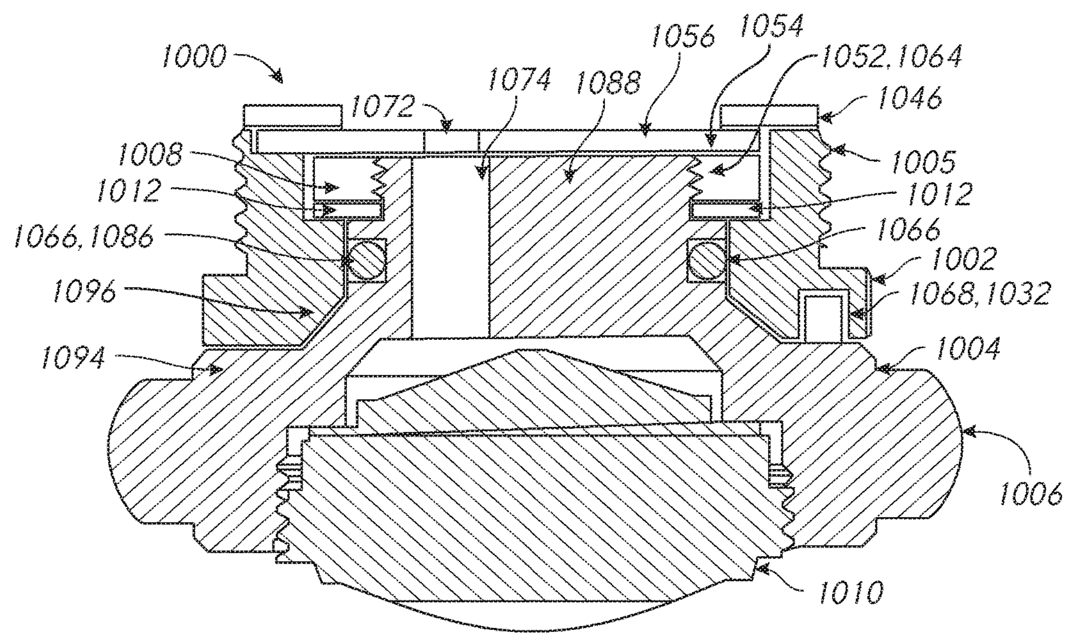
FIG. 10B illustrates a cross section view of the water flow control valve of FIG. 10A along the cut plane B-B.
Figure 10C:
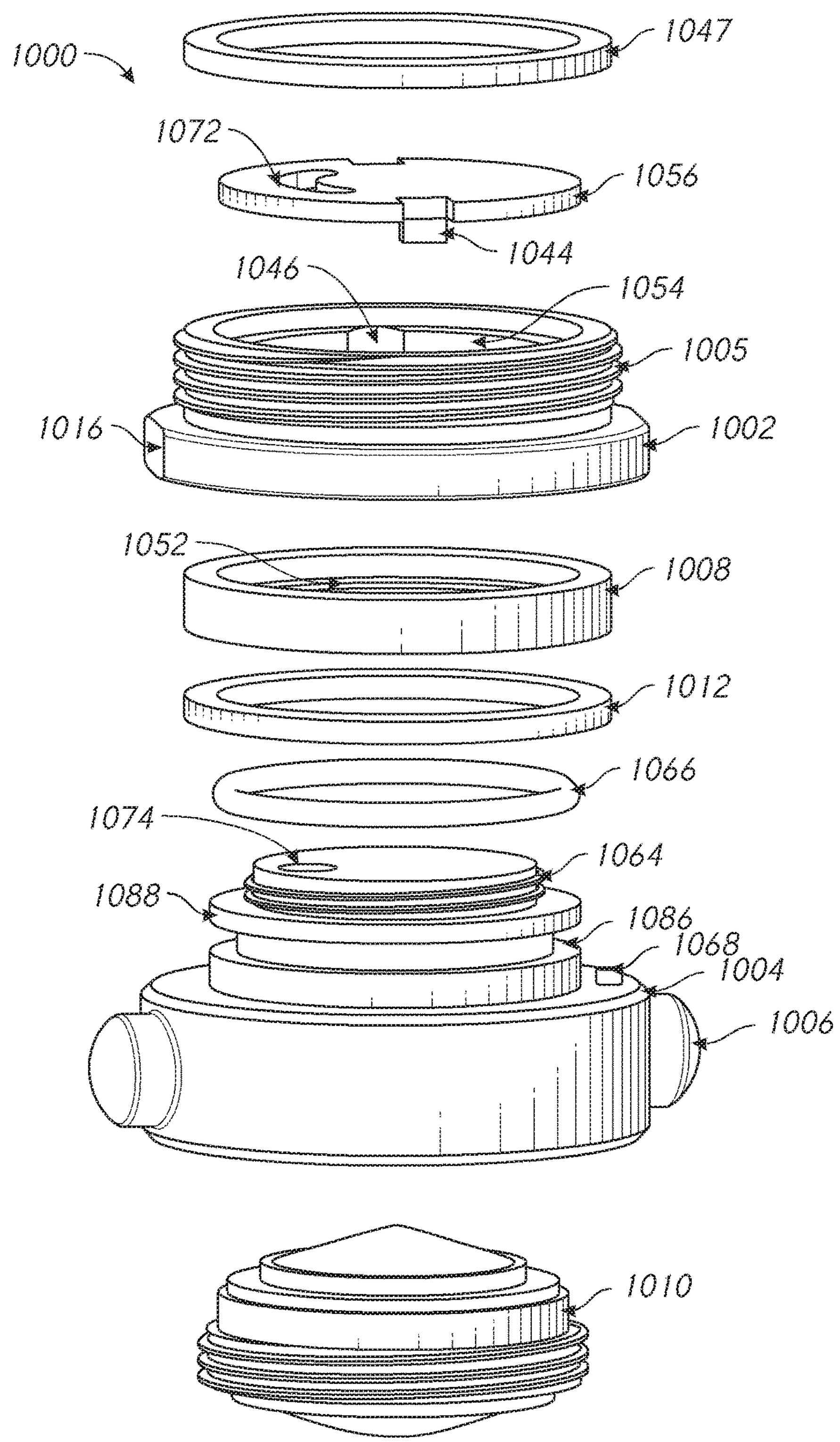
FIG. 10C illustrates an exploded view of the water flow control valve of FIG. 10A.

FIGS. 10A-10C illustrate an embodiment of a flow control valve 1000. The flow control valve 1000 shares some features and advantages with the flow control valve 900 (e.g., the use of an aerator 1010 and a valve handle 1004, water flow and shape adjustment, water conservation, etc.). The flow control valve 1000 can include valve body 1002. The valve body 1002 can be configured to connect to the spout of a sink (e.g., spout 804 of FIG. 8) via threaded engagement of threads 1005 and/or via some other connection method or mechanism (e.g., adhesives, welding, frictional engagement, fasteners, etc.).

The valve body 1002 can include a cavity 1054 in which one or more valve components may be housed. For example, a locking nut 1008 can be housed within the cavity 1054. The nut 1008 can have an outer diameter that is less than or equal to an inner diameter of the cavity 1054. The nut 1008 can include threading 1052 on an interior diameter of the nut 1008. In some embodiments, the valve 1000 includes a washer 1012 positioned between the nut 1008 and the valve body 1002.

The flow control valve 1000 can include a valve handle 1004. The valve handle 1004 can include a mating portion 1088. The mating portion 1088 can be configured to facilitate connection between the valve handle 1004 and the valve body 1002. For example, in some embodiments, the mating portion 1088 includes a threaded portion 1064 configured to threadedly engage with the threading 1052 of the locking nut 1008 within the cavity 1054 of the valve body 1002. Engagement between the mating portion 1088 and the lock nut 1008 can inhibit or prevent accidental removal of the valve handle 1004 from the valve body 1002. In some embodiments, the lock nut 1008 and/or valve handle 1004 are configured to rotate freely with respect to the valve body 1002 without disengagement between the lock nut 1008 and the valve handle 1004. Engagement and/or interference between a widened portion 1094 of the valve handle 1004 and a shoulder 1096 of the valve body 1002 can limit movement of the mating portion 1088 into the cavity 1054 of the valve body 1002. In some embodiments, the valve handle 1004 includes an O-ring channel 1086 in which an O-ring can be positioned to inhibit leakage of water or other fluids between the valve body 1002 and the valve handle 1004.

In some embodiments, the flow control valve 1000 includes a top plate 1056. The top plate 1056 can include one or more apertures 1072 through the plate 1056. For example, the plate 1056 can include a single aperture 1072, as illustrated. In some embodiments, the plate 1056 includes 2, 3, 4, or more apertures 1072. The apertures 1072 can have a varying radial width (e.g., with respect to an axial centerline of the valve 1000) along an arc length of the apertures 1072. In some embodiments, the top plate 1056 includes one or more tabs 1044. The tabs 1044 can be configured to facilitate fixed or releasable engagement between the top plate 1056 and the valve body 1002. For example, the tab 1044 can be configured to deflect when transitioned into engagement with a tab slot 1046 of the valve body 1002 (e.g., a tab slot 1046 on the inner diameter of the cavity 1054 of the valve body 1002). The tab 1044 can return to an undeflected or less deflected state upon mating of a portion of the tab 1044 (e.g., a tooth on the end of the tab 1044) with a portion of the valve body 1002. In some embodiments, engagement between the tab 1044 and the tab slot 1046 can inhibit or prevent rotation of the top plate 1056 with respect to the valve body 1002.

The valve handle 1004 can include a handle aperture 1074 through the valve handle 1004. Upon assembly of the control valve 1000, the handle aperture 1074 can be at least partially aligned with the aperture 1072 of the plate 1056 to facilitate fluid communication between a water source upstream of the plate 1056 and an aerator 1010 or other outlet structure (e.g., an opening) of the flow control valve 1000. The aerator 1010 can be a conventional faucet aerator. For example, the aerator 1010 can have multi-hole nozzle (not shown) extending through a thickness of the aerator 1010 to add air to water passing through the aerator 1010. Rotation of the valve handle 1004 with respect to the valve body 1002 and top plate 1056 can increase or decrease the size of the overlap between the aperture 1072 of the top plate 1056 and the handle aperture 1074. Changing the overlap size between the aperture 1072, 1074 can increase or decrease the flow rate of water through the flow control valve 1000. In some embodiments, the valve handle 1004 includes one or more tactile features (e.g., knobs 1006) to facilitate rotation of the valve handle 1004 with respect to the valve body 1002.

The handle 1004 and/or the valve body 1002 can include rotation-limiting structures. For example, the valve handle 1004 can include a pin 1068 or other protrusion configured to fit within an arcuate channel 1032 of the valve body 1002. Interference between the pin 1068 and channel 1032 can limit rotation of the valve handle 1004 with respect to the valve body 1002 (e.g., a 30 degree arc length of the channel 1032 could limit rotation of the valve handle 1004 to a 30 degree range). Limiting the range of rotation between the valve handle 1004 and the valve body 1002 can reduce the likelihood of inadvertent shut-off of the control valve 1000 via complete misalignment of the apertures 1072, 1074. In some embodiments, the valve 1000 includes a washer 1047 between the top plate 1056/valve body 1002 and the spout to which the valve 1000 is mated.

Figures 11A, 11B:
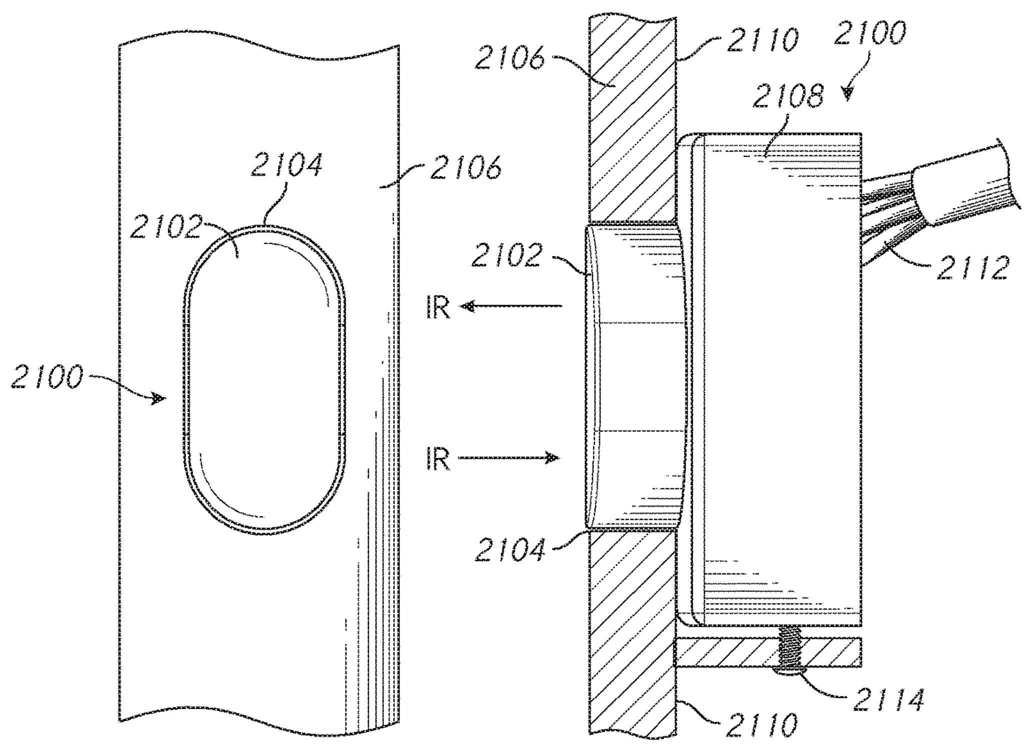
FIGS. 11A and 11B illustrate front and side views, respectively, of an embodiment of a sensor that can be installed from inside out through a receiving hole of a faucet.
Figure 12:
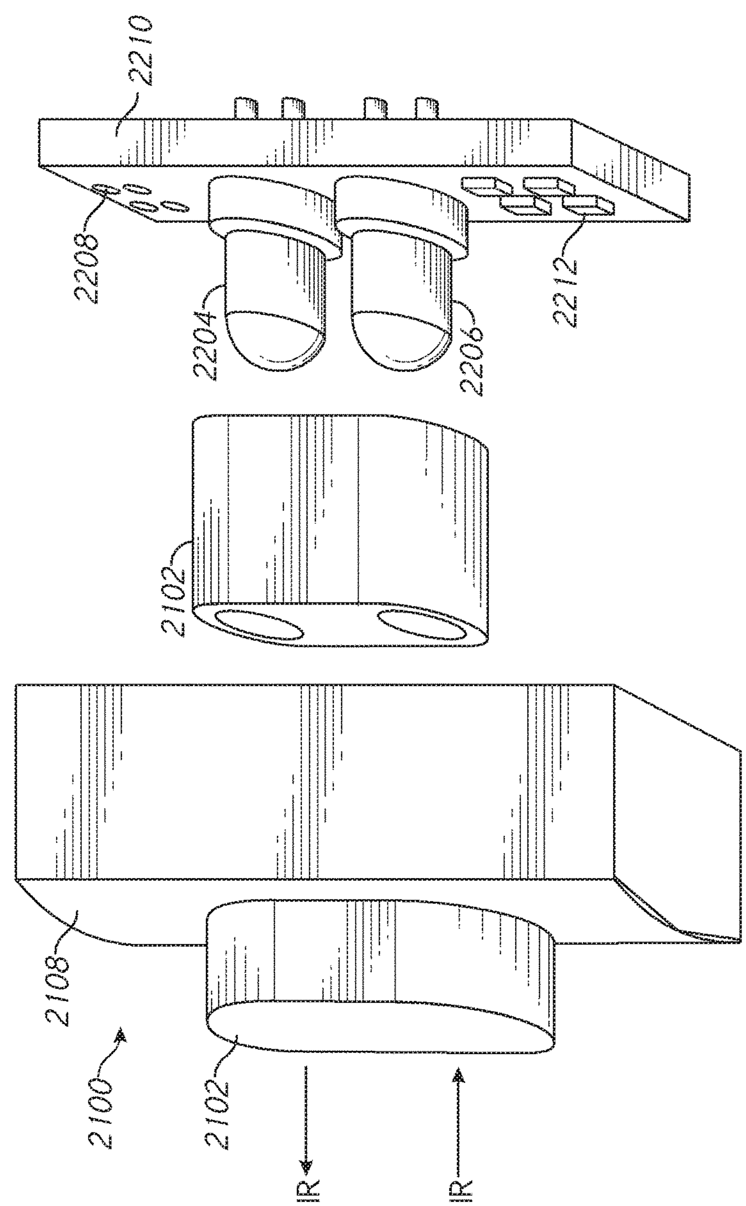
FIG. 12 illustrates an exploded view of an embodiment of a sensor that can be installed from inside out through a receiving hole of a faucet.

FIGS. 11 and 12 illustrate a sensor from the prior art that is installed inside out and through the interior of a faucet. As discussed above, such a sensor can be used instead of or in addition to the sensors described above with respect to FIGS. 1-10. FIG. 11A illustrates a front view of a sensor 2100 including a lens 2102 assembled within a receiving hole 2104 of the faucet 2106. FIG. 11B illustrates a side view of the sensor 2100 mounted to the faucet 2106. The sensor 2100 can include a sensor cover 2108 and a lens 2102. Wires 2112 can connect the electronic components of the sensor to a logic processor (not shown). The logic processor can receive and analyze input signals and accordingly control an operation of the faucet. In the illustrated embodiment, the size of the sensor cover 2108 is greater than the size of the receiving hole 2104. Accordingly, the sensor 2100 was mounted through the interior of the faucet. The sensor is secured internally with the inner wall 2110 via a screw 2114.

FIG. 12 illustrates an exploded view of the sensor 2100 described above with respect to FIG. 11. The sensor can include a sleeve 2202 to reduce noise by separating the emitter 2204 from the detector 2206 with a partition. Typically, the base of the emitter 2204 and the detector 2206 lie adjacent to the surface of the electronic circuit board 2210. As shown, the electronic circuit elements (or electronic components) 2212 can be mounted on the electronic circuit board 2210 alongside the emitter 2204 and the detector 2206. The electronic components 2212 can include, for example, capacitors, resistors, transistors, inductors, integrated circuits (IC) and the like. The wire connectors 2208 can enable physical and electrical connection of wires between the electronic circuit board 2206 and the logic processor. Wires can be soldered on to the electronic circuit board 2210 at the wire connectors 2208 or clipped on to the electronic circuit board 2210. The electronic components 2212 might be placed on both sides of the electronic circuit board 2210. The electronic components 2212 can also be soldered on to the electronic circuit board 2206. Valuable space on the surface of the board is occupied by the emitter 2204 and the detector 2206 such that the board must be sized larger than the emitter and detector to accommodate the necessary electronic components.

Figure 13:
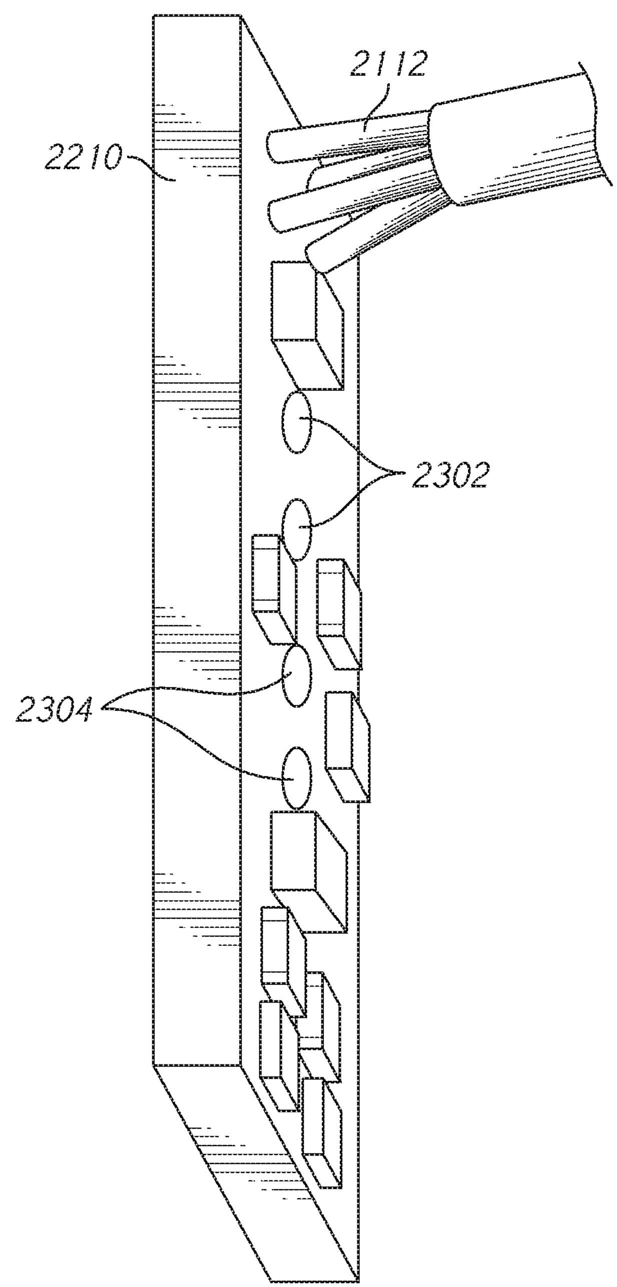
FIG. 13 illustrates a bottom perspective view of an embodiment of an electronic circuit board.

FIG. 13 illustrates a perspective bottom view of an embodiment of an electronic circuit board 2210 where the electronic components are mounted on both the top and bottom surfaces. The electronic circuit board 2210 can include emitter installation holes 2302, detector installation holes 2304, and wire connectors or wires 2112 to enable power supply and signal communication.

As described above, inserting the sensor inside out from the interior of an assembly, such as a faucet, can be challenging and time consuming. Thus, it may be beneficial to assemble the sensor from outside in through a receiving hole of a faucet. There are, however, other constraints for installing the sensor outside in through the receiving hole of a faucet. The receiving hole may have size restrictions, for example, due to aesthetics, lack of space, or performance reliability. Performance may be compromised by increasing the size of the receiving hole. For instance, if the sensor area is too large, the user may not be able to identify the optimal detection area. Due to the size restrictions on the receiving hole, the sensor size including the size of the electronic circuit board may need to be reduced to fit through the receiving hole. However, reducing the dimensions of the electronic circuit board can result in not enough surface area for mounting electronic components. Miniaturization of the electronic components may also not be feasible due to performance and cost restrictions. Thus, inserting a sensor from outside in through a wall of the faucet may require balancing the size restriction of the receiving hole with the necessary surface area needed for mounting the electronic components on the electronic circuit board.

This disclosure describes embodiments of a sensor including an electronic circuit board that can be inserted outside in from the exterior wall of a faucet through a receiving hole. The features of the sensor assembly and methods described herein can also be implemented in other systems and devices with similar size restrictions.

Figure 14:
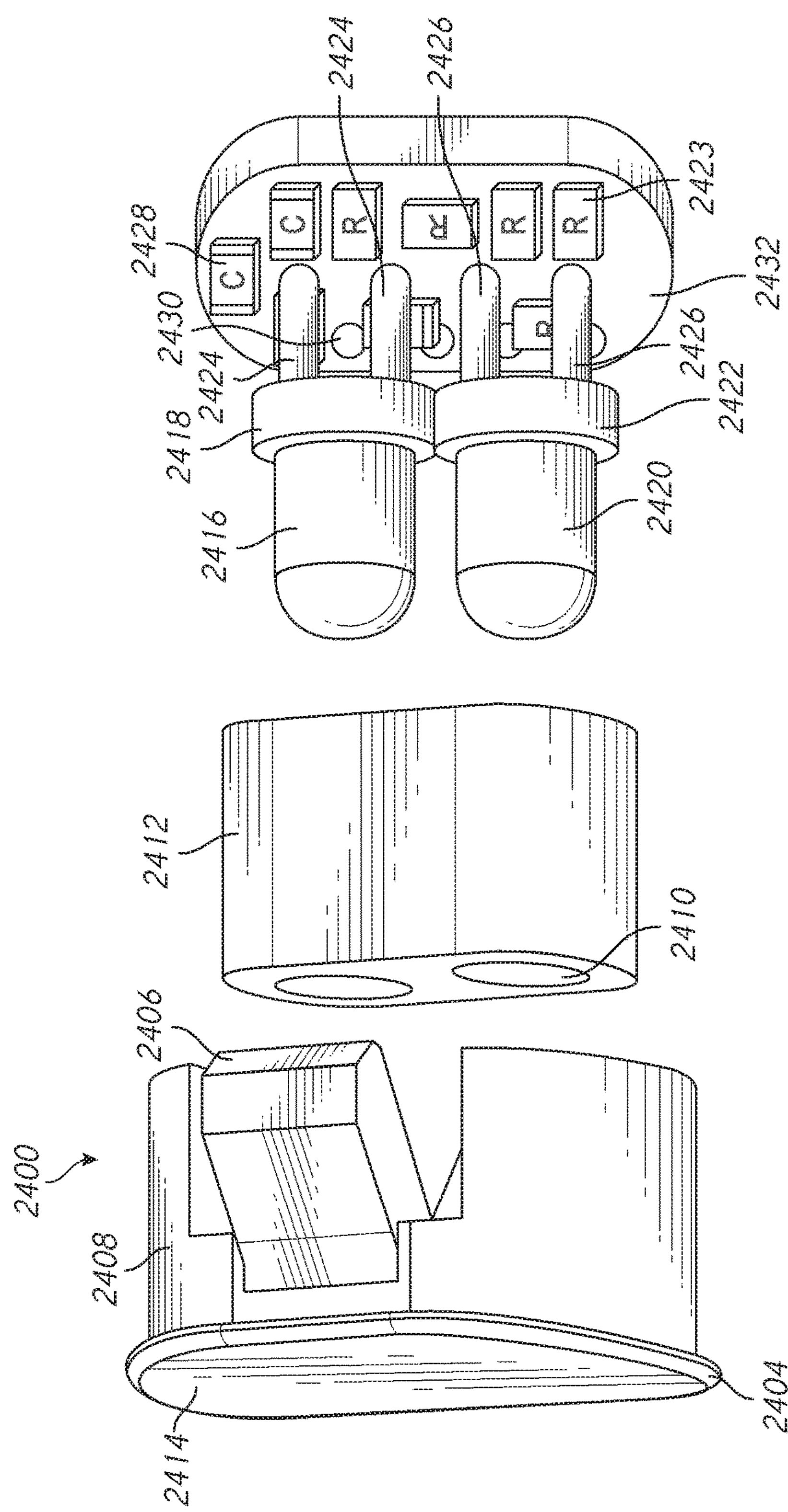
FIG. 14 illustrates an exploded view of an embodiment of a sensor that can be installed from outside in through a receiving hole of an assembly.

FIG. 14 illustrates an exploded view of a sensor 2400 that can be mounted to the faucet from outside in through a receiving hole. The sensor 2400 includes a lens 2414 that can be attached to a cover 2408. In some embodiments, the lens 2414 and the cover 2408 are formed of the same material in the same step. In other embodiments, the lens 2414 is separately formed from the cover 2408 and later coupled together. In some embodiments, the lens 2414 is a different material than the cover to take advantage of differing properties.

In some embodiments, the lens 2414 can be secured to the outside wall of the faucet. The cover 2408 can include a securing module 2406 to mount the sensor 2400 in position with the faucet. The securing module 2406 can be an expandable clip as shown in FIG. 14. In other embodiments, the sensor can be secured with a retaining structure that is affixed to the inner wall of the faucet. In yet other embodiments, the sensor can be installed outside in and secured with a snug fit receiving hole, a gasket, glue, adhesive agent, and/or clips. The sensor can also include a sleeve 2412 that provides a barrier or a partition between the emitter 2416 and the detector 2420 to reduce noise. The detector and emitter can fit within holes 2410 of the sleeve 2412 which can also help stabilize the detector and the emitter. The sensor 2400 can also include a rim or a flange 2404. The rim 2404 can be an extension of the cover 2408 or the lens 2414 or a separate component that can be attached to the cover 2408. The flange 2404 can be larger than the receiving hole to prevent the sensor from falling inside the faucet while the securing module 2406 can work in conjunction with the flange 2404 to prevent the sensor from falling out of the faucet. The flange 2404 can be mounted flush with the faucet body as shown in FIG. 15B. The sensor can also include further securing attachments to hold the sleeve and the electronic circuit board 2432 in place. The sensor components may also be secured with glue or other adhesive agents.

FIG. 14 further illustrates an embodiment of an electronic circuit board 2432 that can be used with a sensor 2400 installed outside in through a receiving hole. The dimensions of the electronic circuit board 2432 are such that the electronic circuit board 2432 can fit through the receiving hole. In some embodiments, the dimensions of the electronic circuit board 2432 are substantially the same as the dimension of the receiving hole. In other embodiments, the dimensions of the electronic circuit board 2432 are smaller than the dimensions of the receiving hole. In yet another embodiment, the dimensions of the electronic circuit board 2432 are smaller than the dimensions of the sensor cover. The electronic circuit board 2432 can be secured to the sensor cover 408. In some embodiments, the electronic circuit board 2432 can be secured directly to the faucet. As described above, when the size of the electronic circuit board 2432 is reduced to make it fit through the receiving hole, the smaller size can result in a limited space for mounting the electronic components 2428 (e.g. capacitors, resistors, emitters, detectors, LEDs, ICs etc.). There may also not be enough room for the wire connecting holes 2430.

As shown in the illustrated embodiment in FIG. 14, to increase available surface area on the electronic circuit board 2432, the emitter 2416 and the detector 2420 can be elevated from the surface of the electronic circuit board 2432. Accordingly, the space taken by the base 2422 of the detector 2420 and the base 2418 of the emitter 2416 can be used for other electronic components. In some embodiments, the emitters and detectors are mounted at a distance away from the surface of the electronic circuit board 2432 with the use of one or more legs (or stilts) 2424 and 2426. The height of the legs may depend on the size of the electronic components 2428. The legs may provide both structural and electrical connection for the emitters and detectors to the electronic circuit board 2432. In some embodiments, the legs may include female connectors for receiving emitters and detectors. The legs may be a separate unit or built-in as part of the emitters and detectors. Separate leg units may provide more stability in certain embodiments than using built-in legs for the emitters and detectors. However, in some embodiments of the sensor 2400, emitters and detectors with stock built-in legs can also be used to mount the emitter and the detector at a distance away from the surface of the circuit board 2432. In some embodiments, the legs 2424, 2426 are attached to the electronic circuit board 2432 via one or more hinged connections. In some such embodiments, the circuit board 2432 can be inserted through the receiving hole while rotated with respect to (e.g., non-perpendicular with respect to) the legs 2424, 2426. In some such embodiments, one or more dimensions of the circuit board 2432 can be the same as or larger than the corresponding dimensions of the receiving hole while permitting insertion of the rotated circuit board 2432 through the receiving hole.

Figure 15A:
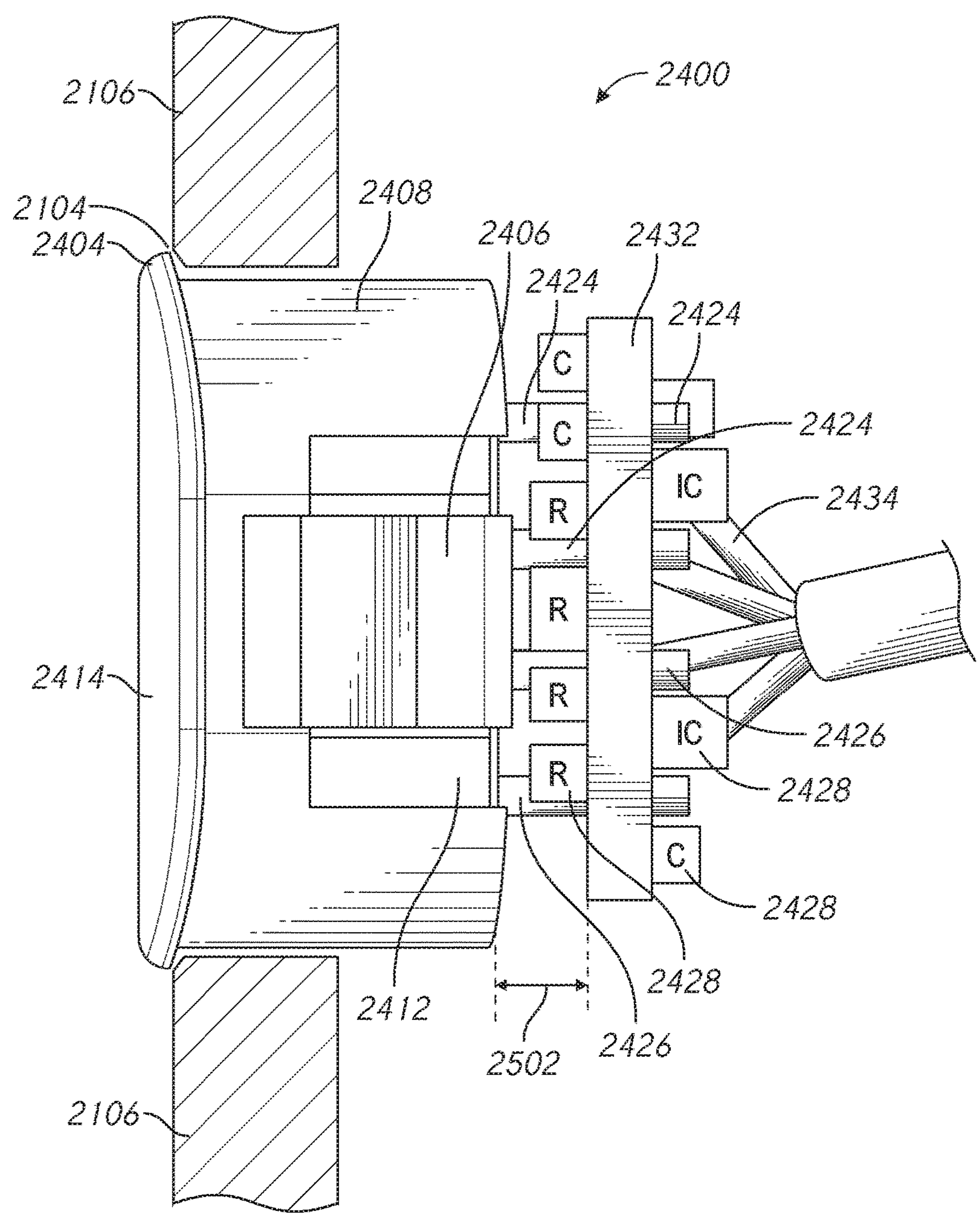
FIGS. 15A-B illustrate a side view of an embodiment of a sensor that was installed from outside in through a receiving hole of as assembly, for example, a faucet.
Figure 15B:
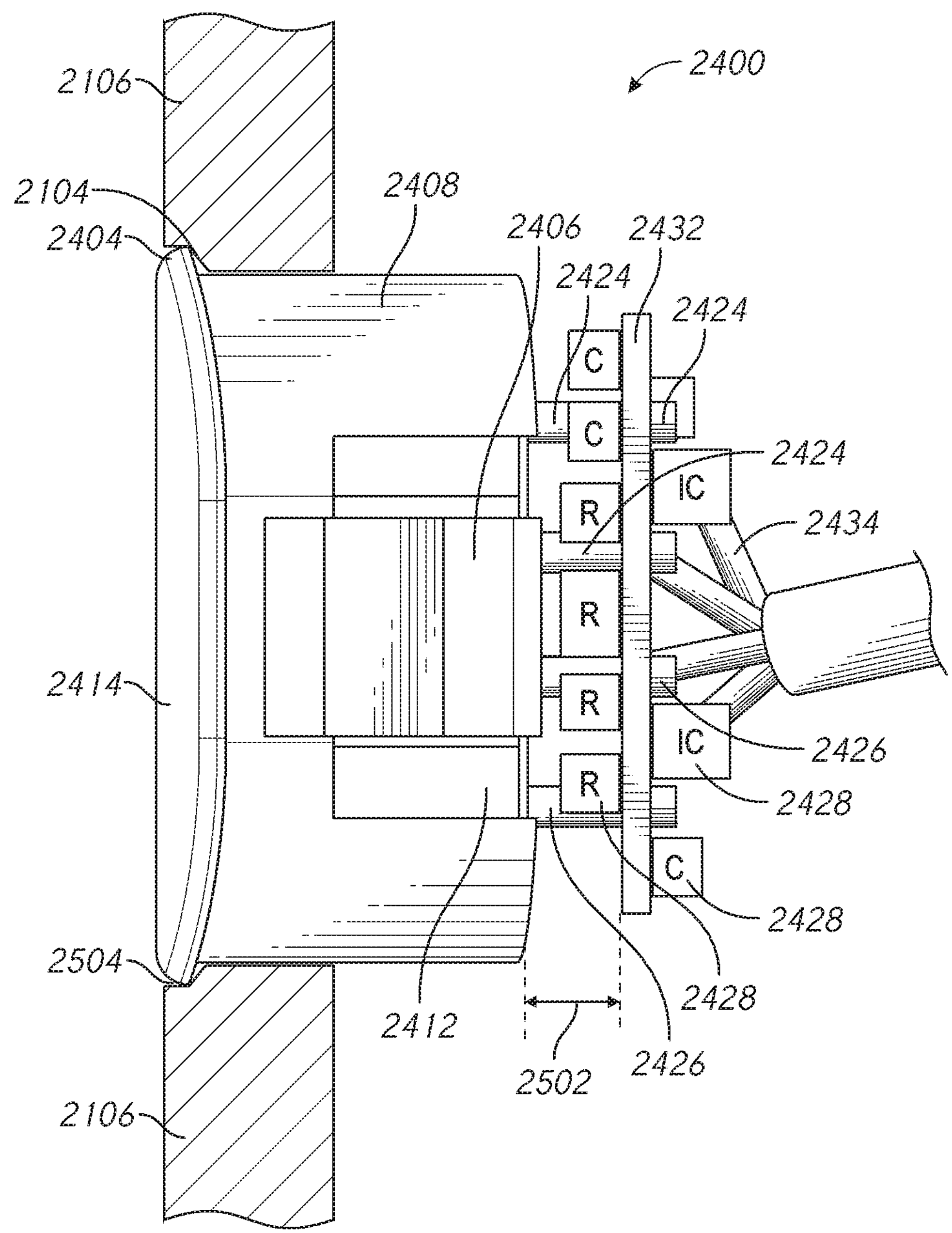

FIG. 15A illustrates a side view of an embodiment of a sensor 2400 installed outside in through the receiving hole 2104 of a faucet wall 2106. As shown, the rim 2404 of the sensor 2400 can rest against the edge of the receiving hole 2104 to prevent the sensor 2400 from falling inside the faucet or other assembly to which the sensor is mounted. For example, the sensor could be mounted into a housing that is separate from a faucet so as to more effectively position the sensors relative to the water flow section of the faucet and the water receiving basin. The sensor 2400 can include a securing module 2406 to prevent the sensor from falling out of the faucet and secure the sensor 2400 in a substantially fixed position with respect to a wall 2106. The securing module 2406 can include a retaining clip which can expand after insertion of the sensor 2400 in the receiving hole 2104. In some embodiments, including the illustrated embodiment, the sensor can include two securing modules 2406 on opposite sides for securing the sensor 2400. In some embodiments, one, or three or more securing modules 2406 can be used to secure the sensor 2400. The legs 2424 and 2426 can create a distance 2502 between the surface of the electronic circuit board 2432 and the emitter and detector. Accordingly, the base of the detector and emitter can be on a separate plane from the surface of the electronic circuit board 2432. FIG. 15 further shows electronic components 2428 (e.g. capacitors, resistors, and ICs) mounted on both the top and bottom of the electronic circuit board 2432 and in between the legs 2424, 2426 of the emitter and the detector. Thus, the surface area typically occupied by the bases 2418, 2422 of the emitter 2416 and the detector 2420 is occupied by the necessary electronic components, allowing an overall reduction of the surface board space to fit within the necessary restraints to allow outside in insertion through the receiving hole 2104 of the wall 2106.

FIG. 15B illustrates a side view of an embodiment of a sensor 2400 installed outside in through the receiving hole 2104 of a wall 2106 with the rim 2404 mounted flush with the surface 2504 of the faucet wall 2106.

Other ways may be incorporated to meet the surface area demands of these sensors while still permitting outside in insertion of the sensor assembly through a receiving hole. For example, in some embodiments, the sensor 2400 can also include a multi-level electronic circuit board (not shown) to increase surface area. For example, the emitters and detectors can be installed on a higher level while the electronic components can be installed in the lower levels. The back side of the higher level can also be used for electronic components. In another embodiment, the sensor 2400 can include a flexible electronic circuit board (not shown). Flexible electronic circuit boards can be bent so that the electronic circuit board of a size larger than the receiving hole may be used.

Figure 16:
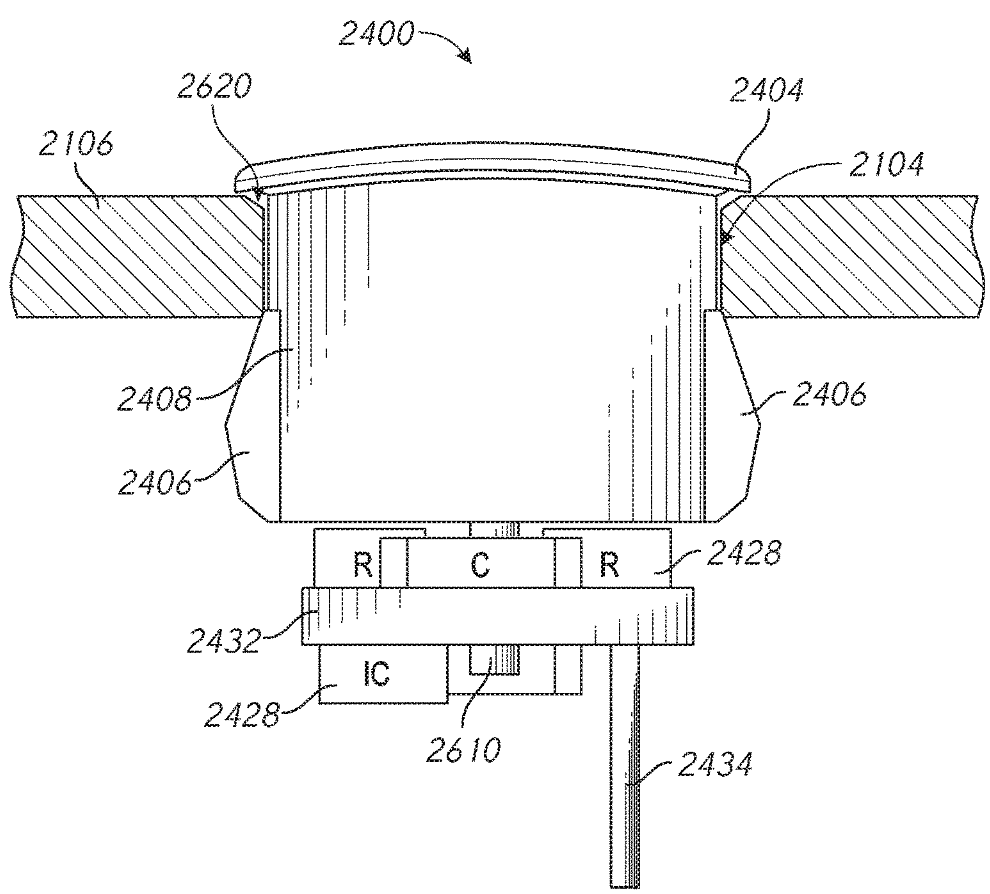
FIG. 16 illustrates a top view of an embodiment of a sensor that was installed from outside in through a receiving hole of an assembly.

FIG. 16 illustrates a top view of an embodiment of a sensor 2400 that can be inserted from outside in through a receiving hole 2104. The securing modules 2406 are shown in the expanded position. The edge or rim 2404 of the sensor can sit on a groove 2620 of the receiving hole 2104. The groove 2620 of the receiving hole can be indented from the surface of the outer wall 2106 of the faucet. Thus, in some embodiments, the sensor 2400 can be mounted flush with the outer wall 2106. In an embodiment, the sensor 2400 may include a sealer opening 2610 in the sensor cover 2408. The sealer opening 2610 can be used to insert a sealer into the sensor assembly 2400. The sealer can be a type of glue that turns hard or semi-hard after injection. The sealer can be injected into the assembly to seal and fill the gap between the sensor cover, sleeve, emitter, detector, circuit board and other components of the sensor described herein. In some embodiments, the glue can secure the sensor to the faucet without needing securing modules. Wire 2434 can connect to a logic processor (not shown).

Figure 17:
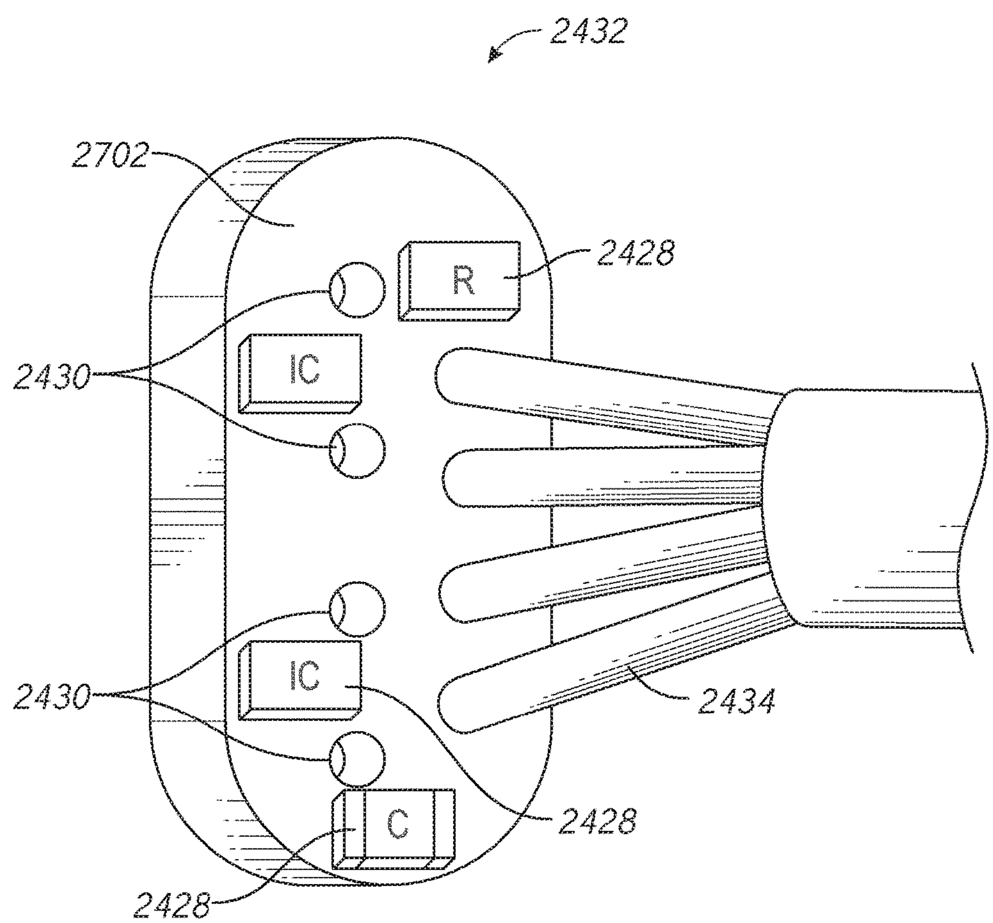
FIG. 17 illustrates a bottom perspective view of an embodiment of an electronic circuit board that can be used in a sensor installed from outside in through a receiving hole of an assembly.

FIG. 17 illustrates a bottom surface 2702 of an embodiment of an electronic circuit board 2432 with holes 2430 for receiving legs of the emitter and the detector. Wires 2434 can be soldered to connect the electronic circuit board 2432 with a logic processor.

Figure 17A:
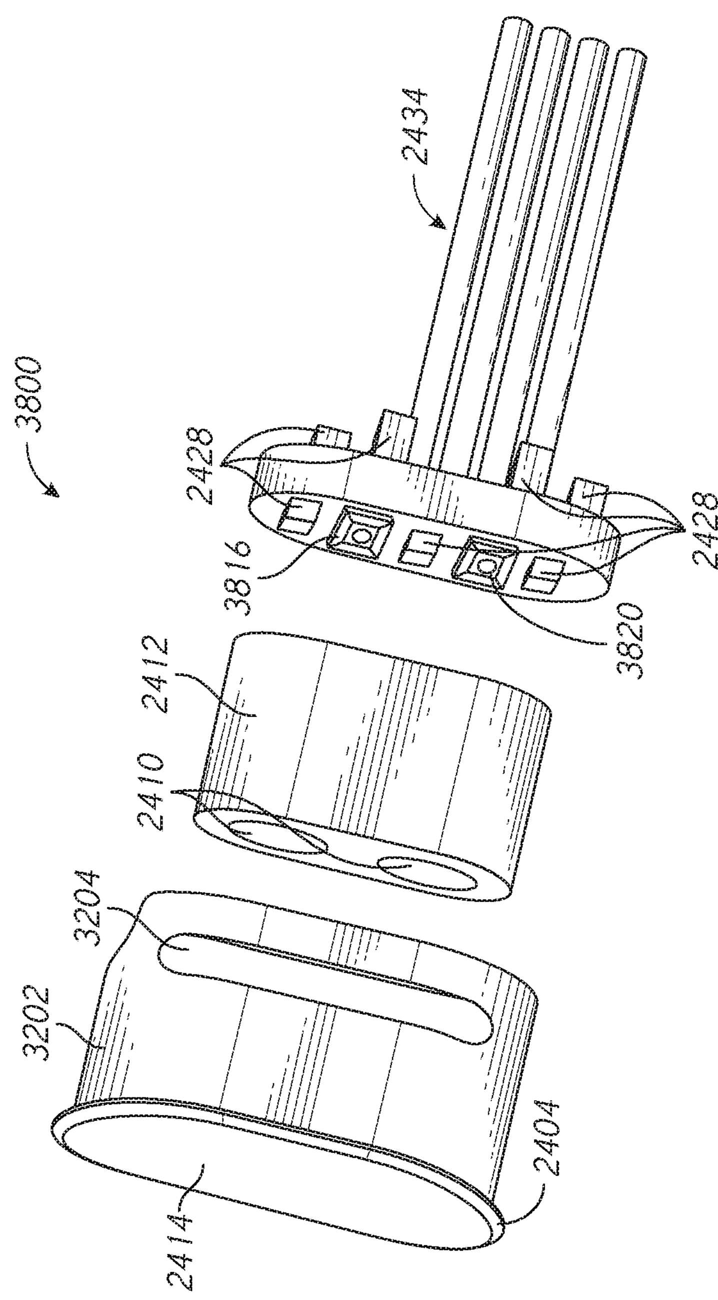
FIG. 17A illustrates an exploded view of an embodiment of a sensor that can be installed from outside in through a receiving hole of an assembly.

FIG. 17A illustrates an embodiment of a sensor 3800 wherein both the emitter 3816 and the receiver 3820 are surface-mount devices (e.g., SMDs) to facilitate easy installation and/or low cost for the sensor 3800.

FIGS. 17B-17E illustrate an embodiment of a sensor 3900 wherein the sensor electronic circuit board 3932 can be removably connected to an interconnect circuit board 3940 via a plug 3906 and socket 3907. As illustrated, the sensor 3900 can include an emitter 3916 (e.g., an infrared LED, an SMD type LED, and/or other emitter) and a receiver 3920 (e.g., an infrared LED phototransistor, an SMD type LED phototransistor, and/or other receiver). The emitter 3916 and receiver 3920 can be mounted on or otherwise connected to the sensor circuit board 3932. Additional electronic components 3928 can be attached to one or both sides of the sensor circuit board 3932 in some embodiments.

In some embodiments, the sensor 3900 includes a sensor cover 3902. The sensor cover 3902 can be sized and shaped to fit over the emitter 3916 and/or over the receiver 3920. In some embodiments, the sensor cover 3902 is sized and shaped such that at least a portion of the sensor circuit board 3932 fits within the interior of the sensor cover 3902. The sensor 3900 can include a sensor sleeve 3912. The sensor sleeve 3912 can have a plurality of apertures extending through the sensor sleeve 3912. In some embodiments, the emitter 3916 is positioned within an aperture of the sleeve 3912 separate from the receiver 3920.

The sensor 3900 can include an interconnect circuit board 3940 (e.g., a PCB). The interconnect circuit board 3940 can be housed at least partially within a circuit board housing 3936. In some embodiments, the interconnect circuit board 3940 is attached to the housing 3936 via adhesives, welding, fasteners, and/or some other attachment structure or method. The housing 3936 can be coupled to the faucet body 2016 via clips, adhesives, and/or some other structure or method. For example, the housing 3936 can be coupled to the faucet body 2016 using any of the clips 2804, 2902, 2904, 2906, 3210, 3302, 3320 described below. In some embodiments, the housing 3936 is positioned (e.g., wedged) against the faucet body 2016 via a rubber block. The interconnect circuit board 3940 can include one or more sockets 3907. The sockets 3907 can include one or more recesses or slots.

In some embodiments, the interconnect circuit board 3940 is configured to facilitate electronic communication (e.g., signals, data, power) between the sensor circuit board 3932 and other components of a faucet assembly. For example, the interconnect circuit board 3940 can include one or more cable connector points 3950. The cable connector points 3950 can be configured to electronically communicate with components such as, for example, a main circuit board, a control unit, or some other component of the faucet assembly.

Figure 17B:
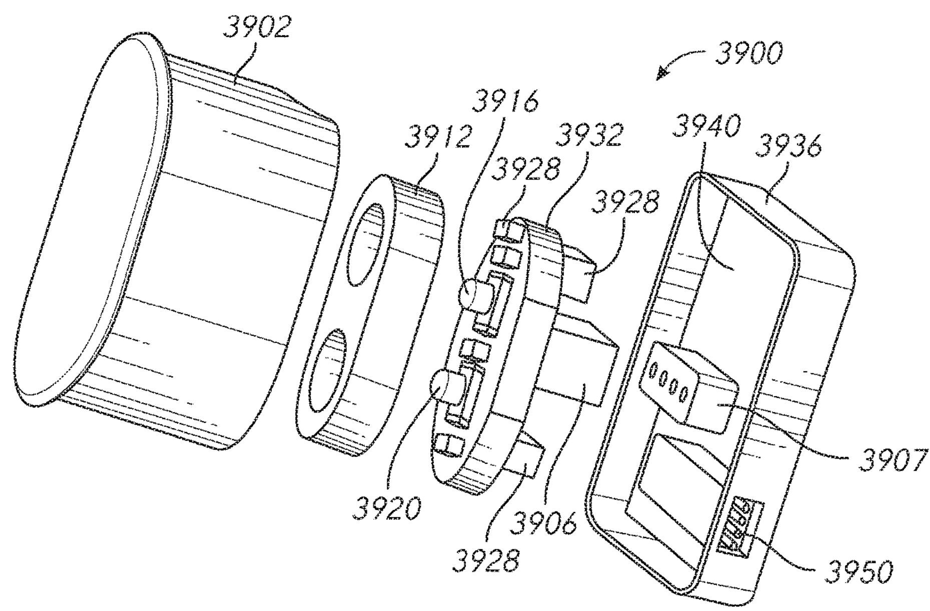
FIG. 17B illustrates a front perspective exploded view of an embodiment of a sensor that can be installed from outside in through a receiving hole of an assembly.
Figure 17C:
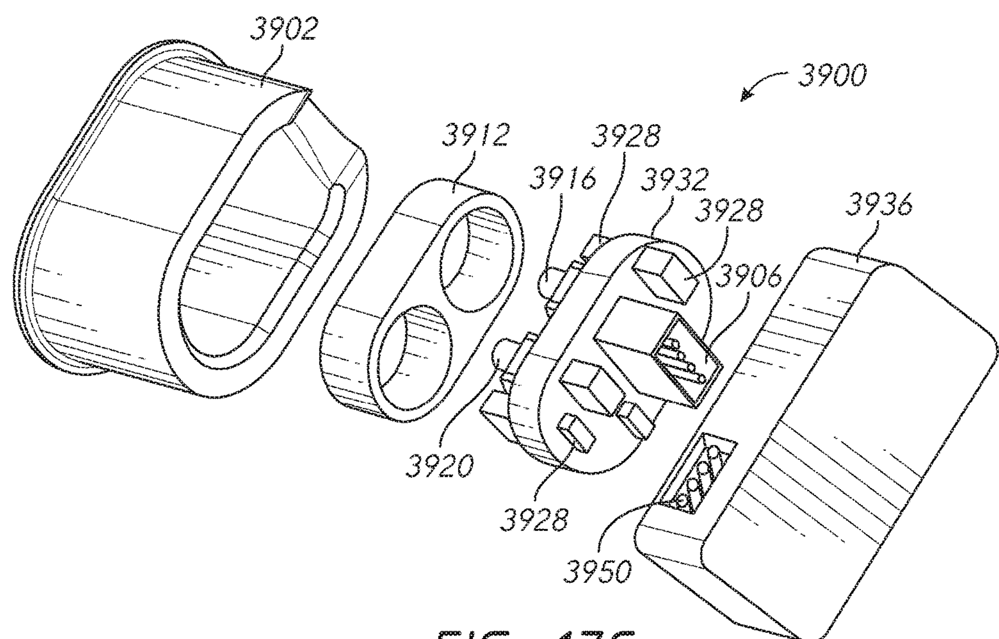
FIG. 17C illustrates a rear perspective exploded view of the sensor of FIG. 17B.
Figure 17D:
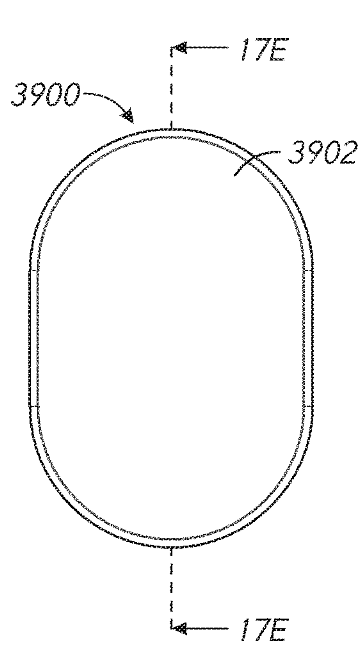
FIG. 17D is a front view of the sensor of FIG. 17B.
Figure 17E:
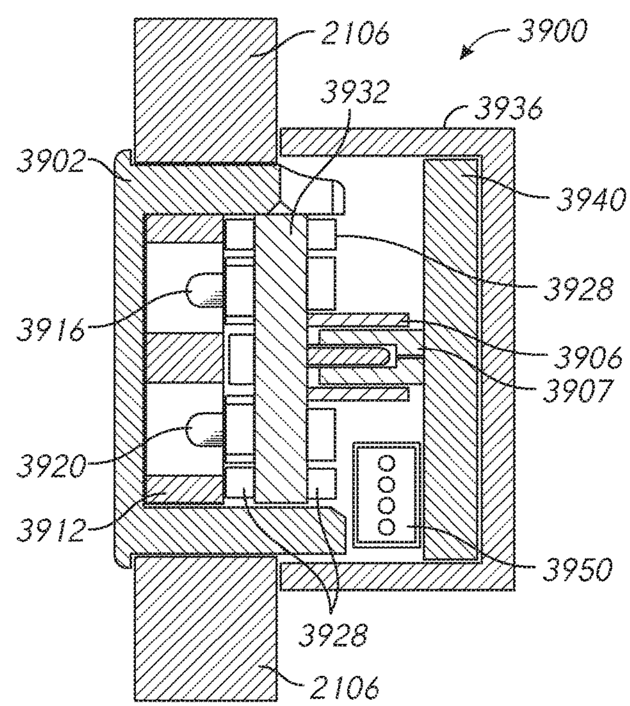
FIG. 17E is a cross section view of the sensor of FIG. 17B along the cut plane C-C of FIG. 17D.
Figure 17F:
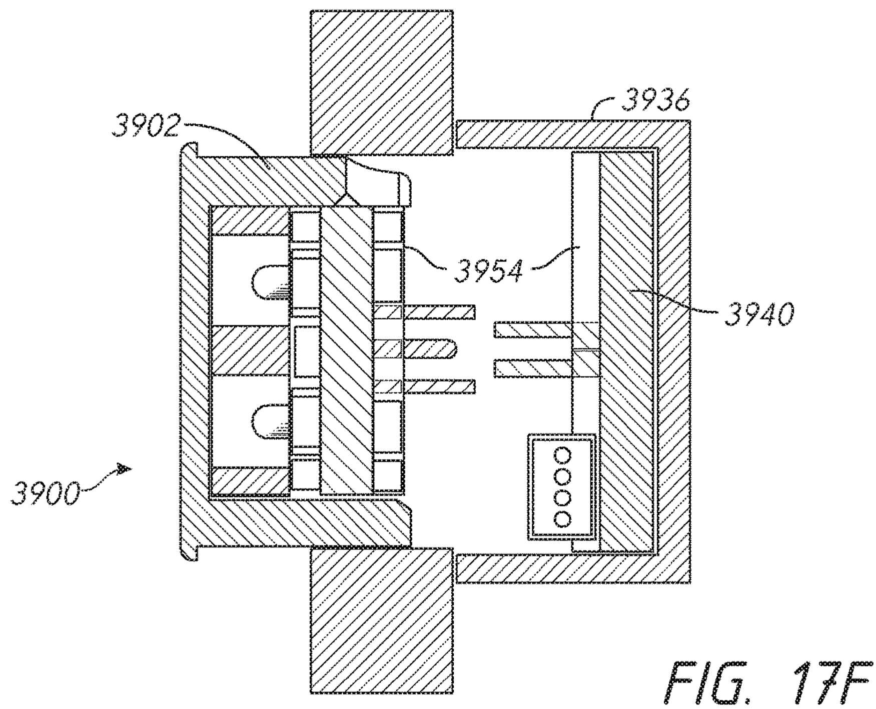
FIG. 17F is a cross section view of the sensor of FIG. 17B along the cut plane C-C of FIG. 17D, including a sealant.

As illustrated in FIGS. 17B, 17E, and 17F, the plug 3906 can be connected to the sensor circuit board 3932 through an opening in the faucet body 2106. The plug 3906 can include one or more prongs configured to couple with the recesses or slots in the socket 3907. In some embodiments, friction between the plug 3906 and the socket 3907 can inhibit or prevent accidentally decoupling of the sensor circuit board 3932 from the interconnect circuit board 3940.

In some embodiments, a sealant 3954 (e.g., an adhesive, polymer, elastomeric material, and/or some combination of materials) can be used in the assembled sensor 3900. For example, as illustrated in FIG. 17F, the sealant 3954 can be installed in the sensor cover 3902 on an underside of the sensor circuit board 3932. The sealant 3954 can inhibit ingress of water or other fluids into the sensor cover 3902 and/or into contact with electrical components of the sensor circuit board 3932. In some embodiments, the sealant 3954 couples the sensor circuit board 3932 to inhibit or prevent accidental removal of the sensor circuit board 3932 from the sensor cover 3902. In some embodiments, the interconnect circuit board housing 3936 includes a sealant 3954 to inhibit or prevent water damage to the interconnect circuit board 3940 and/or to inhibit or prevent accidental decoupling of the interconnect circuit board 3940 from the circuit board housing 3936.

Figure 17G:
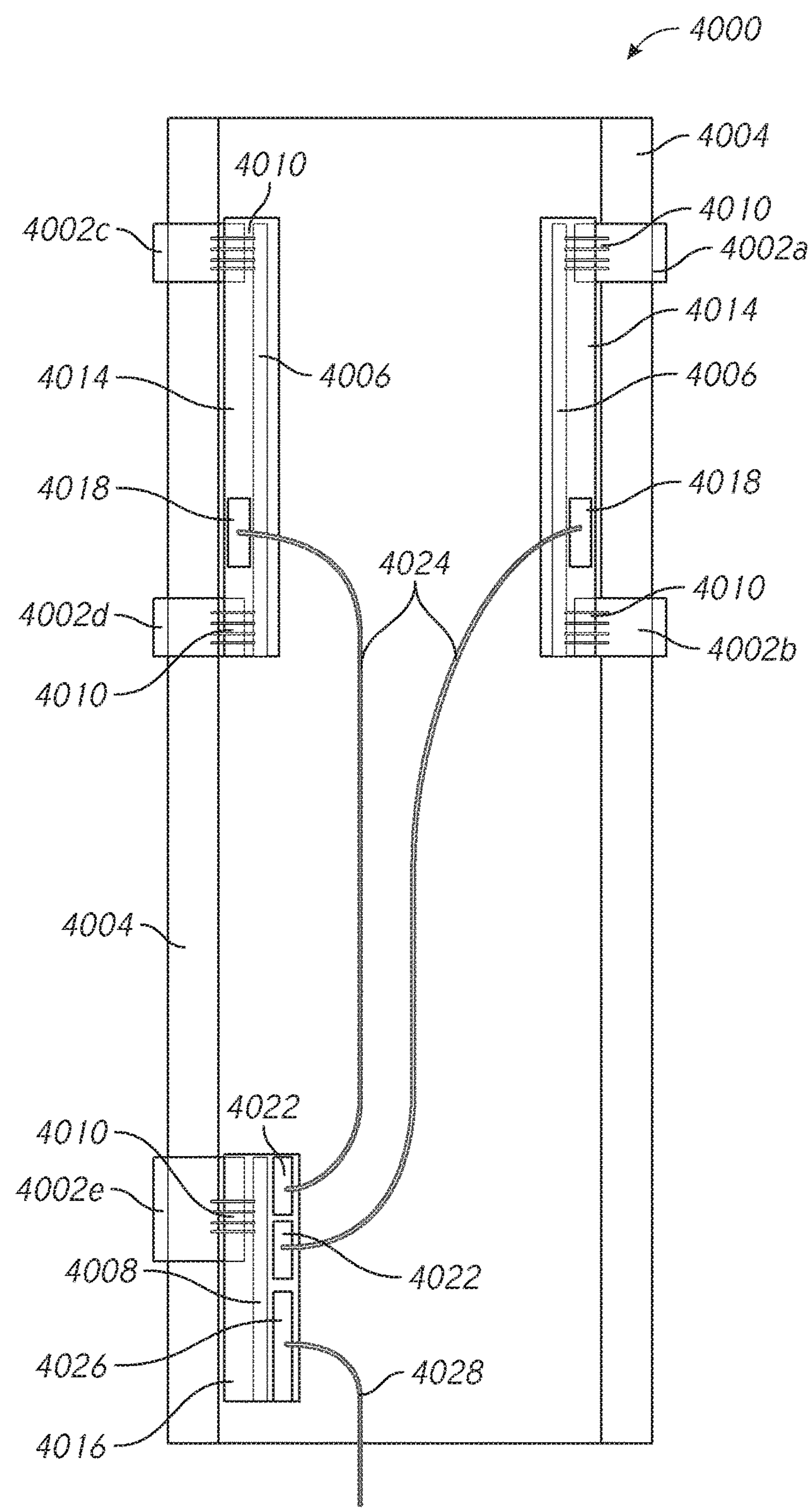
FIG. 17G is a schematic representation of an embodiment of a faucet assembly having a plurality of sensors and interconnecting circuit boards.

FIG. 17G illustrates an embodiment of a faucet assembly 4000 having a plurality of sensors 4002*a*, 4002*b*, 4002*c*, 4002*d*, 4002*e* (hereinafter referred to collectively as sensors 4002). As illustrated, one or more of the sensors 4002 can be connected to one or more interconnecting circuit boards 4006 through openings in the walls 4004 of the faucet assembly 4000. For example, one or more pairs of sensors 4002 can be connected to a single interconnecting circuit board 4006. The sensors 4002 can be connected to the circuit boards 4006 via, for example, plug-socket fittings 4010 similar to or the same as those described above with respect to sensor 3900. In some embodiments, one or more of the sensors 4002 is connected to its respective circuit board via a 4-prong plug, a 6-prong plug, an 8-prong plug, and/or any other suitable plug.

The interconnecting circuit boards 4006 can be housed within respective interconnecting circuit board housings 4014. One or more of the housings 4014 can include a cable connector point 4018. For example, one or more of the housings 4014 can include a cable connector point 4018 configured to electronically connect one or more of the sensors 4002 and/or interconnecting circuit boards 4006 to a master circuit board.

As illustrated in FIG. 17G, the faucet assembly 4000 can include a hub circuit board 4008 housed within a master circuit board housing 4016. In some embodiments one or more sensors 4002 (e.g., sensor 4002*e*) can be connected to the hub circuit board 4008 via a plug-socket fitting 4010. The hub circuit board housing 4016 can include one or more sensor cable connector points 4022 configured to facilitate electronic communication between the hub circuit board 4008 and the cable connector points 4018 of the interconnecting circuit board housings 4014. For example, wires cables 4024 (e.g., 5 wire cables) can connect the respective connector points 4018, 4022. In some embodiments, the hub circuit board housing 4016 includes a main connector point 4026 configured to electronically connect to an electronic component (e.g., the main circuit board) of the faucet assembly 4000 via, for example, a wire cable 4028 (e.g., a 10 wire cable).

Figure 17H:
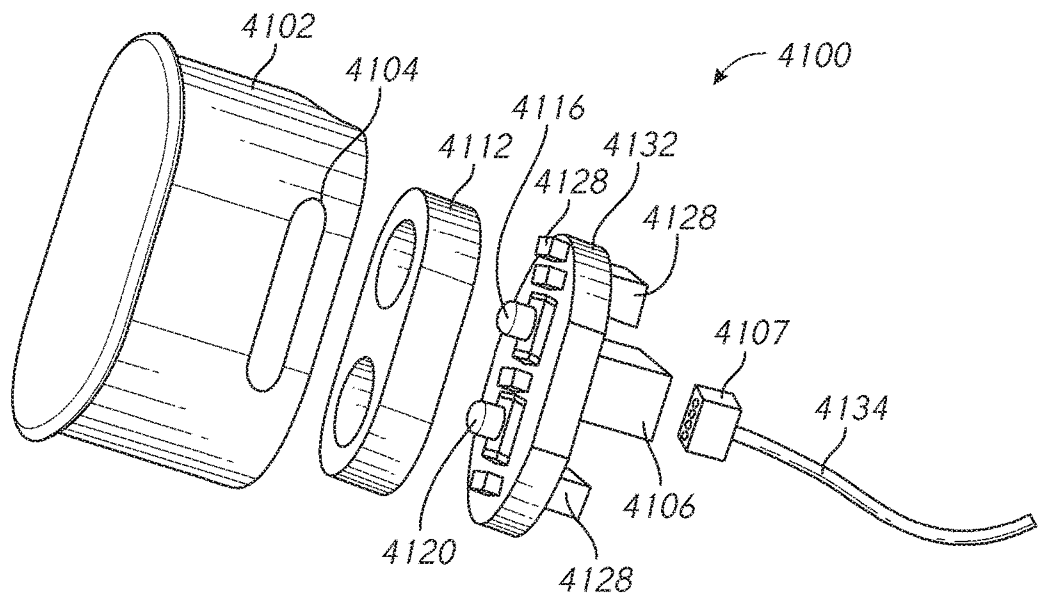
FIG. 17H illustrates a front perspective exploded view of an embodiment of a sensor that can be installed from outside in through a receiving hole of an assembly.
Figure 17I:
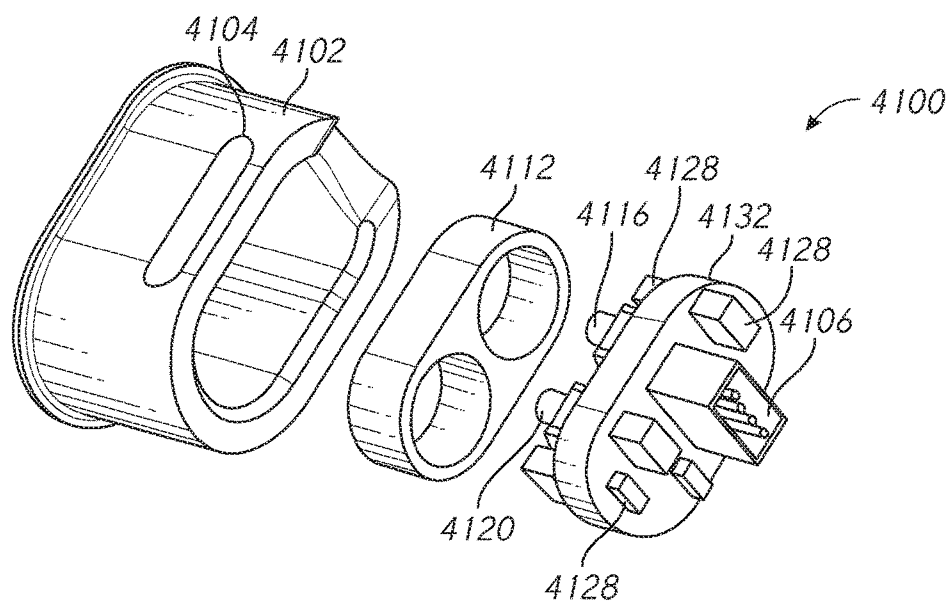
FIG. 17I illustrated a rear perspective exploded view of the sensor of FIG. 17H.

FIGS. 17H and 17I illustrate an embodiment of a sensor 4100 wherein the sensor electronic circuit board can be removably connected to a wire 4134 via a plug 4106 and socket 4107. The sensor 4100 can include an emitter 4116 (e.g., an infrared LED, an SMD type LED, and/or other emitter). As illustrated, the sensor 4100 can include a receiver 3920 (e.g., an infrared LED phototransistor, an SMD type LED phototransistor, and/or other receiver). The emitter 4116 and/or the receiver 4120 can be mounted on or otherwise connected to the sensor circuit board 4132. Additional electronic components 4128 can be attached to one or both sides of the sensor circuit board 4132 in some embodiments.

In some embodiments, the sensor 4100 includes a sensor cover 4102. The sensor cover 4102 can be sized and shaped to fit over the emitter 4116 and/or over the receiver 4120. In some embodiments, the sensor cover 4102 is sized and shaped such that at least a portion of the sensor circuit board 4132 fits within the interior of the sensor cover 4102. The sensor cover 4102 can include one or more slits 4104 or other connection structures configured to facilitate connection of the sensor cover 4102 to a faucet body (not shown) (e.g., the faucet body 2016). For example, a clip (not shown) (e.g., one or more of the clips 2804, 2902, 2904, 2906, 3210, 3302, 3320 described below) may be used to connect the sensor cover 4102 to a faucet body.

The sensor 4100 can include a sensor sleeve 4112. The sensor sleeve 4112 can have a plurality of apertures extending through the sensor sleeve 4112. In some embodiments, the emitter 4116 is positioned within an aperture of the sleeve 4112 separate from the receiver 4120.

In some embodiments, the plug 4106 is a 4-prong plug, a 6-prong plug, an 8-prong plug, and/or any other suitable plug. The socket 4102 can be a 4-recess socket, 6-recess socket, 8-recess socket, and/or any other suitable socket for connecting to the plug 4106. Use of a plug and socket engagement can facilitate easy installation and/or removal of the sensor 4100 from the wire 4134.

As illustrated in FIG. 17H, the socket 4107 can be connected to a wire 4134. For example, the wire 4134 can be soldered or otherwise permanently or releasably connected to the socket 4107. The wire 4134 can connect the socket 4107 to a logic processor (not shown) or other electrical component. In some embodiments, the wire 4134 connects the socket 4107 to an interconnect circuit board (not shown) (e.g., a PCB).

Figure 18:
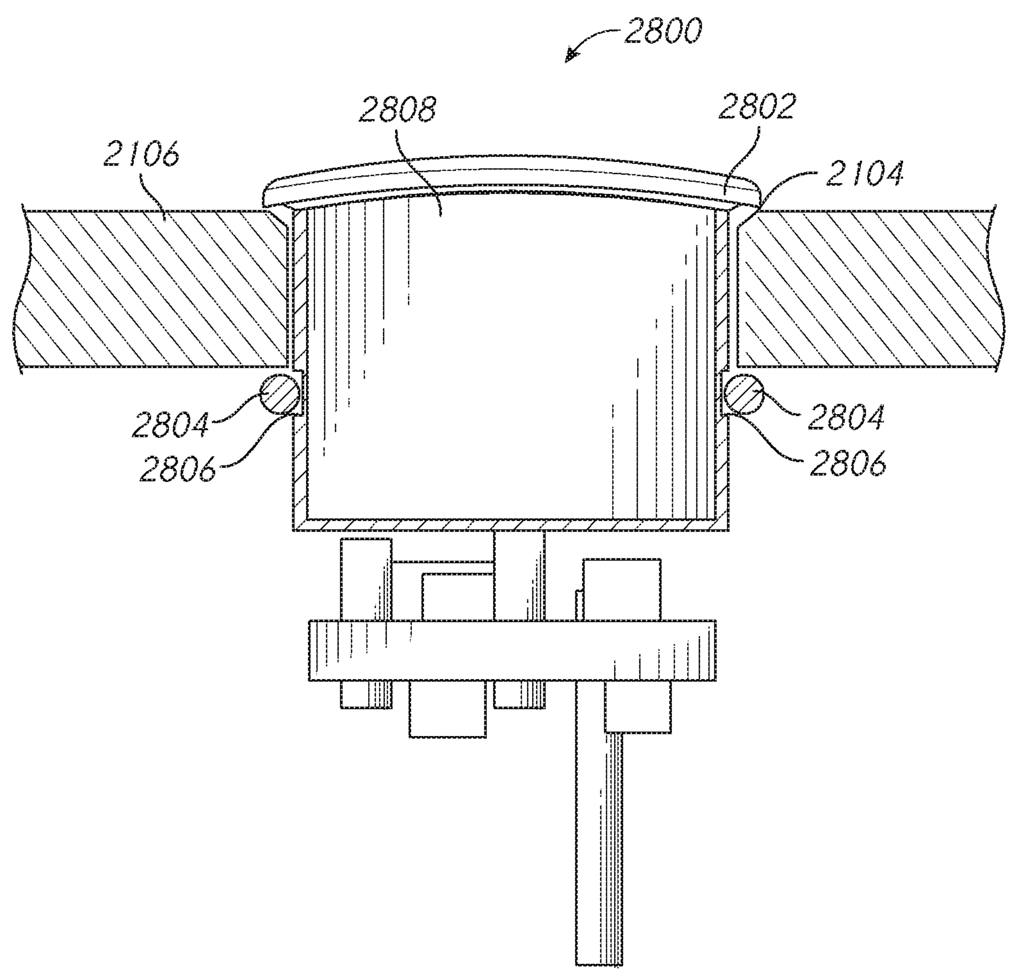
FIG. 18 illustrates a top view of an embodiment of a sensor that was installed from outside in through a receiving hole of an assembly and secured via securing modules.

FIG. 18 illustrates an embodiment of a sensor 2800 with a securing module 2804 that includes retaining pins. As shown, the sensor 2800 can be inserted outside in such that the rim 2802 may rest on the edge of the wall 2106 near the receiving hole 2104 as described above to prevent the sensor from falling in. The securing modules 2804 can further secure the sensor 2800 from falling out of the wall. In the illustrated embodiment, two retaining pins 2804 are inserted in grooves 2806 of the sensor cover 2808 along the inner surface of the wall 2106 to prevent the sensor from dislodging. The pins 2804 can be installed from the interior of the faucet. The length of the pin may depend on the thickness of the wall. The pins may also be shaped to match the curvature of the wall 2106. In some instances, the pins may be bendable. In certain embodiments, it may be advantageous to use pins or clips instead of screws because they may be easily installed and removed. Thus, pins or clips can also make repairs possible as it might be easier to pull pins out and remove the sensor as described more in detail with respect to FIGS. 26A and 26B.

Figure 19A:
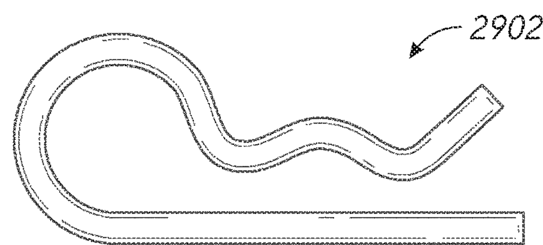
FIGS. 19A, 19B, and 19C illustrate embodiments of securing modules.
Figure 19B:
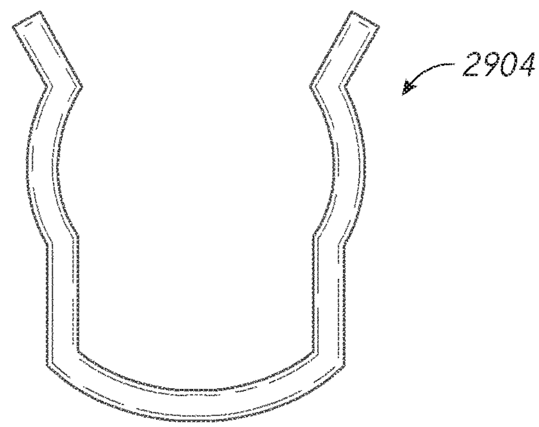
Figure 19C:
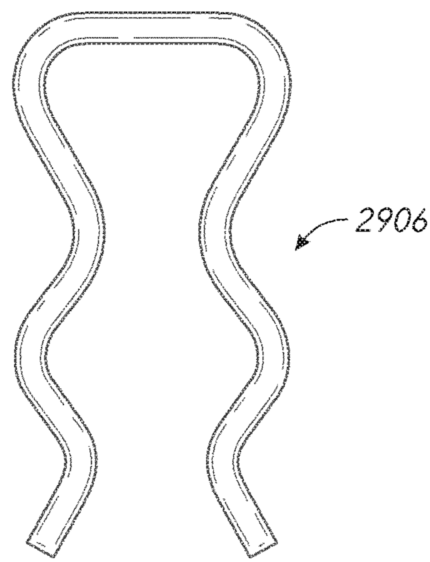

FIGS. 19A-C illustrate several embodiments of retaining pins 2902, 2904, 2906 that can secure the sensor 2800 as discussed above with respect to FIG. 18.

Figure 20:
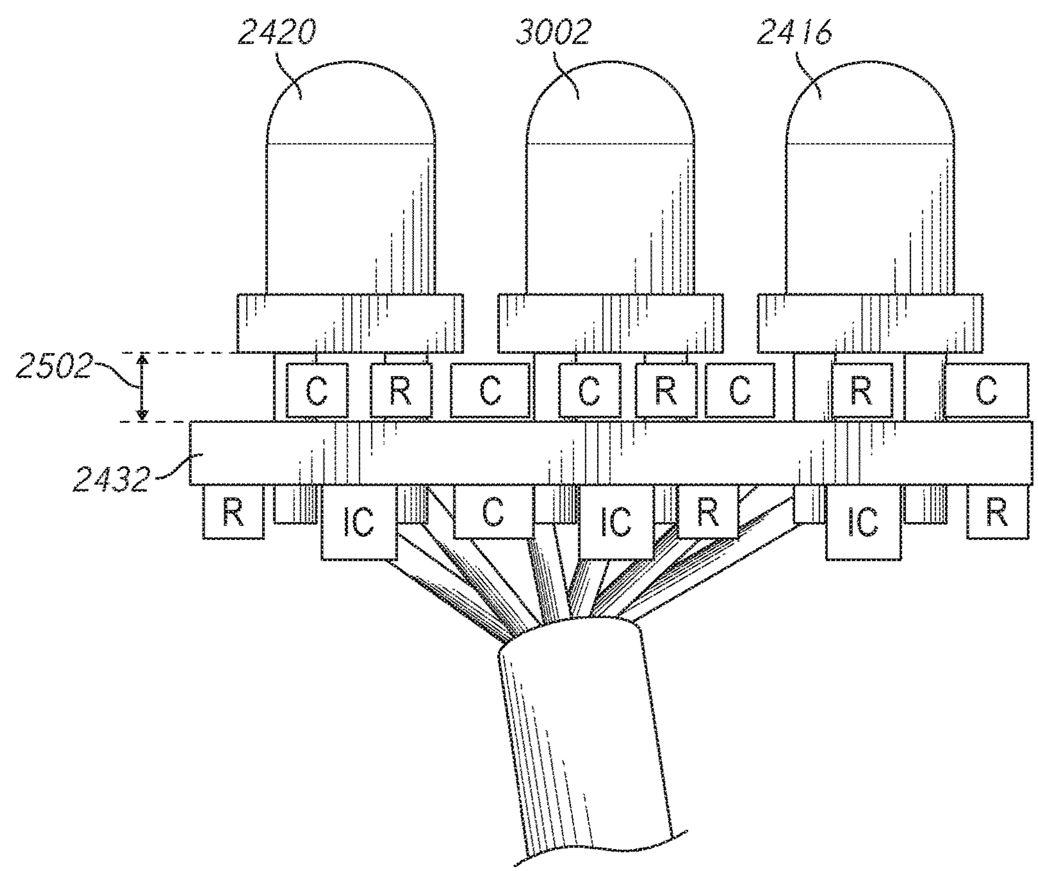
FIG. 20 illustrates an embodiment of a sensor, including an additional emitter, that can be installed from outside in through a receiving hole.

FIG. 20 illustrates a side view of an embodiment of an electronic circuit board 3010 including an IR emitter 2416, a light emitting diode 3002, and a detector 2420. The legs (not shown) can create a distance 2502 between the base of the emitters or detector and the surface of the electronic circuit board 2432. The increased distance can create additional surface area for mounting electronic components. The light emitting diode 3002 may emit visible radiation. Adding the light emitting diode 3002 may increase the length of the sensor by 3 to 5 mm.

Figure 21:
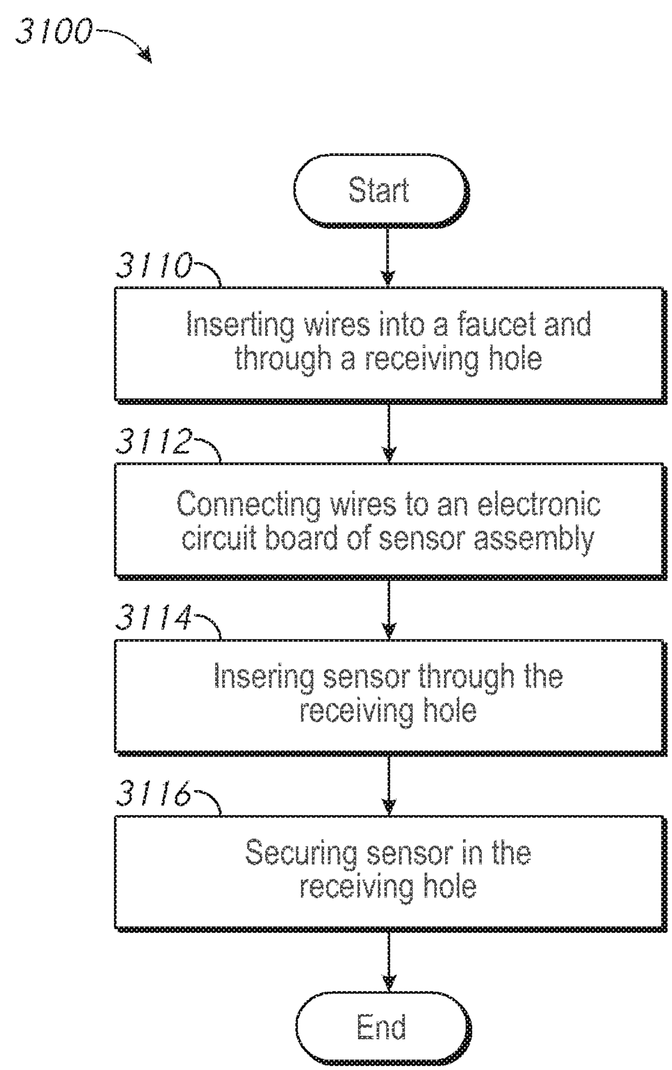
FIG. 21 illustrates an embodiment of a process for installing a sensor from outside in via a receiving hole.

FIG. 21 illustrates an embodiment of a process for installing a sensor described above from outside in through the receiving hole of a faucet. In an embodiment, the method begins at block 3110, where a cable including one or more wires is inserted into a faucet through a receiving hole of a faucet. The cable can be inserted either from the interior of the faucet and removed out of the receiving hole or inserted into the receiving hole from outside and into the interior of the faucet. The wires can connect the electronic circuit board with a logic processor. At block 3112, the wires can be connected to the electronic circuit board as described above. In an embodiment, the electronic circuit board, including any electrical circuit elements, emitters and/or detectors, can be assembled with a sensor cover. The sensor assembly including the sensor cover can be inserted outside in through the receiving hole at block 3114. The sensor cover can also include securing modules. In some embodiments, the securing modules are separate components from the sensor cover. At block 3116, the securing modules can be engaged to secure the sensor in the receiving hole. The securing modules can automatically deploy or engage in some instances when the sensor is inserted in the receiving hole. In some embodiments, the securing modules are installed after the sensor is inserted in the receiving hole. For example, retaining pins described above can be used to secure the sensor.

Figure 22A:
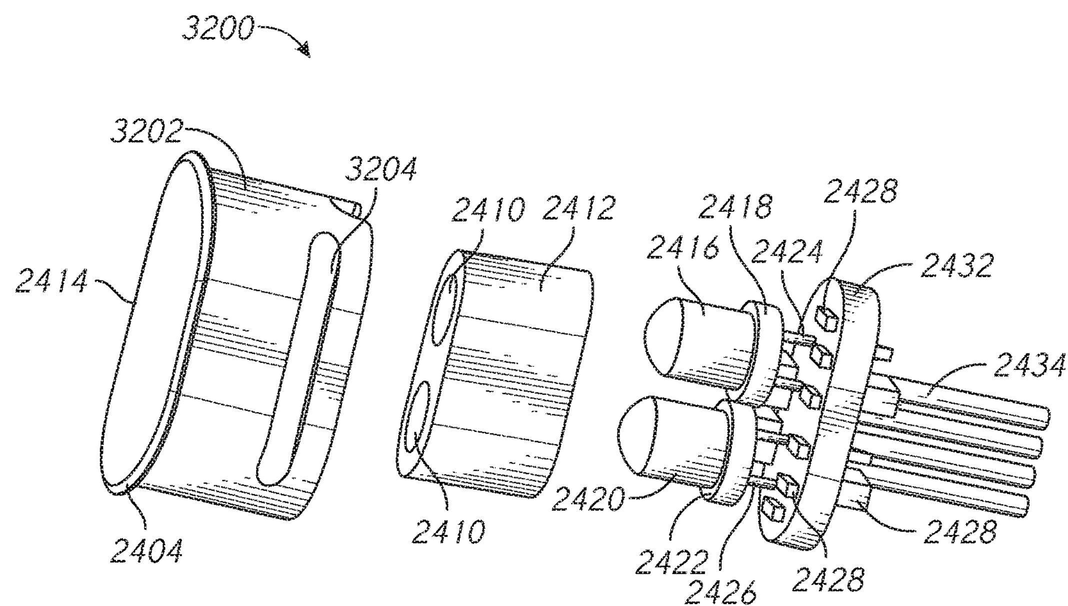
FIG. 22A illustrates an exploded view of a sensor that can be installed from outside in through a receiving hole.
Figure 22B:
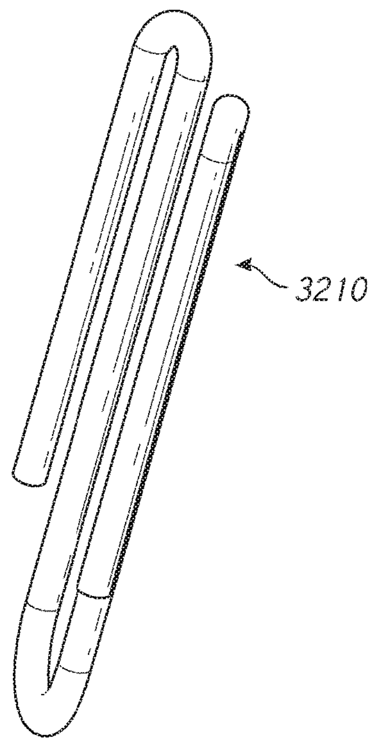
FIG. 22B illustrated an embodiment of a securing module that can secure the sensor shown in FIG. 22A.

FIG. 22A illustrates another embodiment of a sensor 3200 that can be installed from outside into a faucet. The sensor 3200 includes a sensor cover 3202 with one or more slits 3204. The sensor 3200 can be secured to the faucet using one or more clips 3210 shown in FIG. 22B. The clip 3210 can be bent or twisted to secure the sensor 3200 with the faucet. FIGS. 23A and B illustrate top and side view of the sensor 3200 shown in FIG. 22A. The dimensions of the clip 3210 can be a function of the wall thickness and/or wall curvature. The clip 3210 may be made of metal, plastic, or some other suitable material (e.g., a resilient material, a flexible material, and/or a rigid or semi-rigid material).

Figure 24:
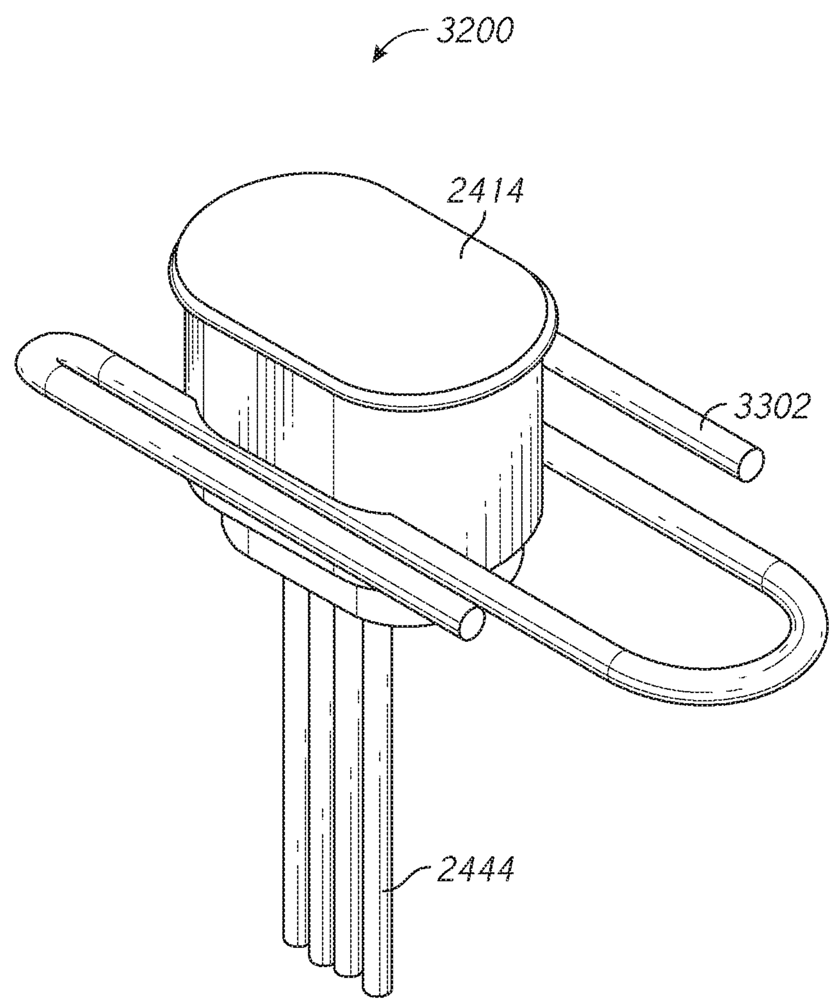
FIG. 24 illustrates an embodiment of securing module coupled with the sensor of FIG. 22A.
Figure 25A:
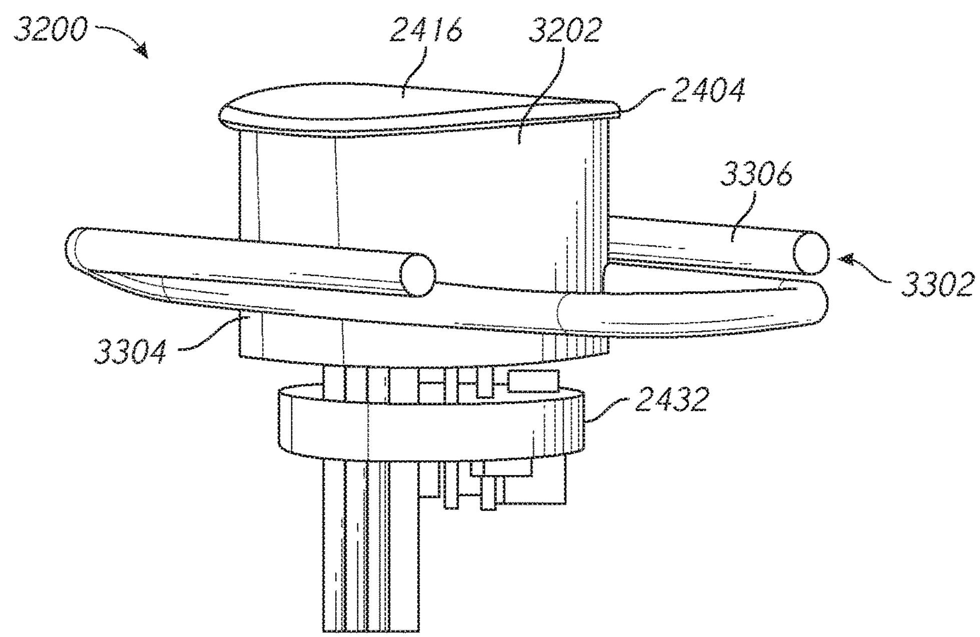
FIG. 25A illustrates an embodiment of a sensor engaged with the clip of FIG. 23C.
Figure 25B:
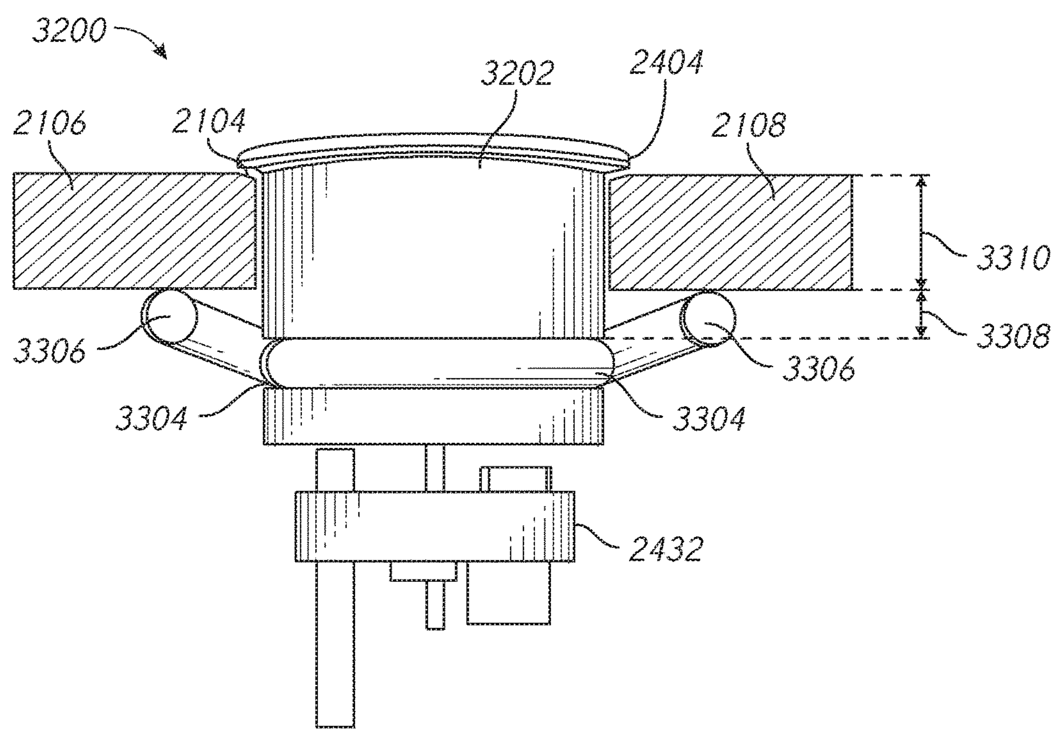
FIG. 25B illustrates a top view of the embodiment shown in FIG. 25A received in a receiving hole and secured to the assembly.

FIG. 23C illustrates an embodiment of a clip 3302 for securing the sensor 3200 to the faucet. The clip can include a center portion 3304 and edge portions 3306. In an embodiment, the width of the center portion can be proportional to the size of the sensor 3200 such that the center portion engages the grooves of the sensor cover 3202 as shown in FIG. 24. The edge portions 3306 can be bent or twisted towards the inner wall of the faucet as shown in FIG. 25. The degree of twist and dimensions of the clip may be a function of the faucet wall thickness 3310 and the spacing 3308 as illustrated in FIG. 25B. In some embodiments, the length of the sensor is in the range of 10 to 50 mm, the width in the range of 6 to 20 mm, and depth in the range of 5 to 20 mm. Dimensions of the sensor may a function of aesthetics as well as utility. Accordingly, in certain embodiments, the clip 3302 can prevent the sensor 3200 from falling out of the faucet.

Figure 23D:
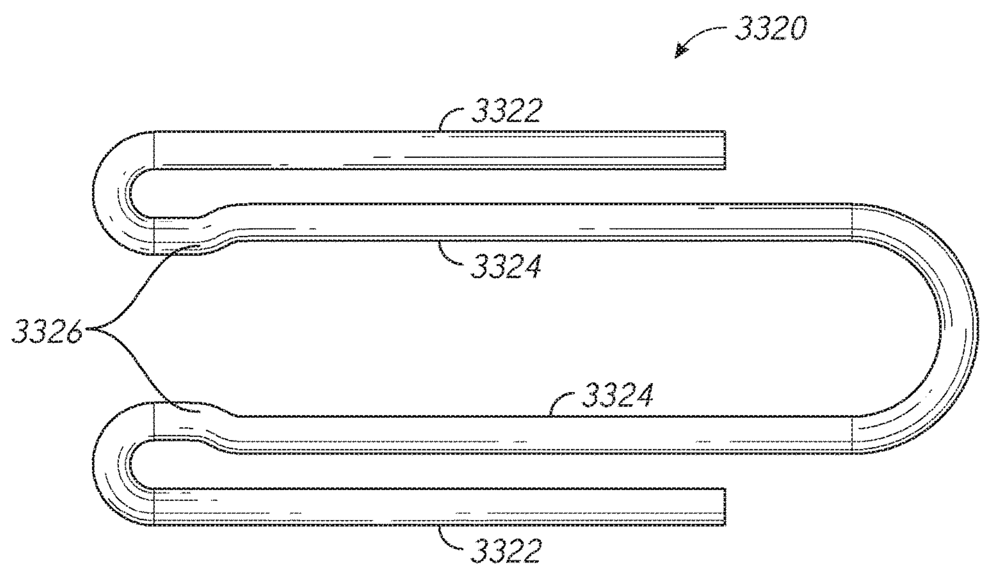
FIG. 23D illustrates a top view of another embodiment of a securing module that is a clip.
Figure 23E:
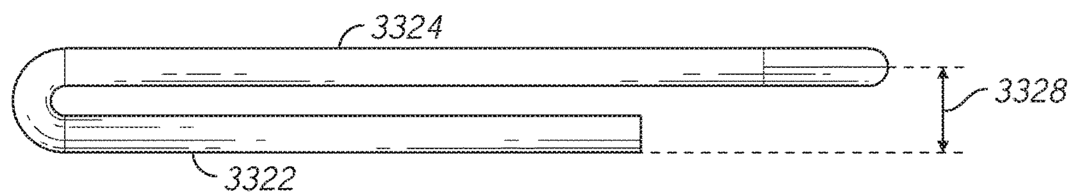
FIG. 23E illustrates a side view of the embodiment of the securing module of FIG. 23D.

FIG. 23D illustrates a top view of another embodiment of the clip 3320 that includes notches 3326 for use in the installation process of a sensor. In some embodiments, the notches can advantageously prevent the clip 3320 from slipping out of the grooves. The clip 3320 includes a center portion 3324 and two edge portions 3322. The edge portions 3324 can be angled from the center portions 3324 such that the edge portions 3324 can engage with a wall of the faucet. In some embodiments, the edge portions 3322 are compressed against the wall to secure a sensor. FIG. 23E illustrates a side view of the clip 3320. As illustrated, there is height gap 3328 between the center portion 3324 and the edge portion 3322. The gap 3328 can depend on the size of the sensor and the dimension of the faucet. In some embodiments, the clip may be made of stainless steel or other metallic material with some compressibility. In other embodiments, the clip may be made of a plastic material or a combination of metallic and plastic materials.

Figure 26A:
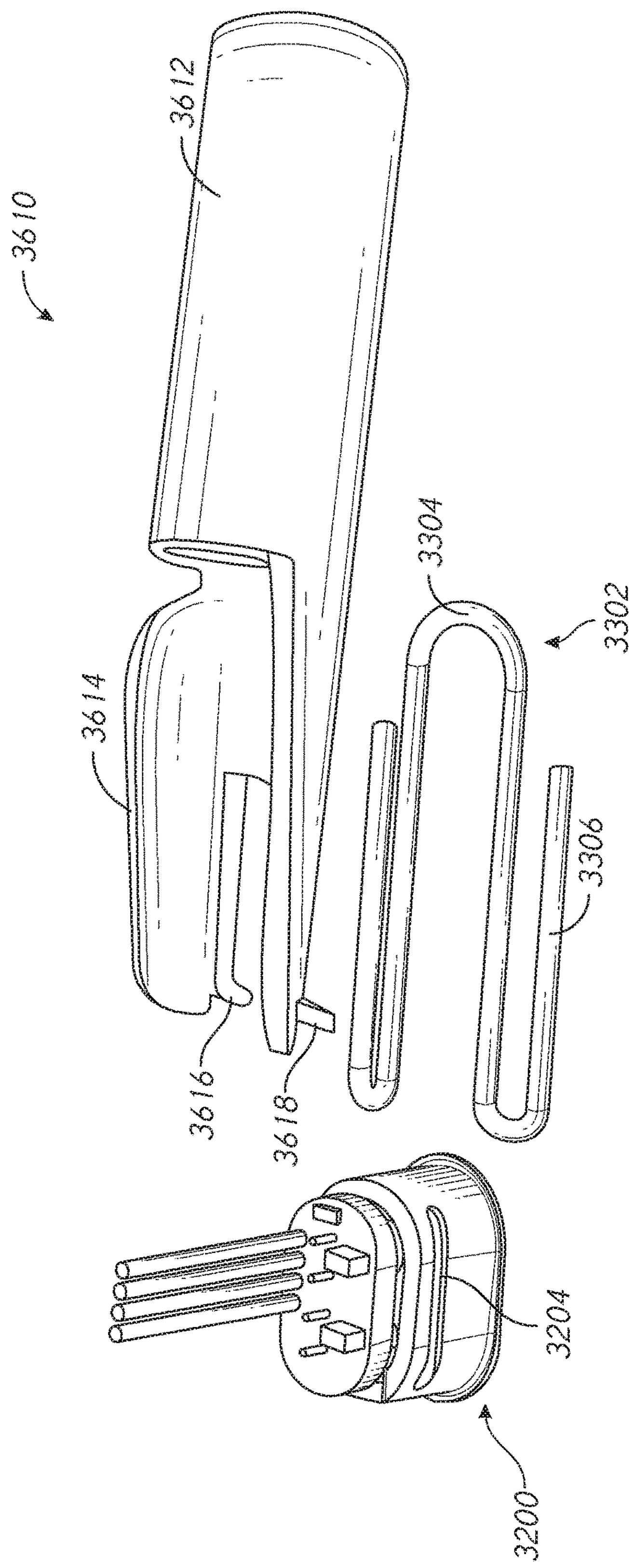
FIGS. 26A-B illustrate an embodiment of an installation tool and a process for installing a securing module to a sensor with the installation tool.
Figure 26B:
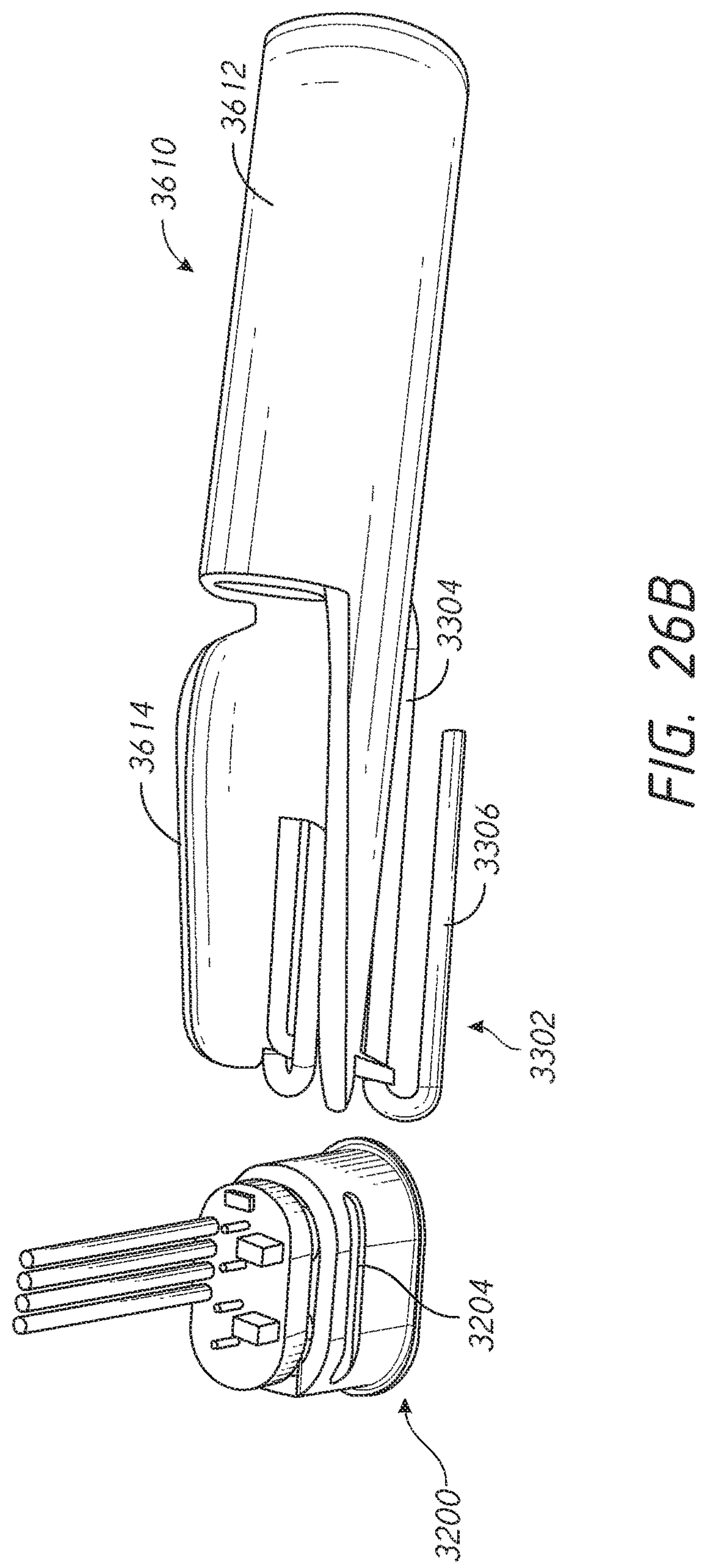

FIGS. 26A-B illustrate an embodiment of an installation tool 3610 for use in installation of securing modules such as clips 3302 and 3320 with the sensors. The installation tool 3610 can fit inside the faucet structure to slide the clips into the grooves 3204 of the sensor 3200. The handle 3612 of the installation tool 3610 may be of a size smaller than the size of the faucet. This may allow all or at least a substantial portion of the handle to reach inside the faucet for attaching the clip 3302 with the sensor 3200. The arm extender 3614 extends from the handle 3612. In some embodiments, the arm extender 3614 has a curvature and may also taper away from the handle 3612. The curvature may enable the tool 3610 to slide inside of faucets of varying sizes including tapered faucets. The length of the arm extender 3614 may depend on the length of the sensor 3200, the length of the grooves, or the length of clip 3302 such that the clip 3302 can be completely secured along the sensor.

In the illustrated embodiment shown in FIG. 26B, the installation tool 3610 includes two arms 3616 and 3618 to engage the looped or the center portion 3304 of the clip 3302. The arms 3616 and 3618 can be spaced apart according to the size of the sensor 3200 such that there is sufficient distance to slide the clip 3302 through the grooves 3204. The spacing between the arms 3616 and 3618 may also be wider than the center portion 3304 of the clip 3302 to stretch the clip 3302 along the center portion 3304 during the installation process. The tension in the clip 3302 as a result of the stretch may ensure that the clip 3302 does not fall from the installation tool 3610. When the installation tool 3610 is disengaged, the clip 3302 may snap back to secure the sensor 3200 along the grooves 3204. As shown, the arm 3616 is shaped to engage the clip 3302 from the top and the arm 3618 is shaped to also engage the clip 3302 from the top such that pressure against the clip from both sides feeds the clip around the sensor. The positions and/or shape of the arms 3616 and 3618 may depend on the structural features of the clip and can also be configured such that one portion of the clip is hooked from the top and the other portion is hooked from the bottom. The curvature of arm extender 3614 may increase the longitudinal rigidity of the extender such that less material is needed to form a sufficiently rigid installation tool. The arms 3616 and 3618 are preferably sufficiently rigid such that they can also be used to engage the center portion 3304 of the clip 3302 to facilitate removal of the clip to facilitate sensor replacement and/or repair. In some instances, the tool 3610 may hook on to the center portion 3304 during removal of the clip 3302 from the sensor 3200.

An embodiment of an installation process of the clip 3302 with the sensor 3200 is described below. A manufacturer or other user can engage the clip 3302 with the installation tool 3610 as shown in FIG. 26B. The manufacturer can then slide the installation tool 3610 engaged with the clip 3302 inside the faucet. The edge portions 3306 of the clip 3302 may face towards the wall of the faucet during the installation process.

The sensor 3200 can be inserted from outside in through the receiving hole as described above. Once the clip passes around the sensor 3200 along the grooves 3204, the manufacturer can unhook the clip 3302 from the installation tool 3610. The unhooking process may depend on the shape of the arms 3616 and 3618 and the clip 3302. For the illustrated configuration shown in FIG. 26B, the manufacturer can lift, wiggle, or rotate the installation tool 3610 to disengage the clip 3302 from the arms 3616 and 3618. The manufacturer can then remove the installation tool 3610 out of the faucet. In some embodiments, the installation tool 3610 may include a mechanism (e.g. spring) to expand the clip while sliding into the grooves 3204 and then release before sliding out. In certain embodiments, it may be advantageous to use clip 3320 with notches 3326 so that after securing the clip to the sensor, the installation tool 3610 can be disengaged and removed while keeping the clip secured with the sensor. The notches 3326 may follow the curvature of the sensor and snap in when clip 3320 is installed. The notches 3326 can prevent the clip from slipping out when removing the installation tool from the faucet. In certain embodiments, the notches 3326 enable the clip 3320 to fit snug with the sensor 3200 to secure the assembly.

Figure 27A:
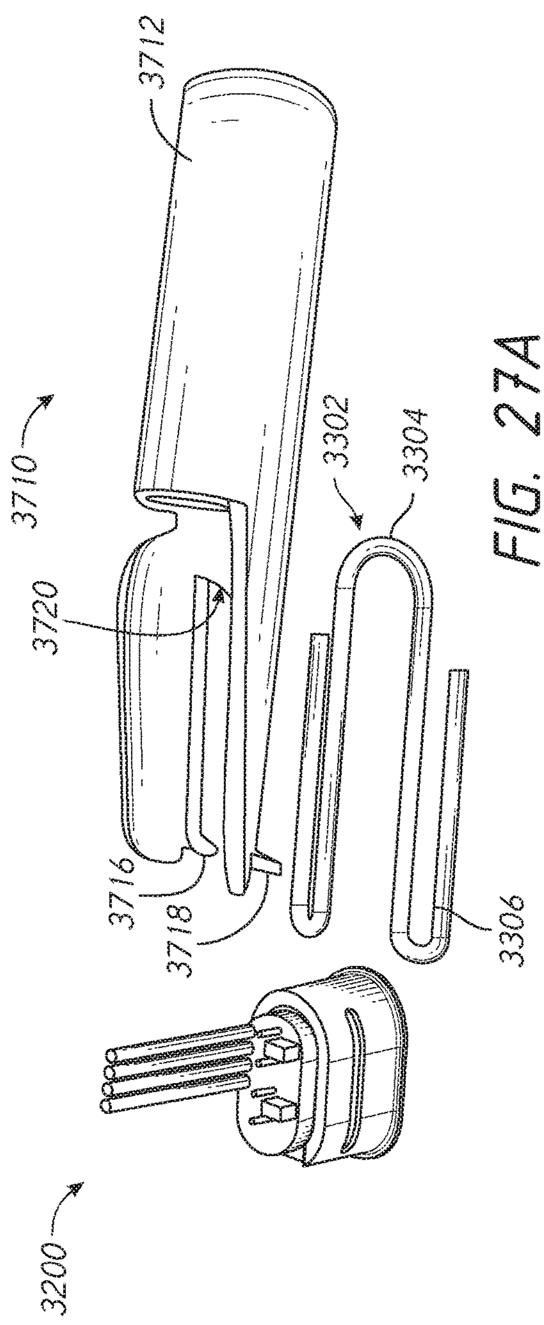
FIGS. 27A-B illustrate another embodiment of an installation tool and a process for installing a securing module to a sensor with the installation tool.
Figure 27B:
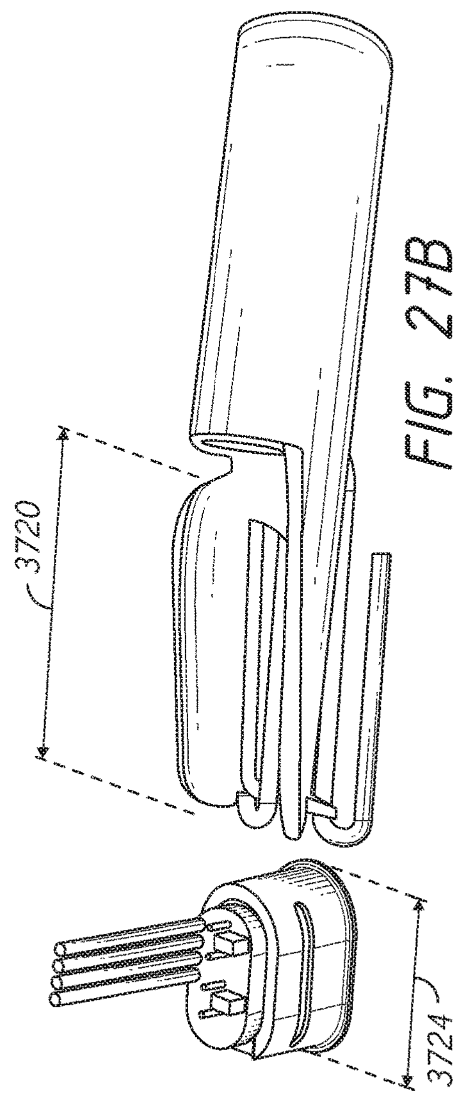

FIGS. 27A-B illustrate another embodiment of an installation tool 3710 for use in installation of securing modules such as clips 3302 and 3320 with the sensors. The installation tool includes a handle 3712, an arm extender 3714, an inner arm 3716 and an outer arm 3718. The installation tool 3710 has a longer cut size 3720 as compared to the installation tool 3610 described above. In some embodiments, the cut size 3720 is a function of the size 3724 of the sensor 3200 so that the clip 3302 can fit entirely across the sensor. In some embodiments, the width of the cut size 3720 is equal to or greater than the width of the sensor as measured between the innermost portion of the grooves 3204.

Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. In particular, several embodiments are described with respect to installing a sensor in a faucet. However, there are many instances where sensors may need to be installed from outside in of a structure. For example, in some instances, there may be a secondary structure housing all the sensors to control operation of the flow of water separate from a faucet. Sensors can also be used to control light and other electronics. The methods and apparatuses described herein can also be used to secure sensors in various retaining structures (e.g. lamp, light switches, etc.). The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "proximal," "distal," "front," "back," "rear," and "side" describe the orientation and/or location of portions of the components or elements within a consistent but arbitrary frame of reference which is made clear by reference to the text and the associated drawings describing the components or elements under discussion. Such terminology may include the words specifically mentioned above, derivatives thereof, and words of similar import.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

What is claimed is:

1. A hybrid faucet system comprising:

a faucet housing having an exterior surface, an interior surface, and at least one aperture through the housing from the exterior surface to the interior surface;

a sensor configured to fit at least partially within the faucet housing and configured to be at least partially inserted through the at least one aperture, the sensor having a sensor cover with one or more grooves and a flange extending from the sensor cover;

a clip sized and shaped to engage with the grooves of the sensor cover and configured to inhibit removal of the sensor from the faucet housing when the clip is engaged with the one or more grooves of the sensor cover; and an installation tool configured to engage with the clip, the installation tool further configured to fit at least partially within the faucet housing to insert the clip into the faucet housing;

wherein the installation tool includes a first arm and a second arm, and wherein the first arm and second arm are spaced from each other and configured to fit at least partially around the sensor cover when the installation tool is inserted into the faucet housing; and wherein the clip comprises a center portion and at least one edge portion connected to the center portion, wherein the first arm of the installation tool is configured to engage a portion of the clip between the center portion and the at least one edge portion, and wherein engagement between the first arm and the portion of the clip between the center portion and the at least one edge portion facilitates installation of the clip into the faucet housing.

2. The faucet system of claim 1, wherein the center portion of the clip is configured to engage with the at least one groove.

3. The faucet system of claim 2, wherein the clip is configured to space the one or more grooves of the sensor cover from the interior surface of the faucet housing.

4. The faucet system of claim 3, wherein spacing the one or more grooves of the sensor cover from the interior surface of the faucet housing pulls the flange into contact with the exterior surface of the faucet housing and wedges the clip between the interior surface of the faucet housing and the at least one groove.

5. The faucet system of claim 2, wherein the center portion is spaced from the at least one edge portion in a direction perpendicular to the interior surface of the faucet housing when the clip and sensor are installed in the faucet housing.

6. The faucet system of claim 1, wherein a cross-sectional size of the sensor cover is smaller than a cross-section of the at least one aperture of the faucet housing, and wherein a cross-sectional size of the flange is larger than the cross-section of the at least one aperture.

* * * * *